(12) United States Patent
Risberg et al.

(10) Patent No.: US 12,061,838 B2
(45) Date of Patent: *Aug. 13, 2024

(54) ADAPTIVE RECEIVER

(71) Applicant: Cirrus Logic International Semiconductor Ltd., Edinburgh (GB)

(72) Inventors: Pär Gunnars Risberg, Stockholm (SE); Carl Lennart Ståhl, Malmö (SE); Landy Toth, Doylestown, PA (US)

(73) Assignee: Cirrus Logic Inc., Austin, TX (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/673,456

(22) Filed: Feb. 16, 2022

(65) Prior Publication Data
US 2022/0171595 A1    Jun. 2, 2022

Related U.S. Application Data

(63) Continuation of application No. 16/789,071, filed on Feb. 12, 2020, now Pat. No. 11,379,176, which is a
(Continued)

(51) Int. Cl.
*G06F 3/16* (2006.01)
*H04R 3/00* (2006.01)
(Continued)

(52) U.S. Cl.
CPC ............. *G06F 3/165* (2013.01); *H04R 3/002* (2013.01); *H04R 3/04* (2013.01); *H04R 29/001* (2013.01);
(Continued)

(58) Field of Classification Search
CPC ........... G06F 3/165; G06F 3/16; H04R 3/002; H04R 3/04; H04R 29/001; H04R 3/007;
(Continued)

(56) References Cited

U.S. PATENT DOCUMENTS

2003/0108209 A1    6/2003  McIntosh
2010/0080084 A1*   4/2010  Chen ................... G01S 11/14
                                                  367/118
(Continued)

FOREIGN PATENT DOCUMENTS

EP    2190213 A1    5/2010
EP    2701143 A1    2/2014
(Continued)

OTHER PUBLICATIONS

International Search Report and Written Opinion of the International Searching Authority, International Application No. PCT/GB2016/051470, mailed Aug. 10, 2016.
(Continued)

*Primary Examiner* — Yosef K Laekemariam
(74) *Attorney, Agent, or Firm* — Jackson Walker L.L.P.

(57) ABSTRACT

A nonlinear control system and a speaker protection system are disclosed. In particular, a control system for adapting an audio output from a speaker in the proximity of an object is disclosed. The controller is configured to accept one or more input signals, and one or more estimated states produced by the model to produce one or more control signals. A speaker protection system and a quality control system are disclosed. More particularly, a system for clamping the input to a speaker dependent upon an estimate of the proximity, acoustic volume, and/or acoustic coupling of the speaker to a nearby object is disclosed.

64 Claims, 15 Drawing Sheets

Related U.S. Application Data continuation of application No. 16/202,834, filed on Nov. 28, 2018, now Pat. No. 10,599,389, which is a continuation of application No. 15/575,244, filed as application No. PCT/GB2016/051470 on May 20, 2016, now Pat. No. 10,338,883.

(60) Provisional application No. 62/165,424, filed on May 22, 2015.

(51) Int. Cl.
 *H04R 3/04* (2006.01)
 *H04R 29/00* (2006.01)

(52) U.S. Cl.
 CPC .......... *H04R 3/007* (2013.01); *H04R 2400/01* (2013.01); *H04R 2430/01* (2013.01); *H04R 2499/11* (2013.01)

(58) Field of Classification Search
 CPC ............ H04R 2400/01; H04R 2430/01; H04R 2499/11; H04R 3/08; H04R 3/00; H04R 29/00
 See application file for complete search history.

(56) References Cited

U.S. PATENT DOCUMENTS

| | | | |
|---|---|---|---|
| 2010/0158275 A1* | 6/2010 | Zhang | H03G 3/32 381/107 |
| 2010/0322430 A1 | 12/2010 | Isberg | |
| 2011/0116643 A1 | 5/2011 | Tiscareno et al. | |
| 2013/0202132 A1 | 8/2013 | Zurek et al. | |
| 2015/0104032 A1 | 4/2015 | Kwatra | |
| 2015/0110298 A1 | 4/2015 | Macours et al. | |
| 2015/0170133 A1* | 6/2015 | Love | G06Q 20/3272 705/44 |
| 2015/0304772 A1 | 10/2015 | Risberg et al. | |
| 2016/0021435 A1* | 1/2016 | Topchy | G08C 23/02 340/870.3 |
| 2019/0082394 A1 | 3/2019 | Abdelmonem et al. | |

FOREIGN PATENT DOCUMENTS

| | | |
|---|---|---|
| EP | 2768208 A1 | 8/2014 |
| EP | 2863651 A1 | 4/2015 |
| WO | 2012166386 A1 | 12/2012 |
| WO | 2014045123 A2 | 3/2014 |

OTHER PUBLICATIONS

Search and Examination Report under Sections 17 and 18(3), UKIPO, Application No. GB2115420.8, mailed Jan. 28, 2022.
Combined Search and Examination Report under Sections 17 and 18(3), UKIPO, Application No. GB2109817.3, mailed Aug. 12, 2021.
Examination Report under Section 18(3), UKIPO, Application No. GB21721271.3, mailed Mar. 19, 2021.
Combined Search and Examination Report under Sections 17 and 18(3), UKIPO, Application No. GB2115420.8, mailed Nov. 18, 2021.
Combined Search and Examination Report under Sections 17 and 18(3), UKIPO, Application No. GB2201460.9, mailed Feb. 16, 2022.
Examination Report under Section 18(3), UKIPO, Application No. GB2115420.8 mailed Feb. 16, 2022.

\* cited by examiner

ADAPTIVE RECEIVER

The present disclosure is a continuation of U.S. Non-provisional patent application Ser. No. 16/789,071, filed Feb. 12, 2020, which is a continuation of U.S. Non-provisional patent application Ser. No. 16/202,834, filed Nov. 28, 2018, which is a continuation of U.S. Non-provisional patent application Ser. No. 15/575,244, filed Nov. 17, 2017, issued Jul. 9, 2019 as U.S. Pat. No. 10,338,883, which is a 371 of International Application No. PCT/GB2016/051470, filed May 20, 2016, which claims priority to U.S. Provisional Patent Application Ser. No. 62/165,424, filed May 22, 2015, each of which is incorporated by reference herein in its entirety.

TECHNICAL FIELD

The present disclosure is directed to digital control of receivers and protection systems for implementation in audio signal processing. The present disclosure is further directed towards adaptive audio correction of handsets. The present disclosure is further directed towards systems and methods for predicting the acoustic impedance of a handset coupled with the head of a user.

BACKGROUND

Mobile technologies and consumer electronic devices (CED) continue to expand in use and scope throughout the world. In parallel with continued proliferation, there is rapid technical advance of device hardware and components, leading to increased computing capability and incorporation of new peripherals onboard a device along with reductions in device size, power consumption, etc. Most devices, such as mobile phones, tablets, and laptops, include audio communication systems and particularly one or more speakers to interact with and/or stream audio data to a user.

Every device has an acoustic signature, meaning the audible characteristics of a device dictated by its makeup and design that influence the sound generated by the device or the way it interacts with sound. The acoustic signature may include a range of nonlinear aspects, which potentially depend on the design of the device, on the age of the device, the content of an associated stream (e.g., sound pressure level, spectrum, etc.), and/or the environment in which the device operates. The acoustic signature of the device may significantly influence the audio experience of a user.

Improved acoustic performance may be achieved, generally with additional cost, increased computational complexity, and/or increased component size. Such aspects are in conflict with the current design trend. As such, cost, computation, and size sensitive approaches to addressing nonlinear acoustic signatures of devices would be a welcome addition to a designer's toolbox.

Tuning is generally performed during design and validation of a new handset. Tuning is performed by testing the new handset on a range of ear simulators, as well as head and torso simulators, and the tuning process is directed by a series of standard performance levels. Such simulators are static and rarely reflective of actual operating conditions of the handset in the real world.

In real world conditions, the actual acoustic impedance between a handset receiver and the ear of a subject may change dramatically based on position, quality of the seal against the ear, physiology of the ear, hair coverage around the ear, clothing worn around the head of the subject, jewelry worn on the ear of the subject, ear modifications, environmental conditions, and the like.

There is a need for improving perceived sound quality from a handset in real world settings.

SUMMARY

One objective of this disclosure is to provide a control system for a speaker.

Another objective is to provide a filter system for enhancing audio output from a consumer electronics device.

Yet another objective is to provide a control system for enhancing an audio output from a speaker in vicinity with an object to the object.

Another objective is to provide improved sound quality to a subject when a handset receiver is coupled with the head of the subject.

Another objective is to enhance an audio output from a speaker in a loud environment, when the speaker is placed near to an ear of a subject.

Yet another objective is to provide a simplified and reliable speaker.

The above objectives are wholly or partially met by devices, systems, and methods according to the appended claims in accordance with the present disclosure. Features and aspects are set forth in the appended claims, in the following description, and in the annexed drawings in accordance with the present disclosure.

According to a first aspect there is provided, a control system for rendering an audio stream on a speaker from one or more input signals, the control system including an estimator with one or more state estimating models, each state estimating model configured to accept one or more of the input signals, and/or one or more feedback signals, and to generate one or more estimated states therefrom, one or more of the state estimating models configured to estimate one or more proximity states, the proximity states related to an orientation, acoustic volume, and/or acoustic coupling of the speaker to a nearby object, and a control block including a control algorithm configured to accept one or more of the input signals and/or delayed versions thereof, and the proximity states and/or one or more signals generated therefrom, and to generate the audio stream therefrom.

In aspects, the proximity state estimating model may include an adaptive feed forward model in accordance with the present disclosure. In aspects, the proximity state may be reflective of an acoustic coupling between the speaker and the object, an acoustic leakage between the speaker and the object, an acoustic load on the speaker, an acoustic volume between the speaker and the object, an alignment between the speaker and the object, the proximity or distance of the speaker to the object, a tightness of fit between the speaker and the object, a state of cleanliness of the speaker, a combination thereof, or the like.

In aspects, the control system may be configured to perform the rendering at a first rate, and the control system may include a feedback algorithm, the feedback algorithm coupled to a feedback sensor configured to generate at least a portion of the feedback signal, the feedback algorithm configured to update the proximity state estimating model, the proximity state estimating model updated at a substantially slow rate, compared with the first rate.

In aspects, the feedback sensor may be a microphone, a speaker impedance sensor, a current sensor, a voltage sensor, a coulomb counting sensor, a pressure sensor, a humidity sensor, an infrared proximity sensor, a thermal sensor, a colorimetric sensor, an imaging sensor, a combination thereof, or the like.

In aspects, the feedback sensor may be a microphone, the microphone located in close proximity to both the speaker and the object. In aspects, the microphone may be located substantially between the speaker and the object. Such a configuration may be advantageous to estimate the acoustic volume formed between the speaker and the object.

In aspects, the system may include a model for estimating an acoustic pressure between the object and the speaker, estimating the acoustic leakage, and/or acoustic volume between the object and the speaker, or the like, in accordance with the present disclosure.

In aspects, the microphone and the speaker may be included in a handset, the handset including regions including a mouthpiece and an ear piece, the microphone and the speaker situated near the ear piece. By ear piece is meant a region of the handset that is meant to be placed against an ear of a subject during use. By mouthpiece is meant a region of the handset that is meant to acoustically interface with the mouth of a subject during use. In aspects, the microphone may be located substantially far away from the speaker and/or the object.

In aspects, the microphone and the speaker may be included in a handset, the handset in accordance with the present disclosure, the microphone situated near the mouthpiece, and the speaker situated near the ear piece.

In aspects, the speaker may be operated in a sensing mode, the coulomb transfer to/from, current to/from, and/or voltage across the speaker providing the feedback signal or a portion thereof.

In aspects, the control system may be coupled to a diagnostic speaker (or the speaker may be operated as a diagnostic speaker), the control system configured to render a diagnostic audio stream on the diagnostic speaker, the feedback sensor configured to generate a feedback signal related to the diagnostic audio stream, the feedback algorithm configured to analyze the diagnostic audio stream and the feedback signal to calculate the proximity state.

In aspects, control system may include an excursion state estimating model, configured to estimate an excursion state of the speaker, the excursion state used to update the proximity state estimating model.

In aspects, the feedback signal may be related to a background noise level in the vicinity of the speaker and/or the object, the control system configured to adjust the audio stream in accordance with one or more characteristics of the background noise.

In aspects, the feedback signal may be related to a background noise level in the vicinity of the speaker, the changes in background noise level used in estimating one or more of the proximity states. The system may include a background noise level analyzing function, wherein the analyzing function estimates one or more characteristics of the background noise level (e.g. amplitude, power level, spectrum, low frequency component, high frequency component, noise in an audio band, noise in a voice band, etc.) from the feedback signal, and sets a control parameter related to one or more of the characteristics.

In aspects, the control system, and the speaker may be included in a handset, the handset in accordance with the present disclosure, the speaker situated near the ear piece, the handset including one or more sensors to obtain one or more of the feedback signals, a first feedback signal relating to background noise in the vicinity of the speaker, between the speaker and the object, and/or in the vicinity of the ear piece, and a second feedback signal relating to background noise in the vicinity of the mouthpiece, and/or from a remote location, the control system configured to measure one or more differences between the first and second feedback signals, the differences used in the estimation of one or more of the proximity states.

In aspects, the control system may be configured to coordinate production of the diagnostic signals, and capture of the feedback signals, such that the feedback signals are related to the diagnostic signals.

According to aspects there is provided, a control system for rendering an audio stream on a speaker from one or more input signals, the control system including one or more feedback sensors configured to generate one or more feedback signals, each feedback signal influenced by a proximity of the speaker to a nearby object, a proximity estimating block coupled with the feedback sensor(s), the proximity estimating block configured to accept the feedback signal(s) and to generate a proximity model, and a control block including a control algorithm configured to accept one or more of the input signals and/or delayed versions thereof, and the proximity model and/or a signal generated therefrom, and to generate the audio stream therefrom.

In aspects, the proximity model may be reflective of an acoustic coupling between the speaker and the object, an acoustic leakage between the speaker and the object, an acoustic volume between the speaker and the object, an acoustic load on the speaker, an alignment between the speaker and the object, the proximity or distance of the speaker to the object, a tightness of fit between the speaker and the object, a state of cleanliness of the speaker, a combination thereof, or the like. In aspects, the system may be configured such that the rendering is updated at a first rate and the proximity model updated at a substantially slower rate compared to the first rate.

In aspects, one or more of the feedback sensors may be a microphone, a speaker impedance sensor, a current sensor, a voltage sensor, a coulomb counting sensor, a pressure sensor, a humidity sensor, an infrared proximity sensor, a thermal sensor, a colorimetric sensor, an imaging sensor, a combination thereof, or the like.

In aspects, one of the feedback sensors may be a microphone, the microphone located in close proximity to both the speaker and the object. In aspects, the control system, the microphone, and the speaker are included in a handset in accordance with the present disclosure, the handset including regions including a mouthpiece, and an earpiece, the microphone and the speaker situated in the vicinity of the earpiece.

In aspects, one of the feedback sensors may be a microphone, the microphone located substantially far away from the speaker and/or the object. In aspects, the control system, the microphone and the speaker may be included in a handset, with regions including a mouthpiece and an ear piece, the microphone situated near the mouthpiece, and the speaker situated near the ear piece.

In aspects, the control system may be coupled to a diagnostic speaker, the control system configured to render a diagnostic audio stream on the diagnostic speaker, one or more of the feedback sensors configured to generate at least a portion of a feedback signal related to the diagnostic audio stream, the feedback algorithm configured to analyze the diagnostic audio stream and the feedback signal to calculate the proximity parameter.

In aspects, the diagnostic speaker may be located near the mouthpiece, and the one or more of the feedback sensors is located near the mouthpiece and/or the earpiece.

In aspects, control system may include an excursion state estimating model configured to estimate an excursion parameter, an excursion model, and/or state of the speaker, the excursion parameter, the excursion model, and/or state used to update the proximity model. In aspects, the control system may be configured to throttle the audio stream based on the proximity model or a signal generated therefrom.

In aspects, one of the feedback sensors may be an imaging sensor, the imaging sensor configured to capture one or more images of the object, the control system including an image processing algorithm, the image processing algorithm configured to generate one or more of the feedback signals from the images, one or more of the feedback signals relating to alignment of the object to the speaker, proximity of the object to the speaker, an anatomical characteristic of the object, one or more changes in the object, or a combination thereof. In aspects, the object maybe an ear, a head, a face, a neck of a subject, or the like.

According to aspects there is provided, a handset including a speaker configured to render an audio stream for a user, a control system in accordance with the present disclosure coupled to the speaker, the control system configured to accept one or more input signals and to produce the audio stream or signal related thereto.

In aspects, the handset may include a wireless connection to a cloud-based database, the audio stream, proximity estimating model, object images, feedback signal, and/or one or more signals related thereto stored in the cloud-based database.

According to aspects there is provided, a method for rendering an audio stream on a speaker near an object including accepting one or more input signals including an audio stream, estimating a proximity state relating to an orientation, distance, bias pressure, an acoustic volume, and/or acoustic coupling between the speaker and the object; and altering the audio stream based upon the proximity state.

In aspects, the method may include estimating the proximity state with a plurality of proximity models, and determining which estimated speaker states best represents proximity between the speaker and the object.

In aspects, the step of altering the audio stream may include limiting the audio stream based upon the value of the estimated proximity state.

In aspects, the estimating may include measuring a signal from one or more feedback sensors, wherein one or more of the sensors is a microphone, a speaker impedance sensor, a current sensor, a voltage sensor, a coulomb counting sensor, a pressure sensor, a humidity sensor, an infrared proximity sensor, a thermal sensor, a colorimetric sensor, an imaging sensor, a combination thereof, or the like.

In aspects, the method may include measuring a feedback signal from the speaker, and the estimating step is dependent at least in part upon the feedback signal.

In aspects, the method may include calculating proximity estimates and speaker output estimates from corresponding model pairs, comparing the output estimates from each model pair with a feedback signal from the speaker and/or feedback sensor to select the best model pair, and selecting the best estimated proximity state from the best model pair.

In aspects there is provided, a speaker control system for producing a rendered audio stream from one or more input signals including an estimator including one or more state estimating models, each state estimating model configured to accept one or more of the input signals, and to generate one or more estimated states therefrom; and a speaker protection block configured to accept one or more of the input signals and/or delayed versions thereof and the estimated states and/or signals generated therefrom, and to produce an output signal from a combination thereof.

In aspects, the speaker protection block may include a compressor, a limiter, a clipper, or the like in order to produce the output signal. One or more characteristics of the compressor/limiter/clipper (e.g., gain, cutoff amplitude, threshold for compression, etc.) may be dependent upon the estimated states, and applied to the input signal.

In aspects, the system may include a selector in accordance with the present disclosure coupled to the estimator and the speaker protection block, configured to analyze one or more of the estimated states and/or state estimating models, and to generate an estimating signal therefrom, the speaker protection block configured to use the estimating signal in the production of the output signal.

In aspects, the selector may be configured to select the worst case estimated state from the estimated states, the estimating signal dependent upon the worst case estimated state.

In aspects, the system may include a feedback block in accordance with the present disclosure coupled to an associated speaker, the estimator, and/or the selector, configured to provide one or more feedback signals from the speaker to the selector, the selector configured to use one or more of the feedback signals in the generation of the estimating signal.

In aspects, the system may include a feedback block in accordance with the present disclosure coupled to an associated speaker and/or driver configured to provide one or more feedback signals or signals generated therefrom to the system, a model bank including a group of models each with associated characteristics, and a selector coupled to the feedback block, the model bank, and the estimator, the selector configured to accept one or more of the feedback signals or signals generated therefrom, to calculate one or more measured characteristics from the feedback signals, to compare one or more model characteristics to the measured characteristics to select a best fit model from the model bank, and to load, enable, and/or select an associated best fit model for operation within the estimator.

In aspects, some non-limiting examples of characteristic and/or feedback signal include one or more forms of feedback (e.g., current, voltage, impedance characteristics, excursion levels, voice coil temperature, microphone feedback, histories thereof, etc.), device level feedback (e.g., acceleration, rotational movement, user settings, histories thereof, etc.), ambient feedback (e.g., temperature, humidity, altitude, local pressure, histories thereof, etc.). In aspects, the characteristic may be related to speaker impedance and the estimated state may be related to speaker excursion.

In aspects, the system may include a feedback block in accordance with the present disclosure coupled to an associated speaker and/or driver, configured to provide one or more feedback signals or signals generated therefrom to the system, a model bank in accordance with the present disclosure including a group of feedback estimating models each associated with a corresponding state estimating model, and configured to calculate a value from one or more of the input signals, and a selector coupled to the feedback block, the model bank, and the estimator, the selector configured to compare one or more of the values to the feedback signals to select a best fit feedback estimating model from the model bank, the selector configured to load, enable, and/or select the corresponding best fit state estimating model for operation within the estimator.

In aspects, the feedback signals may be related to speaker current and/or voltage, and the estimated state may be related to speaker excursion.

In aspects, the protection block may include a compressor and/or limiter configured to accept the input signals, the compressor and/or limiter including one or more properties, one or more of which may be configured by the estimated states and/or estimating signal.

In aspects, one or more components of the system may be configured to accept a power constraint from an external power manager and/or to generate a power prediction. In aspects, the power constraint and/or power prediction may be used in the generation of the output signal.

In aspects, the power protection block may be configured to accept a kinetic feedback signal representative of the movement of the speaker within an environment, and to use the kinetic feedback signal in the generation of the output signal.

In aspects, some non-limiting examples of kinetic feedback signals include a linear acceleration, a rotational motion, a pressure change, a free-fall condition, an impact, or the like.

DETAILED DESCRIPTION

Figure 1:
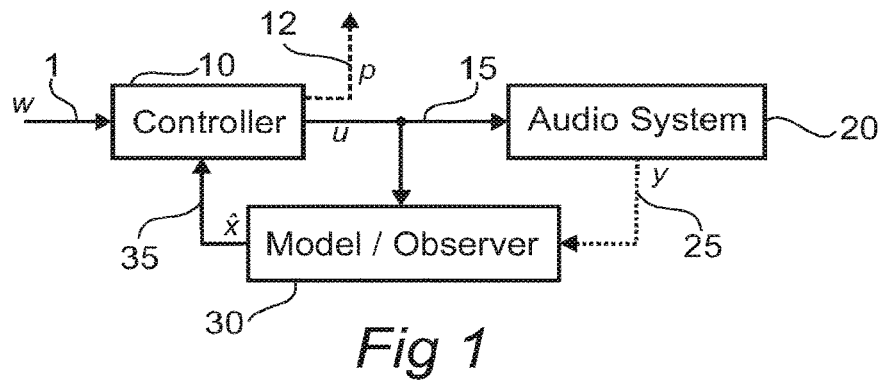
FIG. 1 shows a schematic of a nonlinear control system in accordance with the present disclosure.

Particular embodiments of the present disclosure are described herein with reference to the accompanying drawings; however, the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. Like reference numerals may refer to similar or identical elements throughout the description of the figures.

The term consumer electronic device is meant to include, without limitation, a cellular phone (e.g., a smartphone), a tablet computer, a laptop computer, a portable media player, a television, a portable gaming device, a gaming console, a gaming controller, a remote control, an appliance (e.g., a toaster, a refrigerator, a bread maker, a microwave, a vacuum cleaner, etc.) a power tool (a drill, a blender, etc.), a robot (e.g., an autonomous cleaning robot, a care giving robot, etc.), a toy (e.g., a doll, a figurine, a construction set, a tractor, etc.), a greeting card, a home entertainment system, an active speaker, a media accessory (e.g., a phone or tablet audio and/or video accessory), a sound bar, and so forth.

The term speaker is meant to include, without limitation, a component for rendering audio, a speaker, a receiver, or the like. In aspects, a speaker may be configurable, such that it may be used as a microphone for monitoring an adjacent acoustic field. In aspects, a speaker may be used to render an audio stream for a user, and/or produce an acoustic watermark, intended for calibration, feedback, determination of an acoustic impedance, an acoustic coupling, an acoustic volume between the speaker and a surface, proximity of a surface to a speaker, etc. In aspects, a receiver may be directed towards a speaker for placement near an ear of a user, within an ear facing component of a consumer device, within an earpiece, etc.

The term input audio signal is meant to include, without limitation, one or more signals (e.g., a digital signal, one or more analog signals, a 5.1 surround sound signal, an audio playback stream, etc.) provided by an external audio source (e.g., a processor, an audio streaming device, an audio feedback device, a wireless transceiver, an ADC, an audio decoder circuit, a DSP, etc.).

The term acoustic signature is meant to include, without limitation, the audible or measurable sound characteristics of a consumer electronic device and/or a component thereof (e.g., a speaker assembly, with enclosure, waveguide, etc.) dictated by its design that influence the sound generated by the consumer electronic device and/or a component thereof. The acoustic signature may be influenced by many factors including the speaker design (speaker size, internal speaker elements, material selection, placement, mounting, covers, etc.), device form factor, internal component placement, screen real-estate and material makeup, case material selection, hardware layout, and assembly considerations amongst others. Cost reduction, form factor constraints, visual appeal and many other competing factors are favored during the design process at the expense of the audio quality of the consumer electronic device. Thus, the acoustic signature of the device may deviate significantly from an ideal response. In addition, manufacturing variations in the above factors may significantly influence the acoustic signature of each device, causing further part to part variations that degrade the audio experience for a user. Some non-limiting examples of factors that may affect the acoustic signature of a consumer electronic device include: insufficient speaker size, which may limit movement of air necessary to re-create low frequencies, insufficient space for the acoustic enclosure behind the membrane which may lead to a higher natural roll-off frequency in the low end of the audio spectrum, insufficient amplifier power available, an indirect audio path between membrane and listener due to speaker placement often being on the back of a TV or under a laptop, relying on reflection to reach the listener, among others factors.

An acoustic signature may be influenced by one or more environmental aspects, such as the proximity of a component to a surface (e.g. an ear, a face, a thumb pad, etc.), degree of coupling with the ear of a subject (i.e. the extent of the gasket formed when the component is coupled to the ear), temperature, humidity, aging, dust accumulation, etc. In aspects, the degree of coupling with an ear may be influenced by such factors as the positioning of the component near the ear, the anatomy of the ear, clothing and/or jewelry worn on or around the ear, the pressure with which the component or device is pressed against the ear, and the like.

An acoustic signature may include one or more nonlinear aspects relating to material selection, design aspects, assembly aspects, etc. that may influence the audio output from the associated device, causing such effects as intermodulation, harmonic generation, sub-harmonic generation, compression, signal distortion, bifurcation (e.g., unstable states), chaotic behavior, air convective aspects, and the like. Some non-limiting examples of nonlinear aspects include eddy currents, cone positional nonlinearities, coil/field nonlinearities, DC coil displacement, electromechanical nonlinearities (e.g., magnetic and/or E-field hysteresis), viscoelastic and associated mechanical aspects (e.g., suspension nonlinearities, nonlinear damping, in the spider, mounting frame, cone, suspension geometry, etc.), assembly eccentricities, driver characteristics, thermal characteristics, acoustic radiation properties (e.g., radiation, diffraction, propagation, room effects, convection aspects, etc.), audio perception characteristics (e.g., psychoacoustic aspects), and the like.

Such nonlinear aspects may be amplitude dependent (e.g., thermally dependent, cone excursion dependent, input power dependent, etc.), age dependent (e.g., changing over time based on storage and/or operating conditions), operating environment dependent (e.g., based on slow onset thermal influences), aging of mechanical and/or magnetic dependent (e.g., depolarization of associated magnetic materials, aging of rubber and/or polymeric mounts, changes associated with dust collection, etc.), dependent upon part-to-part variance (e.g., associated with manufacturing in precision, positioning variance during assembly, varied mounting pressure, etc.), dependent on coupling with a nearby object (e.g. an ear, a head, a face, etc.), and the like.

A control system in accordance with the present disclosure may be configured to compensate for one or more of the above aspects, including during playback of a general audio stream. Such nonlinear control systems may be advantageous to effectively extend the audio quality associated with an audio stream to the limits of what the associated hardware can handle.

In aspects, a control system in accordance with the present disclosure may be configured to compensate for acoustic impedance variation associated with coupling between one or more components (e.g. a transducer, a speaker, a receiver, a microphone, etc.) and one or more key surfaces (e.g. an ear, a face, a head, a door lock, etc.), during use in an environment (e.g. during casual use in a noise environment, during a phone call, etc.). In such aspects, the control system may compensate by estimating the acoustic impedance between component and the surface, acoustic leakage between the component and the surface, acoustic load on the component caused by being in close proximity to the surface, etc. In aspects, such compensation may be determined by measuring one or more current and/or voltage parameter on the component during use, and/or capturing one or more acoustic signal on one or more associated components, and estimating the acoustic impedance or a variation in the acoustic impedance therefrom using one or more algorithms as described herein.

In aspects, the control system may be configured to accept an acoustic feedback signal from a microphone on the consumer electronic device (e.g. a microphone positioned near the mouthpiece, a microphone positioned near the earpiece, etc.). The feedback signal may be directed into an algorithm for assessing background noise, removing background noise, assessing acoustic impedance, a coupling between a speaker and a microphone, etc. In aspects, such feedback may be incorporated into a parametric extraction algorithm, configured to accept the feedback signal and generate a control parameter related to the environment, acoustic coupling, surface proximity of a speaker, degree of gasket, speaker excursion, of the like. Relating to feedback to assess background noise, the control system may be configured to generate a control parameter related to the level or a characteristic of the background noise, to adjust an acoustic gain parameter based on the level of the background noise, etc.

In aspects, a handset in accordance with the present disclosure may be configured for placement up to the head of a subject. For the sake of discussion, a handset may include a region labeled as an earpiece, the earpiece being that region of the handset that is meant to be coupled to the ear of the subject during use. The handset may also include a region labeled as a mouthpiece, the mouthpiece being that region of the handset that is meant to interface with the mouth of the subject.

In some applications, operational stresses on one or more elements of a speaker may be estimated by prediction of the temperature of the speaker in service. In many cases, to adequately protect the speaker, the speaker temperature may be measured with an accuracy of approximately +/−5 degrees centigrade. Oftentimes, the maximum allowed speaker coil temperature is typically 105 degrees centigrade while a typical operating temperature may be 80-90 degrees centigrade. Thus, a reasonably small operating window may exist within which to manage heat dissipation of the speaker (roughly 10-20 degrees centigrade). As a result, an accurate temperature measurement for the speaker coil may be advantageous in a practical speaker protection system.

Often, the temperature changes in a speaker may be estimated by calculating the DC resistance of the speaker. This resistance is dependent on the temperature as a result of the temperature coefficient of the wire used for the speaker coil. However, the impedance may vary dramatically due to process variations during production. For a typical mobile phone speaker, the nominal resistance may vary by approximately +/−10 percent (e.g., for typical temperature dependence values, will lead to a temperature offset of approximately +/−25 degrees Centigrade).

In aspects, a speaker protection system and a speaker control system are disclosed including an excursion estimator (e.g., an estimate for the voice coil excursion of an associated speaker). In aspects, the excursion estimator may include or be coupled to a plurality of models, each model configured to estimate a speaker excursion parameter. In aspects, the plurality of models may be derived for a class of speakers (e.g., units produced within a particular product family, selected from manufacturing based testing of a product, or product family, etc.). The models may be configured to estimate speaker excursion from an input signal. In aspects, the excursion estimator may select a worst case model (or the worst case output from the plurality of models at any given time in order to make a worst case estimate). In aspects, a feedback signal (e.g., a voltage, and/or current feedback, a device characteristic, etc.) may be extracted from or measured on the speaker during operation and compared (e.g., within the estimator) with one or more of the models, so as to select a best fit model from the plurality of models to represent the device at any given time during operation thereof. In aspects, the excursion parameter may be combined with the feedback to determine a proximity model, related to the distance, orientation, acoustic coupling, etc. between the speaker and a nearby surface, such as an ear of a subject.

In aspects, a speaker protection system and/or control system in accordance with the present disclosure may be configured in an entirely feed-forward or adaptive feed-forward fashion. In such a configuration, an excursion estimation of the speaker may be made from one or more of the estimators without explicit excursion feedback from the speaker or an associated driving circuit (e.g. such as via measurement of one or more characteristic associated with the electrical impedance of the speaker, via one or more audio feedback signals, etc.). The same control system may be configured to generate an acoustic quality control parameter from the same feedback signal, and adjust an audio stream rendered on the speaker so as to improve sound quality for an associated user.

Relating to speaker protection, a plurality of models may be selected so as to ensure, for a given device or device family, that the estimated excursion (e.g., from one or more of the models) is always a worst case condition. Such a configuration may be advantageous for providing speaker protection without the need for additional feedback related hardware, and/or additional computational resources (e.g., additional computational resources required for, real-time computation of models, spectral model calculation, testing procedures, etc.).

In aspects, the plurality of models may be generated during manufacture, updated post launch, etc. In aspects, a virtual model library may be generated and updated throughout the lifetime of the product. In such a configuration, the virtual model library may be updated, sub-classes of models from the library may be sent to devices in the field (e.g., as part of an update procedure, etc.). In aspects, sub-classes of models may be defined based upon manufacturing lots, aging related feedback (e.g., changes in impedance over time), user usage case classification (e.g., heavy user, mobile user, extreme user, light user, etc.). Such an update may be performed as part of a firmware update, as a way of preventing degradation of the speaker (e.g., to reduce the speaker output for a certain sub-class, or user class, etc., so as to extend working life, or reduce in-field failures, etc.). In aspects, the models that may be loaded onto a device could be derived from sub classes associated with a product ID number (e.g., a known manufactured batch of speakers, etc.).

In aspects, the system may include one or more models representative of a common failure mode (e.g., over-excursion related damage, heating related property changes, fatigue related damage, impact related damage, leakage related failure, adhesive detachment, etc.). In aspects, the system may include a test process to determine if an associated speaker unit is operational, or if the speaker unit has failed, perhaps due to an event, wear-and-tear, etc.

In aspects, one or more of the models may include a failure mode model for a leaking case scenario. Such a configuration may be advantageous in debugging failures associated with other aspects of the device (e.g., such as a leaky phone case, etc.) which may impact the performance of the speaker.

In aspects, one or more of the models may include a free air test condition (e.g., performed over a range of temperatures), and/or a blocked vent condition such that a range of failures may be predicted without excessive computational effort or complex models.

In aspects, one or more models may be updated during use. In one non-limiting example, a model for the acoustic impedance, acoustic coupling between an earpiece speaker and a mouthpiece microphone, acoustic coupling between an earpiece speaker and an earpiece microphone, an assessment of background noise, and/or a parameter representative of the receiver-to-ear gasket may be generated in real-time or pseudo real-time, and one or more control algorithms updated in the system so as to advantageously adjust an audio stream during rendering to adjust for one or more receiver-to-ear positioning effects, so as to maintain the audio quality of the audio stream delivered to the ear of the subject, the removal of background noise from the audio stream, limiting of the associated speaker excursion so as to limit the possibility of damaging the associated speaker and/or the eardrum of the ear to which the speaker has been placed.

In aspects, during periods of time, it may be the case that the control and/or protection system may not successfully identify the desired system states, a best fit may not be determined, etc. Such a condition may occur, for example, if the speaker properties change dramatically during use (e.g., if the speaker gets blocked, damage occurs due to an impact, an output vent becomes plugged, a finger covers an output vent, etc.). The system, selector, and/or protection block, may include a safe operating condition into which it may operate during such periods. In aspects, the safe operating mode may include over estimating the speaker states from the estimates, summing the estimates to form a worst case state estimate, assessing a group of damage models, diagnosing the condition, running a test, uploading one or more state estimates to a data center, or the like. The system may be configured to continue assessing the states, and/or characteristics during such a period to determine if the system has returned to a normal operating state.

In aspects, the feedback signal may be used within or in communication with the estimator to compare one or more speaker characteristics with those predicted by and/or associated with one or more of the models to determine the best fit to the actual device at any given period in time. In aspects, the estimator may include means for loading the best fit model into a real-time estimator block, for selecting between two or more "nearest" fit models, etc. Such a configuration may be advantageous for effectively forming a worst case excursion estimate while operating with very little computational overhead. In aspects, the selection process may be adaptive, may be performed within a cloud service (e.g., offloaded from a user device), etc.

In aspects, there is provided a method for tracking field operation of audio devices and/or maintaining suitable operation thereof throughout their intended lifetime, including periodically collecting feedback signals from a plurality of devices in the field, analyzing the feedback to compare each individual device against a master model set, and updating a device in the field based upon the feedback signal and/or the comparison. In aspects, such feedback signal collection may include collecting speaker feedback (e.g., current, voltage, impedance characteristics, excursion levels, voice coil temperature, microphone feedback, histories thereof, etc.), device level feedback (e.g., acceleration, rotational movement, user settings, histories thereof, etc.), ambient feedback (e.g., temperature, humidity, altitude, local pressure, histories thereof, etc.). One or more of the collected signals may be used in the analysis or in comparison with the master model set, etc.

In aspects, a system in accordance with the present disclosure may include calculating a device and/or device-environment coupled characteristic such as impedance, resonant frequency, quality factor, resistance, etc. and monitor how that characteristic changes over time (e.g., as implemented as part of a specific test protocol, as part of a slow extraction algorithm, peak finding algorithm, or the like). In aspects, the system may be configured to periodically compare the measured characteristic with the characteristics of the model class (e.g., the plurality of representative models) to better pick a nearest estimator, which may then be used to (potentially gradually) update an estimator, which may be running all the time in parallel. In aspects, changes in the characteristic, changes in the selected model, etc. may be relayed to a data center (e.g., a cloud based data center, etc.) for feedback, product decision making, consideration of updates, etc.

In aspects, the system may be configured to predict a parametric relationship, such as an ear-gasket parameter from the calculation. Such a parametric relationship may be used to update a control algorithm, a transfer function, or the like, so as to adjust the acoustic output of the device accordingly during use. In aspects, the system may be configured to monitor impedance on the receiver coupled with the ear. A map, look-up table, or the like may be provided to correlate one or more aspects of the measured impedance to an ear-gasket parameter. Such a map may be generated during development, during testing on a head and torso simulator (HATS), from real-time feedback on consumer use and field testing, etc. In aspects, the system may include a proximity sensor (e.g. an infrared sensor positioned near the receiver, etc.), configured so as to measure an ear-receiver feedback parameter (e.g. distance to the ear, proximity to the ear, local signal associated with positioning of the proximity sensor next to associated ear tissues, etc.).

The resulting proximity feedback parameter may be used to index into the impedance look-up table, so as to update one or more control parameters, to adjust an output parameter from the associated receiver, transducer, speaker, or the like.

In aspects, the system, handset, etc. may include one or more additional receivers (e.g. microphones, speakers, etc.), such as are becoming more common on handsets and tablets. One non-limiting example is a handset with stereo configurable transceivers (i.e. a handset with configurable microphones/speakers positioned at each end thereof). In such a configuration, the transceivers may be configured in speaker and/or microphone mode so as to establish the degree of ear-gasket formed during use. In one non-limiting example, a handset with a speaker positioned to interface with the ear of a subject, and a microphone positioned so as to interface with the mouth of a subject, may be configured such that the microphone records the audio stream generated by the speaker during use. The recorded audio stream may be coupled to an adaptive algorithm to predict the acoustic transfer function between the speaker and the microphone. The resulting acoustic transfer function may be related to the ear-gasket formed between the speaker, the handset, and the ear of the subject at any particular time during use. One or more aspects of the predicted acoustic transfer function may be used to index a look-up table of control parameters, parametrically alter a control parameter, used to select a transfer function, or the like during use. Thus an adaptive means for adjusting the audio output of the speaker without the need for additional hardware may be achieved.

In aspects, on a handset with configurable receivers, the ear-side receiver may be configured as a microphone, and the mouth side receiver may be configured as a speaker, or vice versa. The generated audio stream recorded with the corresponding microphone and used to generate the corresponding acoustic impedance, and/or parameter there between. Such a configuration may be advantageous to estimate the extent of the gasket between the ear and the device at any given time during use. Once the extent of the gasket is estimated, it may be used as part of an adaptive control parameter, as an index to a look-up table, etc. so as to adjust the audio stream, so as to maintain sound quality perceived by the subject during use.

In aspects, a system in accordance with the present disclosure may include an adjustable compressor configured to clamp the input signal or a signal generated therefrom, the compressor configured to adjust a degree of clamping based upon the estimated excursion, a system event (e.g., a jolt, a free-fall condition, an impact condition, change in an ambient parameter, etc.), a device input (e.g., acceleration, microphone measured audio output, etc.), an environmental input (e.g., a change in local pressure, etc.).

In aspects, the degree of signal compression may be influenced by an event, such as an impact, a free fall condition (e.g., in anticipation of an impact), establishment and/or loss of an ear-device gasket, etc. Upon detection of such a condition, the compressor may be configured to clamp the input signal or a signal generated therefrom before sending the clamped signal onwards toward the associated speaker. In aspects, the clamping may be gradually released after the event (baring an additional related event), so as to slowly bring the speaker back to an optimal state of operation. In aspects, a related system may include functionality for testing the device post event, etc. in order to determine if any properties thereof have changed due to the event itself.

In aspects, an event may include receiving a free-fall condition from an associated accelerometer, receiving an impact condition (e.g., an impact of greater than 5G, greater than 10G, etc.), identifying placement of the speaker against a surface, establishment of a substantial ear-device gasket (e.g., establishment of a partial gasket to an ear, establishment of a substantially complete gasket to an ear, etc.). During as well as after such events, the system may be configured to clamp the speaker output and gradually relax that compression, so as to suppress an unstable operating mode (e.g., such as a rocking mode, which may be excited during the event). In aspects, such events (e.g., free-fall, impact, etc.) may be relayed via the associated sensor itself, as an interrupt flag, etc. (e.g., as a "free-fall" related system interrupt, etc.).

In aspects, there is provided a method for testing a device to determine the appropriate excursion estimating models for implementation thereupon. The method may include capturing an input/output history during a period of operation (e.g., during a period of heavy usage, during a period of normal usage, during an ear positioning test procedure, during a self-diagnostic test, during music playback, etc.). The captured histories may be compared against master models for the device family to determine the most appropriate model sub-class for the device. In aspects, the test procedure may be used to select and/or enable one or more appropriate excursion models for predicting the excursion of a particular speaker. In aspects, the test procedure may be performed remotely from the device (e.g., offloaded histories may be analyzed in a data center, a cloud service, etc.). In aspects, the procedure may include updating the master models, performing a device upgrade, etc.

In aspects, there is provided an ear positioning test procedure, the procedure including prompting a user to orient a handset to the ear thereof, and/or to adjust the positioning of the handset to the ear, to play and/or record an audio stream during the test, and to establish a "preferred positioning" between the handset and the ear, to establish a set of acoustic impedance models/parameters associated with multiple "preferred positions", etc. One or more models established during such testing may be used to generate an initial model bank, one or more parameters in a look-up table, one or more datasets reported to a cloud-based data center, etc. One or more of the models/parameters may be used as the initial basis for adjusting a future audio stream played to the subject. In aspects, one or more acoustic impedance models may be generated and/or updated in real-time or pseudo real-time during use, updated over time to reflect changing user habits, etc.

In aspects, during an ear positioning test procedure, proximity information may be obtained from an associated proximity sensor or the like. Along with other measured information (such as current, voltage, calculated impedance, etc.). The proximity sensor may be configured to monitor a signal related to the positioning of the headset and/or transceiver to the ear and/or face of the subject, a near-field positioning aspect of the handset against the ear, relate a contact pressure (e.g. such as is determined by a reflected light measured by the proximity sensor when the device is pressured against a tissue surface, etc.). In aspects, the proximity sensor signal may be provided as an input to an associated look-up table, as model parameter, etc. in conjunction with transducer impedance estimates, etc.

In aspects, the handset may include an image sensor (e.g., a front facing camera, etc.), for obtaining information about a subject during use. In aspects, the ear positioning test may include capturing one or more images of the ear of the subject. The image(s) may be correlated against an anatomical reference database, or the like. The resulting gasket models, and/or acoustic impedance profiles may be compared against population norms from the anatomical reference database. In this aspect, a big data relationship between acoustic impedance measurements, ear gasket measurements, etc. may be correlated with anatomical statistics such as ear shape, relative handset to ear positioning, etc. Such information may be useful for generating deep learning algorithms, generating more accurate model parameters, establishing user specific master models, from which to orient an adaptive model (i.e., so as to limit the amount of adaptation necessary in order to optimize the sound quality for a subject during use, etc.).

In aspects, one or more master models may be constructed from manufacturing based sample testing, from an ear positioning test procedure, from a HATS test protocol, from virtualized testing wherein the tolerances (e.g., from the speaker manufacturer's test data, characterization data, etc.), from a population database, wherein one or more speaker parameters (e.g., force factor, compliance, and other Thiele-Small parameters, etc.) may be entered into an associated simulator (e.g., within a system characterization toolkit, etc.) to generate the corresponding master model set. Thus, a master model set may be constructed from a combination of limited real-world tests (e.g., from 10-100 production units, etc.), and a combination of statistical or measured tolerance ratings (e.g., from a speaker manufacturer, from excursion and impedance curves), from realistic user generated data, with the respective T.S. parameters for associated models. Thus, the simulator may be configured to vary one or more of the basic parameters within the tolerance limits and perform one or more (e.g., tens, thousands, etc.) of virtual measurements following the behavior of the real measured production units.

In aspects, the test procedure may include one or more system and/or speaker nonlinearities. For example, and without limitation, in the test procedure, the compressor nonlinearities could be considered (e.g., estimator outputs could be run through the compressor to get more accurate values). So as to provide more accurate sub-class estimates for a particular device in the field, etc.

In aspects, there is provided a cloud service configured to collect input/output histories, and/or configuration data from one or more devices in the field (e.g., post purchase), during a routine update check, etc. In aspects, the cloud service may be configured to generate one or more device characteristics (e.g., impedance curves, speaker parameters, ear-device acoustic impedance estimates, etc.), and compare the obtained information with one or more metrics (e.g., characteristics related to device failures, lifetimes, aging criteria, groups of failure prone devices, etc.) so as to improve estimation models (e.g., sent to the devices as updates, etc.), to improve acoustic quality among a population base, to categorize a particular device in terms of aging, predicting lifetime, classifying failure types, predicting failure types, classifying user types (e.g., heavy, light users, etc.), combinations thereof, or the like.

In aspects, such information may be used to determine how device characteristics change over time (e.g., how speaker compliance, resonant modes, etc. age with use), and may be used as part of a field update process in order to counteract impending failures (e.g., predict based on the collected data, which devices are likely to fail in the field and alter the estimators or clamping parameters associated therewith in order to circumvent failure, extend device lifetimes, etc.).

FIG. 1 shows a schematic of a control system (e.g. an acoustic control system, a nonlinear control system, etc.) in accordance with the present disclosure. The nonlinear control system includes a controller 10 configured to accept an input signal 1 from an audio source (not explicitly shown) and one or more states 35. The system may include a model and/or observer 30 (referred to herein as model 30 for the sake of discussion), configured to generate the states 35. The controller 10 may generate one or more control signals 15 to drive an associated audio system 20. The control signals 15 may be fed to the model 30 for inclusion into the estimation of the states 35. The audio system 20 may produce one or more feedback signals 25, which may be directed to the model 30 for use in generating the states 35.

In aspects, the controller 10 may be configured to produce a system feedback signal 12 for delivery to one or more related systems such as a power management system (not explicitly shown). In aspects, the system feedback signal 12 may be a prediction of future power usage by the audio system 20. Such a system feedback signal 12 may be used by one or more related systems (e.g., a power management system) to control power distribution, to balance power among other system components, etc.

The controller 10 may include a control strategy based upon one or more of adaptive control, hierarchical control, neural networks, Bayesian probability, backstepping, Lyapunov redesign, H-infinity, deadbeat control, fractional-order control, model predictive control, nonlinear damping, state space control, fuzzy logic, machine learning, evolutionary computation, genetic algorithms, optimal control, model predictive control, linear quadratic control, robust control processes, stochastic control, combinations thereof, and the like. The controller 10 may include a full non-linear control strategy (e.g., a sliding mode, bang-bang, BIBO strategy, etc.), as a linear control strategy, or a combination thereof. In one non-limiting example, the controller 10 may be configured in a fully feed-forward approach (e.g., as an exact input-output linearization controller). Alternatively, additionally or in combination, one or more aspects of the controller 10 may include a feedback controller (e.g., a nonlinear feedback controller, a linear feedback controller, a PID controller, etc.), a feed-forward controller, combinations thereof, or the like.

A controller 10 in accordance with the present disclosure may include a band selection filter (e.g., a bandpass, low pass filter, one or more digital biquad filters, etc.) configured so as to modify the input signal 1 to produce a modified input signal (e.g., an input signal with limited spectral content, spectral content relevant to the nonlinear control system only, etc.). In one non-limiting example, the controller 10 may include a filter with a crossover positioned at approximately 60 Hz. The nonlinear control may be applied to the spectral content below the cross over while the rest of the signal may be sent elsewhere in the system, enter an equalizer, etc. The signals may be recombined before being directed towards the audio system 20. In a multi-rate example, the signals may be downsampled and upsampled accordingly, based on their spectral content and the harmonic content added by the nonlinear controller 10 during operation. Such a configuration may be advantageous for reducing the computational load on the control system during real-time operation.

The model 30 may include an observer and/or a state estimator. A state estimator (e.g., an exact linearization model, a feed forward model, one or more biquad filters, etc.) may be configured to estimate the states 35 for input to the controller 10. The state estimator may include a state space model in combination with an exact input-output linearization algorithm in order to achieve this function, among other approaches. One or more aspects of the model 30 may be based upon a physical model (e.g., a lumped parameter model, etc.). Alternatively, additionally, or in combination, one or more aspects of the model 30 may be based upon a general architecture (e.g., a black box model, a neural network, a fuzzy model, a Bayesian network, etc.). The model 30 may include one or more parametrically defined aspects that may be configured, calibrated, and/or adapted to better accommodate the specific requirements of the given application.

One or more model selection processes in accordance with the present disclosure may be used to configure, enable, and/or select one or more state estimator models and/or control system models for estimating the states 35, the system feedback signal 12, and/or the control signal 15. In aspects, the observer 30 may be configured to generate a state 35 or metric against which to compare a predicted value (e.g., an excursion prediction, an impedance prediction, a speaker characteristic, etc.) so as to select a model, adapt a model, etc. for purposes of control and/or speaker protection.

The feedback signals 25 may be obtained from one or more aspects of the audio system 20. Some non-limiting examples of feedback signals 25 include one or more temperature measurements, impedance, drive current, drive voltage, drive power, one or more kinematic measurements (e.g., membrane or coil displacement, velocity, acceleration, air flow, etc.), sound pressure level measurement, local microphone feedback, ambient condition feedback (e.g., temperature, pressure, humidity, etc.), kinetic measurements (e.g., force at a mount, impact measurement, etc.), B-field measurement, combinations thereof, and the like.

The states 35 may be generally determined as input to the controller 10. In one non-limiting example, the states 35 may be transformed so as to reduce computational requirements and/or simplify calculation of one or more aspects of the system. In aspects, the states 35 may be used to configure, enable, and/or select one or more estimators within the controller 10.

The control signals 15 may be delivered to one or more aspects of the audio system 20 (e.g., to a driver included therein, to a speaker included therein, etc.).

The model 30 may include an observer (e.g., a nonlinear observer, a sliding mode observer, a Kalman filter, an adaptive filter, a least means square adaptive filter, an augmented recursive least square filter, an extended Kalman filter, ensemble Kalman filter, high order extended Kalman filters, a dynamic Bayesian network, etc.). In one non-limiting example, the model 30 may be an unscented Kalman filter (UKF). The unscented Kalman filter may be configured to accept the feedback signal 25, the input signal 1, and/or the control signal 15. The unscented Kalman filter (UKF) 30 includes a deterministic sampling technique known as the unscented transform to pick a minimal set of sample points (e.g., sigma points) around the mean nonlinear function. The sigma points may be propagated through the non-linear functions, from which the mean and covariance of the estimates are recovered. The resulting filter may more accurately capture the true mean and covariance of the overall system being modeled. In addition, UKF do not require explicit calculation of Jacobians, which for complex functions may be challenging, including on a resource limited device.

The UKF algorithm includes weight matrices that depend on the design variables $\alpha$, $\beta$ and $\kappa$. The variable a may be configured between 0 and 1, $\beta$ may be set equal to 2 (e.g., if the noise profile is roughly Gaussian), and $\kappa$ is a scaling factor that may generally be set equal to zero or generally 3-n, where n is the number of states. Generally speaking, κ should be nonnegative to ensure the covariance matrix to be positive semi-definite. For purposes of discussion, λ is introduced and defined as:

$$\lambda = \alpha^2(n+\kappa) - n \quad \text{Equation 1}$$

and the calculations of the weights are:

$$W_m^0 = \lambda/(n+\lambda)$$

$$W_c^0 = \lambda/(n+\lambda) + 1 - \alpha^2 + \beta$$

$$W_m^i = 1/(2(n+\lambda)), i=1,2,\ldots,2n$$

$$W_c^i = 1/(2(n+\lambda)), i=1,2,\ldots,2n \quad \text{Equation 2}$$

which are assembled into:

$$W_m = [W_m^0 W_m^1 \ldots W_m^{2n}]^T$$

$$W_c = [W_c^0 W_c^1 \ldots W_c^{2n}]^T \quad \text{Equation 3}$$

The prediction step may be defined by a sigma-point vector:

$$X_{k-1} = [m_{k-1} \ldots m_{k-1}] + \sqrt{n+\lambda}[0 \sqrt{P_{k-1}} -\sqrt{P_{k-1}}] \quad \text{Equation 4}$$

based on the prior mean, $m_{k-1}$, and covariance, $P_{k-1}$. The vector can be divided into single sigma points $W_{k-1}^j$ for $j=1, 2, \ldots, 2n+1$. The points are then propagated through the non-linear function:

$$\hat{X}_k^j = f(\hat{X}_{k-1}^j, u_{k-1}) \quad \text{Equation 5}$$

By assembling all $\hat{X}_k^j$ as $$\hat{X}_k = [\hat{x}_k^1 \ldots \hat{x}_k^{2n+1}] \quad \text{Equation 6}$$

with the resulting mean and covariance predicted by:

$$\overline{m}_k = \hat{X}_k W_m$$

$$\overline{P}_k = \hat{X}_k W_c \hat{X}_k^T + Q \quad \text{Equation 7}$$

where the covariance of the process noise is denoted as Q. The updated sigma points are given by:

$$\overline{X}_k = [\overline{m}_k \ldots \overline{m}_k] + \sqrt{n+\lambda}[0 \sqrt{\overline{P}_k} -\sqrt{\overline{P}_k}] \quad \text{Equation 8}$$

The resulting sigma points are then propagated through the measurement function:

$$\overline{Z}_k^j = h(\overline{X}_k^j) \quad \text{Equation 9}$$

and a corresponding Kalman filter gain is calculated:

$$S_k = \overline{Z}_k W_c \overline{Z}_k^T + R$$

$$C_k = \overline{X}_k W_c \overline{Z}_k^T$$

$$K_k = C_k S_k^{-1} \quad \text{Equation 10}$$

The matrix R is the covariance matrix for the measurement noise. Finally, the estimated mean and covariance are updated according to:

$$P_k = \overline{P}_k - K_k S_k K_k^T$$

$$m_k = \overline{m}_k + K_k(z_k - \overline{u}_k)$$

$$\overline{u}_k = \overline{Z}_k W_m \quad \text{Equation 11}$$

In one non-limiting example, the unscented Kalman filter may be augmented (e.g., to form an augmented unscented Kalman filter [AUKF]). The AUKF includes an augmented state vector for the process and measurement noise calculation thus including non-symmetric sigma points. The AUKF may be advantageous for capturing odd-moment information during each filtering recursion.

Figure 2A:
FIGS. 2a-e show aspects of a handset coupled with the head of a subject and anatomical features of an ear in accordance with the present disclosure.

FIGS. 2a-e show aspects of handsets in accordance with the present disclosure coupled to the head of a subject. FIG. 2a shows a handset 210 in accordance with the present disclosure. The handset 210 includes a control system 10 in accordance with the present disclosure, and one or more transducers (e.g. microphones, speakers, configurable receivers, etc.), configured so as to couple in audio communication with the subject 201. The handset 210 is held such that one or more of the transducers (not explicitly shown), is positioned in the vicinity of the ear 202 of the subject during use. The positioning of the handset 210 to the ear 202 is considered variable, as the subject 201 may orient the handset 210 to the ear 202 in a variety of ways, with different preferences, different environments (e.g. quiet, windy, noisy, etc.), during different lengths of phone call, different types of phone call (e.g. feelings toward the phone call participant, the subject nature of the call, etc.), jewelry and/or clothing on the subject 201 in the vicinity of the ear 202, etc.

Figure 2B:
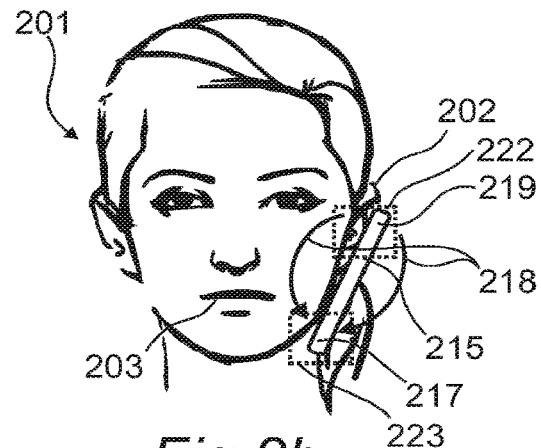

FIG. 2b illustrates a schematic of a handset 215 in accordance with the present disclosure, the handset 215 including a microphone 217, and a receiver 219 (e.g. a speaker, a transducer, a configurable transducer, etc.). The receiver 219 is oriented so as to interface with the ear 202 of a subject 201. The schematic shows an audio stream 218 being generated by the receiver 219 interacting with the ear 202 of the subject 201, but also, in aspects, with the microphone 217. Adjustment of the position, mounting pressure to the ear 202, and the like may be performed by the subject 201, so as to try and better couple the receiver 219 against the ear 202. The control system 10 is configured so as to measure one or more aspects of the coupling between the receiver 219 and the ear 202, and to adjust the audio stream 218 so as to improve the listening experience for the subject 201. The handset 215 is shown with a region designating an earpiece 222, and a mouthpiece 223, the regions 222, 223 essentially designating regions of the handset 215 configured so as to interface with the mouth 203 of the subject 201 (i.e. the mouthpiece 223), and the ear 202 of the subject 201 (i.e. the earpiece 222) in accordance with the present disclosure.

Figure 2C:
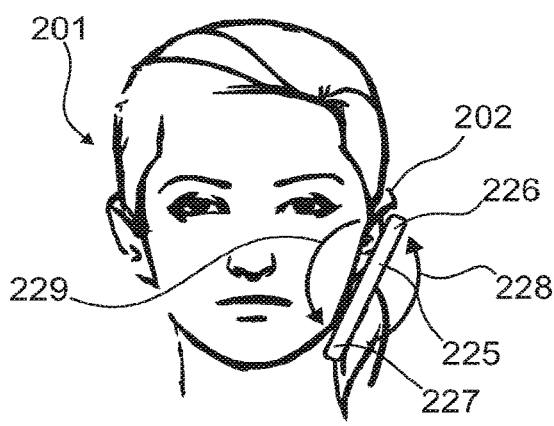

FIG. 2c illustrates a schematic of a handset 225 in accordance with the present disclosure, the handset 225 including a first configurable receiver 226 (e.g. a transducer that may be configured as a microphone, a speaker, switch function between a microphone or speaker during use, a speaker with self-sensing acoustic function, etc.) and a second configurable receiver 227 (e.g. a transducer that may be configured as a microphone, a speaker, switch function between a microphone or speaker during use, a speaker with self-sensing acoustic function, etc.). The first configurable receiver 227 is shown oriented so as to interface with the ear 202 of a subject 201. The schematic shows a first audio stream 228 being generated by the second configurable receiver 227 interacting with the mouth and ear 202 of the subject 201, but also, in aspects, with the first configurable receiver 226. The schematic also shows a second audio stream 229 being generated by the first configurable receiver 226 interacting with the ear 202 of the subject 201 and also with the second configurable receiver 227. The relationship between the rendered audio streams 228, 229 and the recorded streams (i.e. as recorded by one or more of the configurable receivers 226, 227), may be analyzed by the control system 10 in accordance with the present disclosure. Adjustment of the position, mounting pressure of the handset 225 against the ear 202, and the like may be performed by the subject 201, so as to try and better couple the second configurable receiver 227 against the ear 202. The control system 10 may be configured so as to measure one or more aspects of the coupling between the second configurable receiver 227, the first configurable receiver 226, and/or the ear 202, and to adjust the second audio stream 229 so as to improve the listening experience for the subject 201. In aspects, the first audio stream 228 and/or the second audio stream 229 may include one or more diagnostic signals in accordance with the present disclosure. The diagnostic signals meant to query the speakers 226, 227 and, in combination with the control system 10, adjust the audio stream 229, 228 in order to improve the listening experience for the subject 201.

Figure 2D:
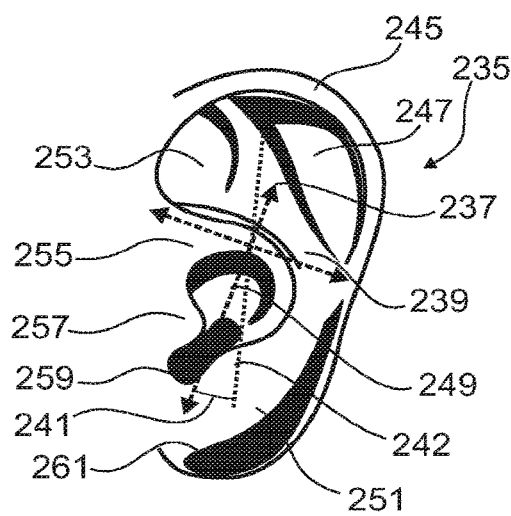

FIG. 2*d* illustrates a typical ear 235 of a subject (not explicitly shown). Parameters associated with the positioning of an associated handset against the ear 235 are shown. Such parameters include the translations 237, 239 in the vicinity of the ear, angle of orientation 241 with respect to the ear axis 242, pressure application over the ear 235, and out of plane orientation (not explicitly shown), all of which may contribute to the quality of the acoustic coupling between the ear 235 of the subject and the associated handset (i.e. the speaker within the handset). Such acoustic coupling may include changes in the acoustic leakage around the ear, changes in the acoustic impedance seen by the speaker, changes in the air volume between the ear canal of the subject and the speaker, etc. Such changes may be monitored by a system in accordance with the present disclosure and adapted for during use, so as to improve the quality of the acoustic signal presented to the subject. In aspects, a proximity sensor, a front facing camera, or the like, may be used to generate a position based reference for inclusion into the control system adaption algorithm. In aspects, one or more of the translation parameter above, may be mapped to one or more images acquired by an associated imaging sensor. In aspects, one or more of the positioning parameters may be extracted and/or estimated from a change in and associated current, voltage, or impedance measurement/prediction obtained during use. Such information may be used as a look-up parameter for a table of control parameters, a model bank, etc. each in accordance with the present disclosure.

Some anatomical markers of the ear 235 are shown and may be relevant to the acoustic coupling between a speaker and the subject during use. FIG. 2*d* includes some anatomical features of the external ear 235 of a subject including the helix 245, the scaphoid fossa 247, the antihelix (near 237), the cymba concha, the helix 251, the antitragus (near 242), the lobe 261, the intertragus notch 259, the cavum concha (near 249), the tragus 257, the crus of helix 255, and the triangular fossa 253.

During typical usage, a user will often try to establish a seal between the handset and the ear 235 by sealing against the crus of helix 255 and the antitragus and the lobe 261, by holding the handset cheek down south and against the helix 245 around the ear. With modern mobile phones it is generally challenging to use the helix 245 for sealing as the handset is too small. So many users try to push the phone against the anti-helix (near 237) and the fossa-triangularis 253. As the helix 245 is often not available for sealing, there is a strong need to improve the acoustic quality under such compromised conditions. Thus a control system in accordance with the present disclosure may be advantageous for improving the acoustic quality of an audio stream for a subject when such sub-optimal positioning is used during operation.

Figure 2E:
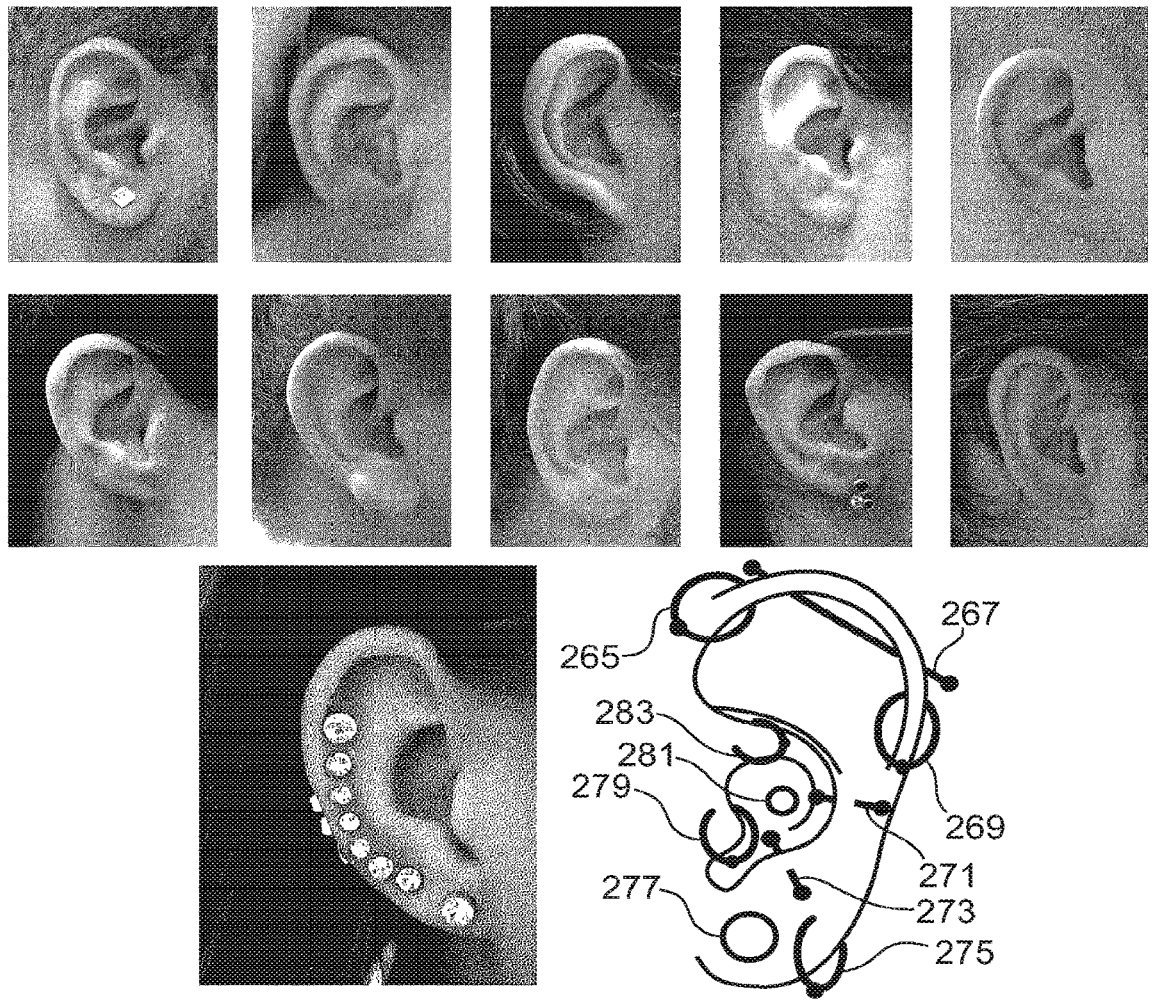

FIG. 2*e* shows an image series of anatomical variation of ears among a population of subjects. The image series demonstrates how significantly different the anatomical variation of external ear features is among subjects. The anatomical variation of the ear may impact the ability to generate a gasket effect, the acoustic coupling, and/or the acoustic leakage between the ear and the handset. Thus the acoustic impedance between the ear and the handset transducer may vary dramatically among users, even for similar orientation and positioning of the handset against the ear. The quality of the acoustic coupling of an associated handset to the ear of a particular subject may be highly variable, and not something that can be predicted by simulation during development of the handset.

As can be seen, jewelry, body modification, a disease state (e.g. cauliflower ear, etc.), and the like may all impact the contact surfaces available against which a subject may press the handset during use. In aspects, a method and/or system in accordance with the present disclosure may measuring the resulting acoustic impedance or a representation thereof, and generate a near optimal acoustic filter personalized not only for a particular user, but also for the present orientation of the handset against the ear of the user. In aspects, variation in ear jewelry and/or clothing (such as hats, scarves, etc.), may influence the acoustic impedance approximation, thus a real-time assessment of the acoustic impedance may be desirable to improve the audio quality of the system for each user.

Some non-limiting examples of ear jewelry are also shown which may impact acoustic coupling between a speaker and the ear canal of the subject. Such jewelry may further interfere with, and/or alter the acoustic coupling between a handset speaker and the ear 235. FIG. 2*e* illustrates a range of common piercings, including a forward helix ring 265, an industrial 267, a rook 283, a helix ring 269, a snug 269, an inner conch 281, an anti-tragus bar 273, a tragus ring 279, an upper lobe ring 275, and a standard lobe plug or tunnel 277. Such jewelry, particularly that near the concha (near 249) and the anti-helix (near 237) can significantly affect the acoustic coupling between a nearby headset and the ear 235.

FIGS. 3*a-e* show aspects of components of a nonlinear control system in accordance with the present disclosure.

Figure 3A:
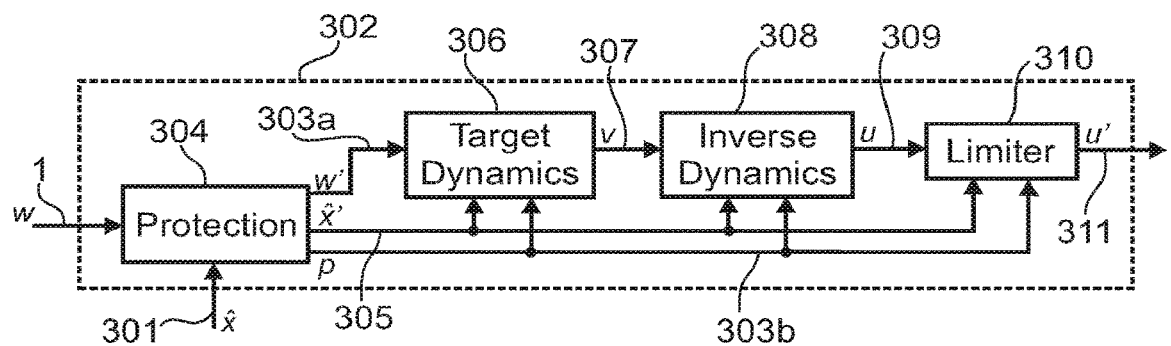
FIGS. 3a-e show aspects of components of a nonlinear control system in accordance with the present disclosure.

FIG. 3*a* shows aspects of a feed-forward controller 302 in accordance with the present disclosure. The feed-forward controller 302 may be configured to accept an input signal 1 and a state vector 301 and generate one or more control signals 311. In a basic configuration, the feed-forward controller 302 may include a target dynamics block 306 configured to accept the input signal 1 or a signal derived therefrom (e.g., a modified input signal 303*a*), and a state vector 301 or signal derived therefrom (e.g., a modified state vector 305), and optionally a flag 303*b* (e.g., a signal generated by one or more components of the control system), and generate a targeted output signal 307. The target dynamics block 306 may be configured so as to provide a desired transformation for the input signal 1 (e.g., an equalizer function, a compressor function, a linear inverse dynamic function, additional added harmonics, etc.).

The controller 302 may include an inverse dynamics block 308 configured to compensate for one or more nonlinear aspects of the audio system (e.g., one or more non-linearities associated with the speaker, the driver, the enclosure, etc.). The inverse dynamics block 308 may be configured to accept the targeted output signal 307, a state vector 301 or signal derived therefrom (e.g., a modified state vector 305), and optionally a flag 303*b* (e.g., a signal generated by one or more components of the control system), and generate one or more initial control signals 309. The inverse dynamics block 308 may be configured based on a black or grey box model, or equivalently from a parametric model (such as the lumped parameter model outlined herein). Thus, the system may include a pure "black-box" modeling approach (e.g., a model with no physical basis, but rather a pure input-to-output behavior mapping that can then be compensated for). In some instances, a physically targeted model may reduce the computational load on the nonlinear control system.

The controller 302 (e.g., a non-limiting implementation of a controller 10, a feed-forward controller 302, etc.) may include a protection block 304, configured to accept one or more input signals 1 and one or more states 301 and optionally produce one or more modified input signals 303a, modified states 305, and/or a flag 303b. The protection block 304 may be configured to compare one or more aspects of the input signal 1, the state vector 301 or one or more signals generated therefrom (e.g., an input power signal, a state power signal, a thermal state, cone excursion, a thermal dynamic, a thermal approach vector, etc.). The protection block 304 may compare such information against a performance limitation criteria (e.g., a thermal model, an excursion limitation, a power consumption limitation of the associated device [e.g., a configurable criteria], etc.) to determine how close the operating condition of the audio system is to a limit, the rate at which the operating state is approaching a limit (e.g., a thermal limit), etc.

Such functionality may be advantageous for generating a look-ahead trajectory for smoothly transitioning system gain, performance aspects, etc. so as to remain within the limitation criteria as well as reduce the probability of introducing audio artifacts based when applying limits to the system.

The protection block 304 may generate such information in terms of a flag 303b (e.g., a warning flag, a problem flag, etc.), the flag 303b configured so as to indicate a level of severity to one or more aspects of the control system, to assist with parametrically limiting the output of one or more aspect of the control system, etc. Alternatively, additionally, or in combination, the protection block 304 may directly augment the input signal 1, the states 301, so as to generate a modified input signal 303a or a modified state vector 305, so as to provide the protection aspect without addition computational complexity to other aspects of the control system.

The controller 302 may include a compressor and/or a limiter 310 configured to accept the initial control signal 309, one or more states 301 or signals generated therefrom (e.g., a modified state vector 305), or the flag 303b. The limiter 310 may be configured to limit the initial control signal 309 based on one or more aspects of the states 305, the initial control signal 309, the flag 303b, combinations thereof, and the like. The limiter 310 may be configured to generate a limited control signal 311 for use by one or more components in the control system. In aspects, the limiter 310 may be a compressor, with a limit configured based upon a predetermined criteria and/or the flag 303b. In aspects, the flag 303b may be provided by or derived from an external processor (e.g., a system power manager, etc.), so as to provide a constraint upon which the limiter 310 may function.

Figure 3B:
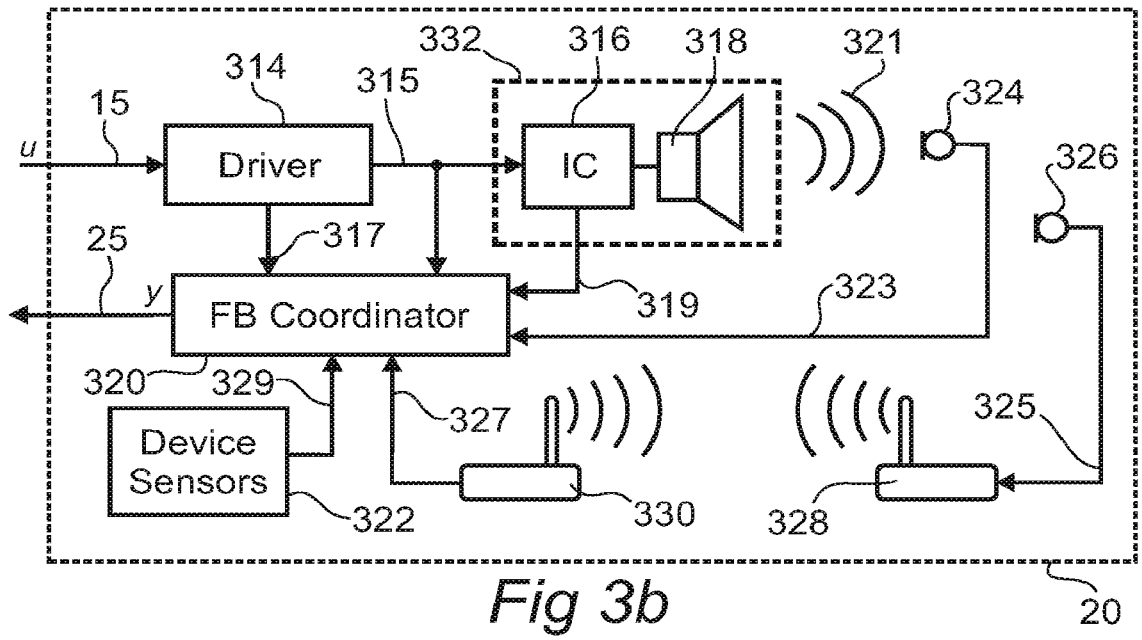

FIG. 3b shows a non-limiting example of an audio system 20 (e.g., 220, etc.) in accordance with the present disclosure. The audio system 20 may include one or more transducers 318 (e.g., speakers, actuator, etc.). The term transducer 318 is meant to include, without limitation, a component or device such as a speaker suitable for producing sound (e.g., an audio signal 321). A transducer 318 may be based on one of many different technologies such as electromagnetic, thermoacoustic, electrostatic, magnetostrictive, ribbon, audio arrays, electroactive materials, and the like. Transducers 318 based on different technologies may require alternative driver characteristics, matching or filtering circuits but such aspects are not meant to alter the scope of this disclosure.

The audio system 20 may include a transducer module 332, which may further include a transducer 318 and a circuit 316. The circuit 316 may provide additional functionality (e.g., power amplification, energy conversion, filtering, energy storage, etc.) to enable a driver 314 external to the transducer module 332 to drive the transducer 318. Some non-limiting examples of the circuit 316 (e.g., a passive filter circuit, an amplifier, a de-multiplexer, a switch array, a serial communication circuit, a parallel communication circuit, a FIFO communication circuit, a charge accumulator circuit, etc.) are described throughout the present disclosure.

The circuit 316 may be configured with one or more sensory functions, configured so as to produce a speaker feedback 319. The speaker feedback 319 may include a current signal, a voltage signal, an excursion signal, a kinetic signal, a cone reflection signal (e.g., an optical signal directed at the cone of the speaker), a pressure sensor, a magnetic signal sensor (e.g., a field strength measurement, a field vector, etc.), combinations thereof, and the like. The speaker feedback signal 319 may be configured for use by one or more components in the control system.

The driver(s) 314 may be half bridge, full bridge configurations, and may accept one or more PWM signals to drive either the corresponding high and low side drivers. The driver(s) 314 may include a class D amplifier, a balanced class D amplifier, a class K amplifier, or the like. The driver(s) 314 may include a feedback circuit for determining a current flow, voltage, etc. delivered to the transducer(s) during use. The amplifier may include a feedback loop, optionally configured to reduce one or more nonlinearities in one or more transducers 318 and/or the electrical components in the system.

The driver 314 may include one or more sensory circuits to generate a driver feedback signal 317. The driver feedback signal 317 may include a power signal, a current signal, an impedance measurement (e.g., a spectral measurement, a low frequency measurement, etc.), a voltage signal, a charge, a field strength measurement, an aspect of a drive signal 315, or the like.

In aspects, the driver 314 may be configured to monitor one or more aspects of the impedance of an associated speaker 318. The impedance may be measured so as to establish a substantially DC impedance (e.g., the speaker impedance as measured in subsonic spectrum) measurement of the speaker, which may be at least partially indicative of a characteristic temperature of the speaker coil. The impedance may be measured in combination with a current sensing resistor, in combination with a measurement of the voltage applied to the speaker.

In aspects, pertaining to a driver 314 implementation with a class-D amplifier, the speaker impedance may be calculated from the output current of the class-D amplifier. The current may be pulsed along with the ON-OFF cycles associated with the amplifier. Thus, a relevant current signal may be obtained by low pass filtering the output current. The filter may be configured so as to obtain one or more spectral components of the current signal. In one non-limiting example, the impedance spectrum may be assessed in order to determine the frequency of the first resonant mode of the speaker, and/or the impedance at the peak of the first resonant frequency. As the impedance or associated frequency of the first resonant peak may change in association with the excursion of the coil and/or the temperature of the coil. A comparison of the impedance measured at the resonant peak with that of the sub-sonic spectrum may be employed to extract substantially independent measurements of the excursion and the coil temperature during use.

The impedance of the speaker may be measured at the driver 314, for use in matching one or more control parameters, or model parameters to the physical system of the immediate example (e.g., the impedance may be used during optimization of one or more aspects of the model 30).

In aspects, at least a portion of the observer may be configured so as to capture and/or track the first resonant peak of the speaker. The observer may include one or more algorithms (e.g., a frequency tracking algorithm based on an unscented Kalman filter, AUKF, etc.) configured to extract the first resonant peak from one or more aspects of the control signal 15 and/or the feedback signal 25. Additionally, alternatively, or in combination, the algorithm may be configured to calculate a speaker impedance parameter at the fundamental resonant peak. Such an algorithm may be advantageous for performing such frequency extraction and/or impedance measurement in real-time amongst a general audio stream (e.g., during streaming of music, voice, etc.). With such information available, one or more controllers in the nonlinear control system may be configured to compensate for the resonant peak during operation. Such action may be advantageous to dramatically increase drive capability of the associated speaker without the need to impart mechanically damped solutions to the problem (e.g., by directly compensating, a high efficiency solution may be attained).

The audio system 20 may include one or more microphones 324, 326 configured to monitor one or more aspects of the audio signal 321 during use. One or more of the microphones may be hardwired to the system 323 (e.g., a microphone located on the associated consumer electronics device). Such a microphone 324 may be advantageous for capturing one or more aspects of the sound propagation in the vicinity of the speaker, associated with the speaker enclosure, the device body, etc.

In aspects, the audio system 20 may include or be coupled to a wirelessly connected microphone 326 (e.g., connected via a wireless link 325, 328, 330, 327), which may be connected to an associated consumer electronics device, in the vicinity of the control system, on a manufacturing configuration (as part of a manufacturing-based calibration system, etc.). The wirelessly connected microphone 326 may be advantageous for capturing one or more aspects of sound propagation in the environment around the speaker, with directional aspects of sound propagation from the speaker, etc.

In aspects, the audio system 20 may include a speaker 318. In another non-limiting example, the audio system 20 may include a driver 314 and a speaker 318.

The audio system 20 may include one or more device sensors 322 which may be configured to capture one or more ambient and/or kinematic aspects of the usage environment, orientation with respect to a user (e.g., handheld, held to the head, etc.) and provide such sensor feedback 329 to one or more components of the system. Some non-limiting examples of suitable device sensors 322 include ambient temperature sensors, pressure sensors, humidity sensors, magnetometers, proximity sensors, etc. In aspects, the ambient temperature may be measured by a temperature sensor (e.g., a device sensor 322). Sensory feedback 329 from, for example, ambient temperature may be employed by one or more components in the control system as part of a protection algorithm, as input to one or more aspects of a thermal model, etc.

The audio system 20 may include a feedback coordinator 320 configured to accept signals from one or more components of the audio system 20 (e.g., driver 314, transducer module 332, circuit 316, transducer 318, microphones 324, 326, device sensors 322) and generate one or more feedback signals 25. The feedback coordinator 320 may include one or more signal conditioning algorithms, sensor fusion algorithms, algorithms for generating one or more metrics from one or more sensor signals, extracting one or more spectral components from the signals, etc.

Figure 3C:
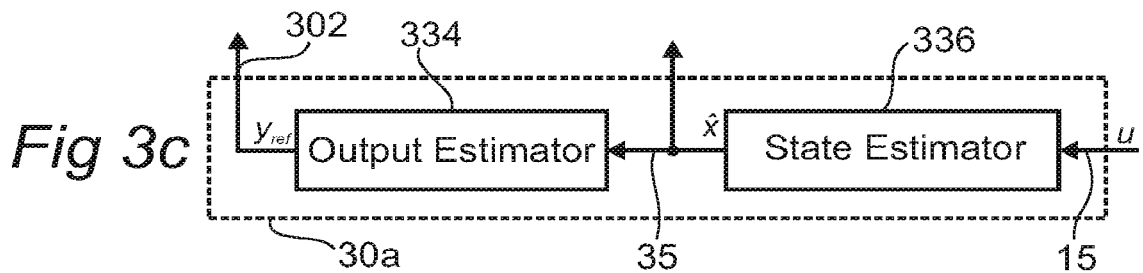

FIG. 3c shows a model 30a in accordance with the present disclosure. The model 30a includes a state estimator 336 in accordance with the present disclosure and optionally an output estimator 334. The state estimator 336 may be configured to accept one or more control signals 15 and generate one or more state vectors 35. The output estimator 334 may accept one or more states 35 and generate one or more reference signals 302. The reference signals 302 may be produced for purposes of comparison by one or more controllers in the control system, for feedback to a protection system, etc. The output estimator 334 may include a transfer function, a nonlinear transfer function, a state based estimator, etc. In aspects, the model 30a may be processed in a block based manner (e.g., simultaneously calculating output samples from groups of input samples), suitable for implementation in a callback based service (e.g., on a smartphone operating system, etc.). Such a system may be advantageous to predict future states of the speakers without the need for intense sample-to-sample computational efforts.

Figure 3D:
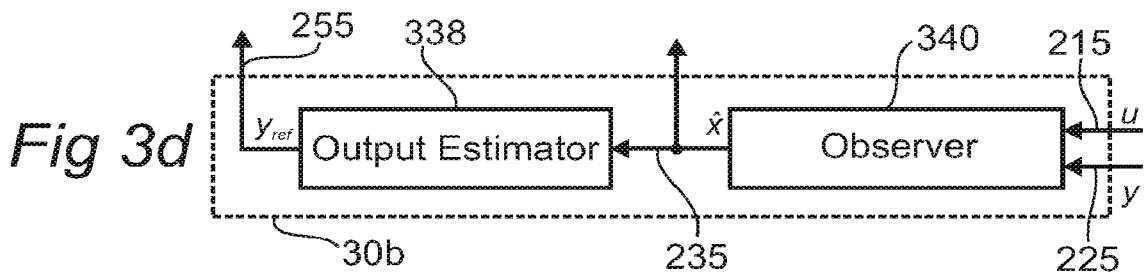

FIG. 3d shows a model 30b in accordance with the present disclosure. The model 30b includes an observer 340 in accordance with the present disclosure and optionally an output estimator 338. The observer 340 may be configured to accept one or more control signals 215, and one or more feedback signals 225, and generate one or more state vectors 235. The output estimator 338 may accept one or more states 235 and generate one or more reference signals 255. The reference signals 255 may be produced for purposes of comparison by one or more controllers in the control system, for feedback to a protection system, etc. The output estimator 338 may include a transfer function, a nonlinear transfer function, a state based estimator, etc.

In aspects, the observer 340 may include an augmented unscented Kalman filter for extracting the states from the control signals 215 and the feedback signals 225.

Figure 3E:
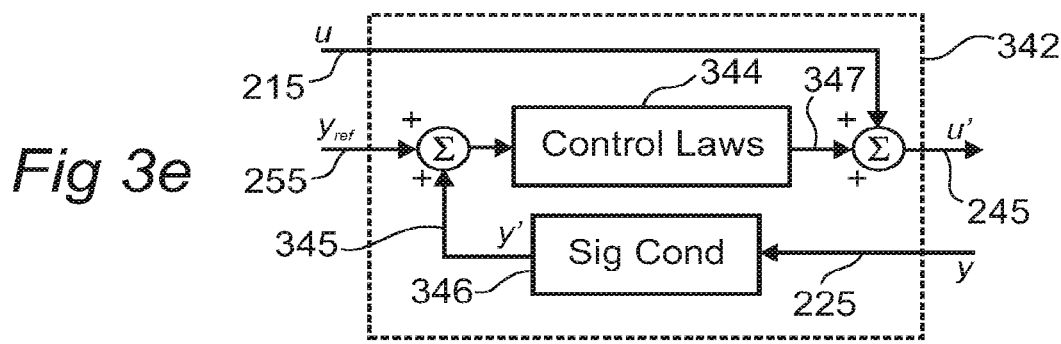

FIG. 3e shows aspects of a feedback controller 342 in accordance with the present disclosure. The feedback controller 342 includes a control block 344 (e.g., a nonlinear control law, a PID controller, etc.) in accordance with the present disclosure, and optionally a signal conditioner 346. The feedback controller 305 may be configured to accept one or more feedback signals 225 and compare the feedback signals 225 or signals generated therefrom (e.g., a conditioned feedback signal 345) with one or more reference signals 255 (e.g., as generated by one or more components in the control system). The compared signal is provided to the control block 344 where suitable gain is added to the signal to force the feedback signal 225 towards the reference signal 255. The resulting control signal 347 may be added to the initial control signal 215 (e.g., as produced by one or more control components of the control system) to produce a modified control signal 245 in accordance with the present disclosure.

Figure 4:
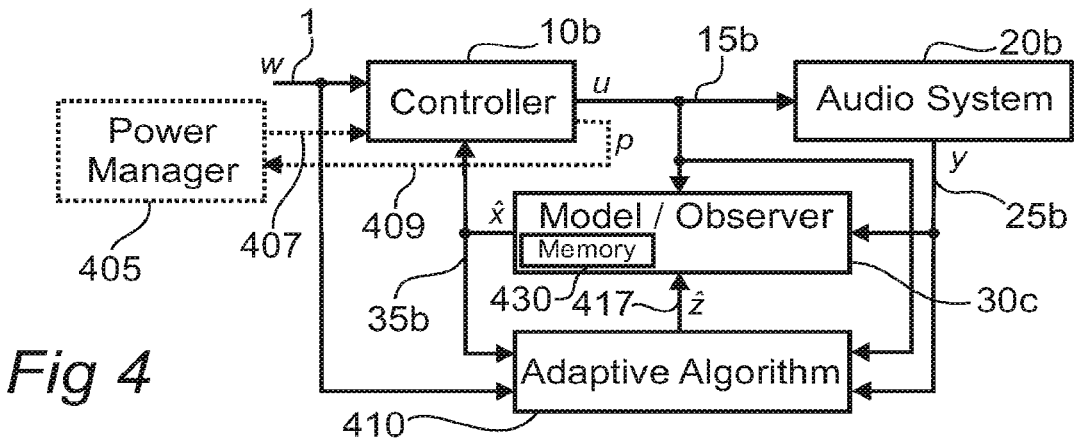
FIG. 4 shows a schematic of an adaptive control system in accordance with the present disclosure.

FIG. 4 shows a schematic of aspects of an adaptive nonlinear control system in accordance with the present disclosure. The adaptive nonlinear control system includes a controller 10b according to the present disclosure configured to accept one or more signals 1 and one or more states 35b or signals generated therefrom. The adaptive nonlinear control system includes a model 30c in accordance with the present disclosure. The model 30c may be configured to accept one or control signals 15b, one or more feedback signals 25b, and/or one or more adapted parameters 417. The model 30c may include a model and/or observer including one or more weighting parameters, parametric parameters, coefficients, or the like. The parameters may be stored locally in a memory block 430, or otherwise integrated into the structure of the model 30c. The parameters may be at least partially dependent upon the adapted parameters 417. The adaptive nonlinear control system includes an adaptive block 410 configured to accept one or more feedback signals 25b, one or more control signals 15b, one or more input signals 1, one or more states 35b, each in accordance with the present disclosure, and generate one or more of the adapted parameters 417.

The adaptive block 410 may be configured to alter the adapted parameters 417 during predetermined tests, during casual operation of the nonlinear control system, at predetermined times during media streaming, as one or more components of the operating system change, as operating conditions change, as one or more key operational aspects (e.g., operating temperature) changes, etc. The adaptive block 410 may include one or more aspects configured to assess the "goodness of fit" of the current model 30c. Upon determination that the fit is insufficient, the adaptive block 410 may perform one or more operations to correct the model 30c accordingly (e.g., adjust a model parameter, select a model and/or parameters or coefficients from a model class, enable one or more models, load one or more models, etc.).

The adaptive block 410 may include one or more adaptive and/or learning algorithms. In aspects, the adaptive algorithm may include an augmented unscented Kalman filter. In aspects, a least squares optimization algorithm may be implemented to iteratively update the adapted parameters 417 between tests, as operating conditions change, as one or more key operational aspects (e.g., operating temperature) changes, etc. Other, non-limiting examples of optimization techniques and/or learning algorithms include non-linear least squares, L2 norm, averaged one-dependence estimators (AODE), Kalman filters, unscented Kalman filters, Markov models, back propagation artificial neural networks, Bayesian networks, basis functions, support vector machines, k-nearest neighbors algorithms, case-based reasoning, decision trees, Gaussian process regression, information fuzzy networks, regression analysis, self-organizing maps, logistic regression, time series models such as auto regression models, moving average models, autoregressive integrated moving average models, classification and regression trees, multivariate adaptive regression splines, and the like.

In aspects, the adaptive nonlinear control system may include or be coupled to a power management system 405. The power management system 405 may be configured to deliver a power constraint 407 to the controller 10b, representative of a power level within which the controller 10b must operate during use. In aspects, the model 30c and/or controller 10b may be configured to generate one or more power predictions 409 for comparison with the power constraint 407, for use in throttling the controller 10b in aspects where near-term power requirements may exceed available resource levels. In aspects, the power prediction 409 may be delivered to the power manager 405 during use, where the power manager is configured to adjust system level power commitments based at least in part on the power prediction 409.

Figure 5A:
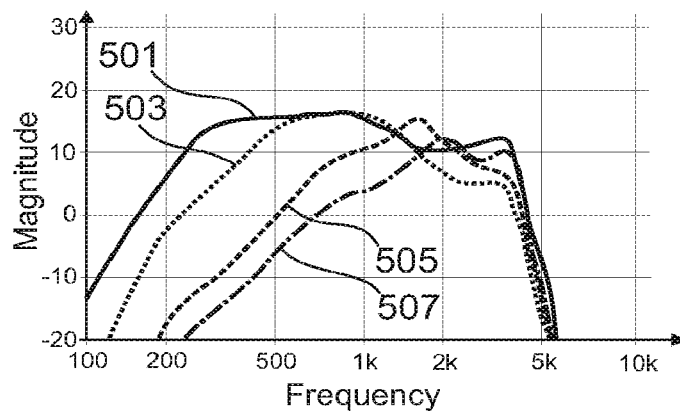
FIGS. 5a-e show spectra related to acoustic coupling of a range of handsets to the ear of subjects in accordance with the present disclosure.

FIGS. 5a-e show spectra related to acoustic coupling of a range of handsets to the ear of subjects in accordance with the present disclosure. FIG. 5a shows spectra for a handset held against an ear with different acoustic coupling properties (associated with the degree of seal against the ear, the ear properties, etc.). FIG. 5a shows a low leakage condition 501, a low leakage 503, a high leakage 505, and a low coupling 507 condition (as obtained with a HATS based test rig). As can be seen, the coupling can vary wildly during use depending on how the handset is held against the ear. A control system in accordance with the present disclosure may be advantageous for compensating for such acoustic deficiencies in the audio stream, so as to alter acoustic transfer to the ear of the subject under the resulting acoustic configuration (i.e. adjustment based upon the state of the acoustic coupling any time during use, etc.). In aspects, a feedback signal in accordance with the present disclosure may be related to the acoustic coupling 501, 503, 505, 507 at a particular moment in the use of the handset, the feedback signal coupled to the control system, the control system configured so as to adjust the audio stream according to the acoustic coupling (i.e. via the related feedback signal).

Figure 5B:
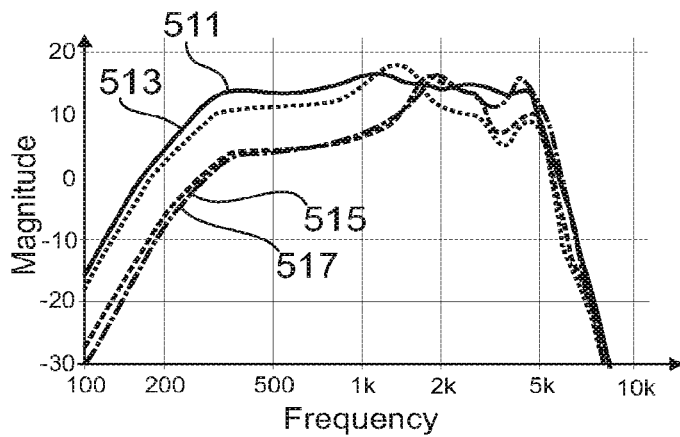

FIG. 5b shows relative coupling for another handset under different coupling conditions to an ear. Spectrum are shown for a near sealed condition 511, low leakage condition 513, high leakage condition 515, and a variable coupling condition 517 (as often observed with a HATS test rig). The low frequency variation between coupling scenarios may be over 10 dB. In addition, the injection of background noise into the signal may be appreciable when the leakage is relatively high during use.

Figure 5C:
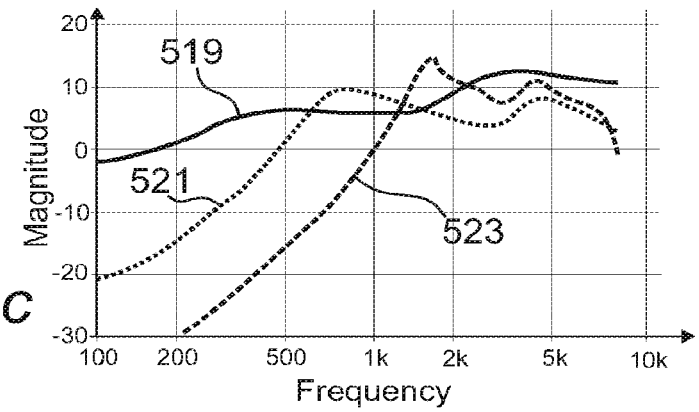

FIG. 5c shows relative coupling for yet another handset under different coupling conditions to an ear as taken with a high impedance source (i.e. such as may be introduced herein via a diagnostic speaker, a driven microphone, or the like). Spectrum are shown for a near sealed condition 519, low leakage condition 521, and a high leakage condition 523. The low frequency variation between coupling scenarios varies by up to 20 dB. In addition, the injection of background noise into the signal may be appreciable when the leakage is relatively high during use. Use of a control system in accordance with the present disclosure may be advantageous to measure and/or compensate for such variations during use.

Figure 5D:
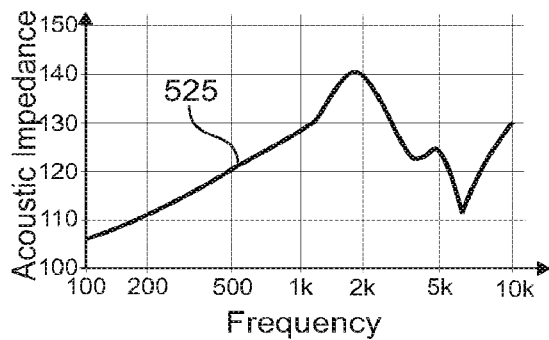

FIG. 5d illustrates the input acoustic impedance spectrum 525 to an ear under a high leakage condition to an ear. The low frequency response shows a large variation of impedance with frequency, increasing at approximately 10 dB per octave. Such variation is much higher than seen under near sealed conditions, where the variation may be much lower than in the high leakage condition. In addition, the injection of background noise into the signal may be appreciable when the leakage is relatively high during use.

Figure 5E:
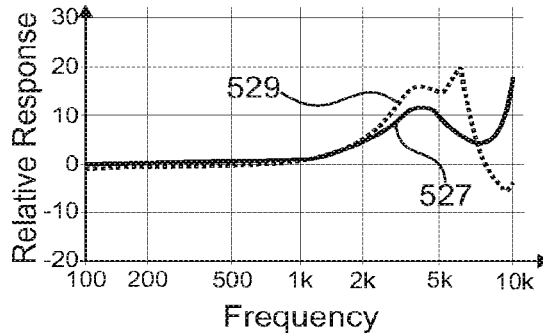

FIG. 5e shows frequency sensitivity response for a headset against an ear under open 527 and closed 529 ear conditions. The variations in such conditions may be related to a feedback signal in accordance with the present disclosure, delivered to an adaptive controller in accordance with the present disclosure, so as to compensate on an acoustic signal delivered to the ear during use.

In aspects, a feedback signal in accordance with the present disclosure may be related to the acoustic coupling at a particular moment in the use of the handset, the feedback signal coupled to the control system, the control system configured so as to adjust the audio stream according to the acoustic coupling (i.e. via the related feedback signal).

Figure 6:
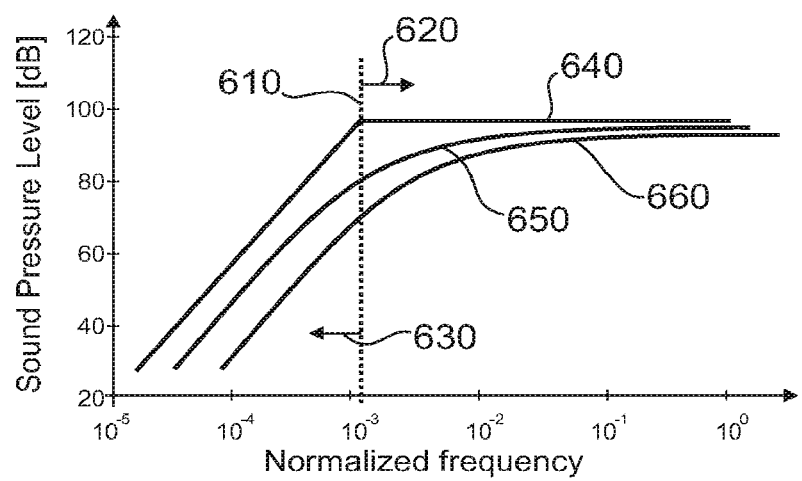
FIG. 6 shows a graphical description of a control algorithm for use in a nonlinear control system in accordance with the present disclosure.

FIG. 6 shows a range of acoustic transfer functions 640, 650, 660 between a handset transducer and the ear of a subject in accordance with the present disclosure. The data set shown illustrates the changes in the acoustic transfer function between a typically mounted handset (all substantially high leakage conditions) and an ear. Such variation, even under high leakage conditions may significantly affect the acoustic quality perceived by the subject, the acoustic clarity, the extent of background noise pickup, and the like during use. A fully sealed gasket condition (i.e. a perfect seal between the transducer and a particular ear of a particular subject) would have a flatter low frequency response (as illustrated in FIG. 5). A high leakage condition (i.e. where there is substantially no effective seal between the transducer and the ear of a particular subject) will such large frequency variation and lower coupling in the low frequency spectrum. The transducer impedance spectrum during use (such as estimated by a controller in accordance with the present disclosure) may be mapped to a corresponding acoustic impedance profile (e.g. during development, through post market studies, via feedback obtained from one or more microphones on the corresponding device, by playing and recording an audio stream from one or more configurable receivers on the device, etc.). The map may be stored on the device, parametrically stored on the device, included in a corresponding model bank on the device or an associated cloud storage space, etc. Once the map is substantially established, or updated during use, the impedance readings may be fed to a corresponding adaptive algorithm and/or controller in accordance with the present disclosure to create an enhanced audio signal so as to improve the acoustic quality for the subject during use.

Some spectral characteristics may change in addition to the coupling amplitude during use. Some characteristics such as the first resonant frequency 610 of the speaker and local acoustic environment, may increase 620 or decrease 630 depending on the coupling and environmental influence on the speaker loading (i.e. such as the proximity of the nearby surface, the structure of the surface, and the like contribute to the ear/speaker coupling, and the acoustic loading on the speaker).

Figure 7:
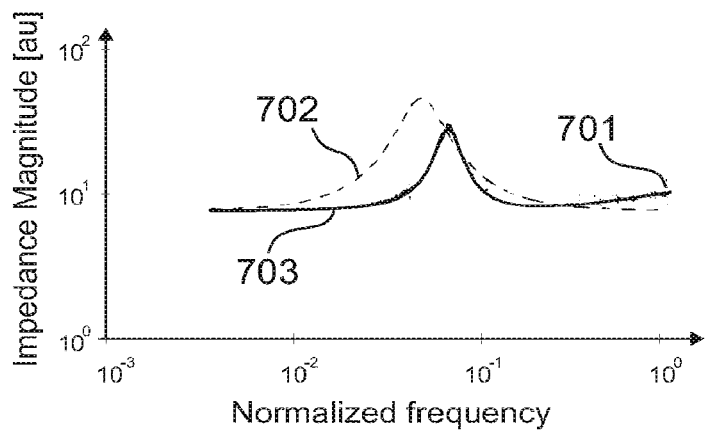
FIG. 7 shows the output of a method for fitting aspects of a nonlinear model in accordance with the present disclosure.

FIG. 7 shows the output of a method for fitting aspects of a nonlinear model in accordance with the present disclosure. The graph demonstrates an experimentally obtained signal impedance spectral response 701 obtained via a method in accordance with the present disclosure or any other known method, e.g., by mapping current and voltage measurements of any stimuli signal in different frequency regions over time by applying a moving band-pass filter or the like (shown as the dotted signal on the graph) with the corresponding device held against the ear of a subject, a simulator, etc. In aspects, a "map" of impedance versus position may be created by moving the device in the vicinity of the ear, making readings, and recording current/voltage to generate associated impedance spectra. In aspects, one or more additional transducers, including a proximity sensor, an imaging sensor, a microphone, a secondary speaker, etc. may be incorporated into the assessment so as to provide further state related information as part of the impedance characterization and/or mapping process. In aspects, a nonlinear state estimator associated with the speaker under test may be parametrically configured with an initial guess, this resulted in an initial approximate impedance spectrum 702. The nonlinear state estimator or nonlinear model may then be optimized based upon the measured spectral response 701. The optimized spectral response 703 is shown in the figure. As can be seen, the impedance spectrum of the speaker was a useful input for optimizing the associated nonlinear model aspects of the nonlinear control system.

Based upon this approach, a method for optimizing a nonlinear model includes extracting the impedance spectrum of the speaker during operation (e.g., during a test, during playback of a media stream, at different positions around the ear, at different gasket levels, etc.). The impedance data may be used as a target to optimize one or more parameters of the associated nonlinear model. The resulting model parameters may be uploaded to the model after completion, or adjusted directly on the model during the optimization process. Once optimized, the system may (i.e. during use) rely upon the electrical impedance readings/ estimates from the transducer in order to predict which controller transfer function to implement at a given time (i.e. so as to optimize the audio quality for the user, prevent hearing damage for the user, etc.).

In some cases, insufficient spectral content may be available in the general media stream. In these cases, audio watermarks may be added to the media stream to discreetly increase the spectral content and thus achieve the desired optimization (e.g., white noise, near white noise, noise shaped watermarks, etc. may be added). In aspects, the audio watermark may be transmitted from a separate transducer on the device, the first transducer (e.g. transducer nearest to the ear), configured so as to measure the audio watermark, the relationship used to further enhance the estimate on the state of gasket formation with a nearby ear.

Figure 8A:
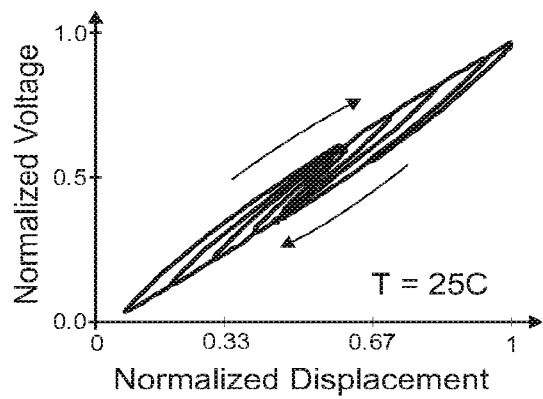
FIGS. 8a-b show aspects of nonlinear hysteresis models in accordance with the present disclosure.
Figure 8B:
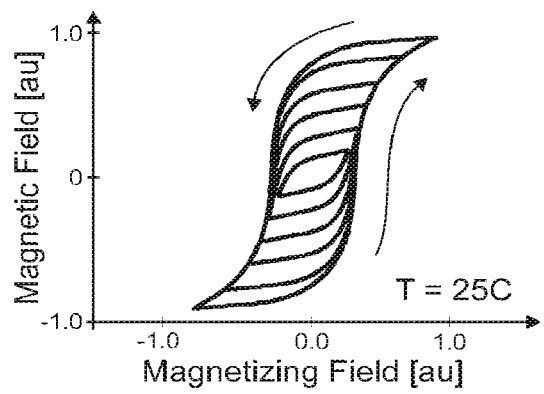

FIGS. 8a-b show aspects of nonlinear hysteresis models in accordance with the present disclosure. Large signal operation of transducers in accordance with the present disclosure may exhibit more complicated nonlinearities than considered previously. FIG. 8a shows aspects of internal hysteresis loops associated with movement of a piezoelectric transducer during operation. FIG. 8b shows an example of hysteresis loops associated with magnetization of a magnetic field during operation. Such hysteretic effects may be temperature and aging dependent, as well as humidity dependent. Such effects are often related to inefficiency, complex distortion, etc. To compensate for such effects, the nonlinear system may include one or more higher order nonlinear hysteresis models. Some non-limiting examples of such models include Preisach models, Lipshin models, Bouc-Wen models, neural networks, fuzzy logic models, and the like. The models may be configured with sufficient complexity so as to capture the necessary dynamics without over-complicating the computational aspects of the nonlinear control system. Such models may include thermal dependencies, rate dependencies (as opposed to being rate independent), etc.

In aspects, a nonlinear control system in accordance with the present disclosure may include a modified Bouc-Wen hysteresis model configured to compensate for the viscoelastic behavior of the suspension of the transducer included in the associated CED.

In aspects, a near time invariant Preisach model may be included into the speaker model to capture loop hysteresis and nonlinearities in one or more nonlinear compensation blocks. The model may include temperature variation aspects thereof to further improve the model reliability and range of application.

Figure 9:
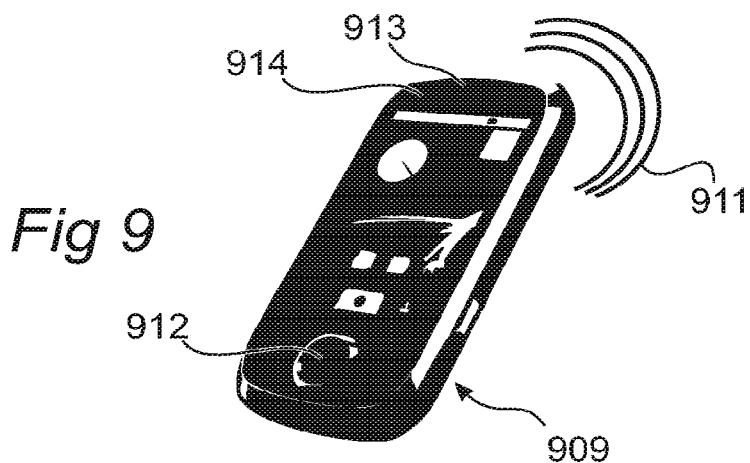
FIG. 9 shows a consumer electronics device for use with a control system in accordance with the present disclosure.

FIG. 9 shows a consumer electronics device 909 for use with a control system in accordance with the present disclosure. The consumer electronic device 909 (e.g., a smartphone handset) may be configured to produce an audio output signal 911. The CED 909 may include an integrated nonlinear control system in accordance with the present disclosure, a microphone 912, one or more proximity sensors 913, an imaging sensor 914, etc. The CED 909 may be tested to determine an associated acoustic signature during the design process, the manufacturing process, the validation process, or the like, and the audio performance thereof adjusted through programming of the nonlinear control system included therein.

Generally speaking, an observer in accordance with the present disclosure may be configured to operate under conditions of limited feedback. In such circumstances, the observer may be augmented with a suitable feed forward state estimator to assist with assessment of states with limited feedback.

An observer or non-linear model in accordance with the present disclosure may also be used to enhance robustness of a feedback system (e.g., used in parallel with a feedback controller) by providing additional virtual sensors. In some instances, it may be the case where a measured state may be too far off from the prediction made by the observer or model to be realistic and therefore being rejected as a faulty measurement. In the case of detection of a faulty measurement, the observer or model generated state estimation may be used instead of the direct measurement until valid measurements are produced again.

The nonlinear control system may be configured with real-time impedance based feedback, which may be over a slower time period, to provide adaptive correction and/or update of parameters in the control system, e.g., to compensate for model variations due to aging, thermal changes or the like.

The nonlinear control system may include one or more stochastic models. The stochastic models may be configured to integrate a stochastic control method into the nonlinear control process. The nonlinear control system may be configured so as to shape the noise as measured in the system. Such noise shaping may be advantageous to adjust the noise floor to a higher frequency band for more computationally efficient removal during operation (e.g., via a simple low pass filter).

In aspects, the nonlinear control system may include a gain limiting feature, configured so as to prevent the control signal from deviating too far from the equivalent unregulated signal, so as to ensure stability thereof, limit THD, adjust an acoustic signal near a subject (e.g. such as when coupled to the ear of a subject, near the head of a subject, etc.), or the like. This gain limiting aspect may be applied differently to different frequencies (e.g., allow more deviation at lower frequencies and less or even zero deviation at higher frequencies).

The state vector may be configured so as to include exact matched physical states such as membrane acceleration (a). In such a configuration, the accuracy of the position (x) and velocity (v) related states may be somewhat relaxed while maintaining a high precision match for the acceleration (a). Thus, DC drift of the membrane may be removed from the control output, preventing hard limiting of the membrane during operation.

A control system in accordance with the present disclosure may include a simple analytical and/or black-box model of the amplifier behavior associated with one or more drivers. Such a model may be advantageous for removing artifacts from the control signal that may result in driver instability. One non-limiting example is to model an AC amplifier as a high-pass filter with its corresponding cut-off frequency and filter slope.

In aspects, the control system may include one or more "on-line" optimization algorithms. The optimization algorithm may be configured to continuously update one or more model parameters, which may occur during general media streaming. Such a configuration may be advantageous for reducing the effects of model faults over time while the system is in operation. In a laboratory and/or production setting, the optimization algorithm may afford additional state feedback from an associated kinematic sensor (e.g., laser displacement measurements of the cone movement) to more accurately fine tune the associated nonlinear model aspects of the system (e.g., feed-forward model parameters, observer parameters such as covariance matrices, PID parameters and the like). This approach may be advantageous to apply to a tuning rig during manufacture of one or more CEDs including a nonlinear control system in accordance with the present disclosure. The system may be optimized while measuring as many states as practical. The associated multi-parameter optimization scheme may be configured to optimize to a minimum for the THD within the requested frequency range (e.g., for fundamentals up to 200 Hz).

In aspects, an optimally configured model (e.g., configured during production), may be augmented with a parametrically adjustable model (e.g., a post-production adaptive control system). During the lifetime of the associated device, the parametrically adjustable model may be adaptively updated around the optimally configured model to maintain ideal operational characteristics. This configuration may be advantageous for improving the optimization results during the lifetime of the device, adaptively mapping the model parameters while knowing all states (e.g., by laser, accelerometers, a sensor in accordance with the present disclosure, etc.) or alternatively by measuring the THD with a microphone and optimize with that as a minimizing target and/or to simply implement the impedance curve mapping according to any associated method in accordance with the present disclosure.

The optimally configured and parametrically adjustable approach may be suitable for removing various aspects of the model that can cause instability or bimodal response with a "black-box" representation thereof (e.g., where the input-to-output characteristics are somewhat blindly mapped).

An optimally configured and parametrically adjustable approach may be advantageous as it may provide a means for matching an entire product line with a single adaptable model, or for matching different types of speakers more easily as the need for a perfect model is relaxed. The configuration may be amendable to implementation with an API, laboratory and/or manufacturing toolkit. The system may also be used to characterize optimally configurable (and complex) models for different speaker types (e.g., electroactive polymers, piezo-electric, electrostrictive and other types of electro-acoustic transducers [where a simple model may not be a valid description of the system]) while employing a black box model for adaptive correction in the field (e.g., via implementation of one or more automatic control and/or adaptation processes described herein).

In aspects, a model class may be suitable for implementation of embodiments of the present disclosure. The model class may be derived for a class of devices and implemented in a simplified form so as to efficiently run on a processor, as part of an OS service, etc. In aspects, a subclass of the model class may be loaded onto a respective device, optionally with a plurality of such models running in parallel during operation to predict future states of the device (e.g., predict excursion, etc.). Such models may be used as part of a speaker protection algorithm, as part of a control model, or the like in accordance with the present disclosure.

In aspects, a feed-forward controller in accordance with the present disclosure may be assisted by a PID controller, which may be included in an associated feedback controller (to compensate for variations in the feed forward model output). Such a configuration may be less computationally intensive than alternative approaches while providing a simplified implementation. Although reference is made to PID, other forms of control may be used, as disclosed herein.

One or more aspects of the nonlinear control system in accordance with the present disclosure may be implemented digitally. In aspects, the nonlinear control system may be implemented in an entirely digital fashion.

In aspects, one or more model parameters may be optimized in a lab setting, where full state feedback may be available. In such an example, a method may include determining a small-signal measurement of equivalent Thiele-Small parameters (linear), making a rough guess to the nonlinear parameter shapes, measuring a large-signal stimuli to determine one or more large signal characteristics, adjust the model parameters until the output states of the model substantially match the measured states. Such a method may be implemented using a trusted region optimization method, or the like. The process may also be implemented iteratively with a plurality of measurements or with a range of stimuli.

In aspects, the method may include setting one or more model parameters (e.g., configuring a covariance matrix) of the controllers target dynamics and/or inverting dynamics aspects by any known technique. In aspects, the setting may be achieved by a brute-force approach including testing all possible regulator parameters within reasonable intervals to find the settings for minimum THD. The minimum THD can then be measured on the real system and simulated by the model and used to correct for changes experienced by the device in the field. This approach may also be done iteratively while measuring the actual THD in each measurement iteration.

In aspects, the method may include configuring the PID-parameters. Such configuring may be achieved by, for example, a "brute-force" approach, whereby all possible values within reasonable limits are tested while measuring the THD of the speaker and searching for a minimum. In this case, it may be preferable to measure the THD as opposed to simulating it.

Such a method may include measuring the impedance in accordance with the present disclosure. If real-time impedance measurements demonstrate a parameter mismatch severely (e.g., via severe changes in temperature or ageing), the system may automatically use the new impedance curve to map the nonlinear model to the new system in real-time. Thus a technique for continuously and dynamically adapting model parameters may be provided during system operation. Small model variations may be compensated for by a linear feedback system (e.g., a PID controller).

Such an approach may be performed in real-time. When a reliable impedance curve may be obtained during measurement, the parameter adaptation (e.g., by trusted region optimization) may be performed. As temperature or aging may occur relatively slowly compared with the system dynamics, such an adaptation approach may run occasionally, whenever the processor is "free" and does not suffer from real-time requirements on a sample rate basis.

The nonlinear control system including an observer (e.g., an EKF, UKF, AUKF, or the like), may include an adaptive algorithm for adjusting one or more model parameters "on-line". The observer may then be optimized or trained to adapt to updated model parameters while operating in the field.

In accordance with the present disclosure, the controller may be divided into "Target Dynamics" (corresponding to the target behavior, e.g., a linear behavior) and "Inverse Dynamics" (which is basically aiming to cancel out all dynamics of the un-controlled system, including non-linearities) aspects. In this case, the target dynamics portion may include one or more nonlinear effects, such as psychoacoustic non-linearities, a compressor, or any other "target" behavior. Thus the controller may merge the nonlinear compensation aspects with the enhanced audio performance aspects.

A nonlinear control system may be configured to work on primarily a low frequency spectrum (e.g., less than 1000 Hz, less than 500 Hz, less than 200 Hz, less than 80 Hz, less than 60 Hz, etc.). In one non-limiting example, the nonlinear control system may be configured to operate on a modified input signal. In this case, the input signal may be divided within the woofer band with another crossover (e.g., at 80 Hz). The modified input signal delivered to the nonlinear control system may be focused only on the band below the crossover. Additional aspects are discussed throughout the present disclosure.

A nonlinear control system in accordance with the present disclosure may be embedded in an application specific integrated circuit (ASIC) or be provided as a hardware descriptive language block (e.g., VHDL, Verilog, etc.) for integration into a system on chip (SoC), an application specific integrated circuit (ASIC), a field programmable gate array (FPGA), or a digital signal processor (DSP) integrated circuit.

Alternatively, additionally, or in combination, one or more aspects of the nonlinear control system may be soft-coded into a processor, flash, EEPROM, memory location, or the like. Such a configuration may be used to implement the nonlinear control system at least partially in software, as a routine on a DSP, a processor, and ASIC, etc.

Figure 10A:
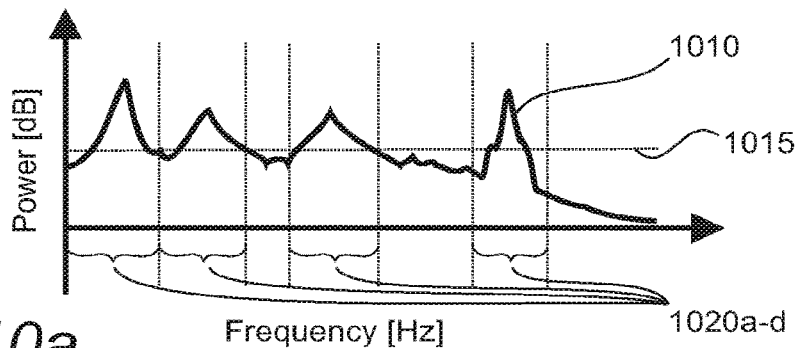
FIGS. 10a-b show spectral representations of the power delivered to and impedance of a speaker over a period of time in accordance with the present disclosure.
Figure 10B:
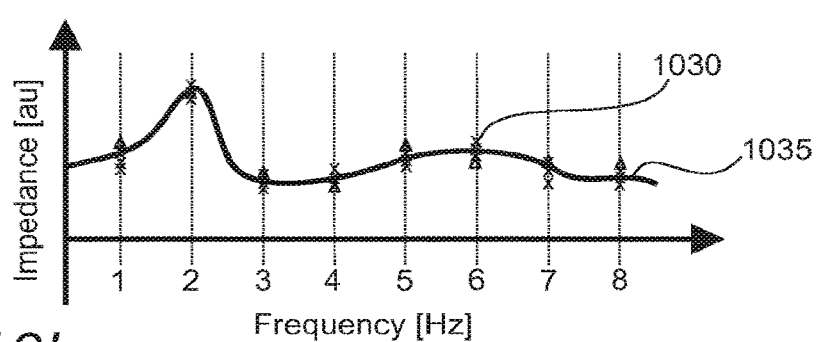

FIGS. 10a-b show spectral representations of the power 1010 and impedance 1035 of a speaker in accordance with the present disclosure. The spectra are associated with a method for calculating a spectrum of one or more aspects (e.g., impedance, power, voltage, current, etc.) of a speaker in accordance with the present disclosure during operation with a natural sound source (e.g., with a music stream, a conversation, etc.). FIG. 10a shows a power spectrum 1010 generated from a natural audio stream as averaged over a time period during use (e.g., as averaged over a 100 ms period, a 250 ms period, etc.). Overlaid onto the power spectrum is shown a threshold 1015, which may be organized based on a predetermined threshold (e.g., a power level, a voltage, a current, an excursion, etc.), a frequency dependent threshold, etc.

In aspects, changes in the impedance and/or relative power spectra may be an indication of the extent of an ear gasket formed when the associated transducer is placed against the ear of a subject. In that sense, the changing impedance and/or relative power spectra may be fed into an adaptive algorithm, controller, observer, model bank, and/or a combination thereof so as to generate one or more parameters suitable for adapting the controller, adjusting the audio stream rendered therefrom, or the like, so as to optimize the audio input to the ear of the subject. Such a configuration may be suitable for maximizing sound clarity and/or optimizing sound level/clarity during general use.

In aspects, the threshold 1015 may be used to determine which regions of the spectrum 1010 may contain (for the timeframe in question) a significant level of information, suitable for further analysis. In FIG. 10a, multiple spectral bands 1020a-d are shown with information presenting at levels above the local threshold 1015. In aspects, the analysis may include updating a model, adaptation of a parameter set, construction of a property table, etc.

FIG. 10b shows a spectral representation 1035 of an impedance model for a speaker in accordance with the present disclosure. The model may be an adaptive model, a parametric model, generated from one or more spectral band averaged parameters, etc. In the non-limiting example shown in FIG. 10b, the spectrum may be split into multiple bands (e.g., 2 bands, 8 bands, 16 bands, 64 bands, etc.). Within each band, a property value 1030 (e.g., impedance, excursion, etc.) is measured during use. A finite number of property values 1030 within each band may be stored for input to a model (e.g., an adaptive model, a curve fit, etc.) for use in predicting the overall property spectrum 1035 of the speaker at any time during use thereof. Such information may be generated and/or updated as necessary to predict one or more states of the speaker, as feedback into a control system in accordance with the present disclosure, etc.

In aspects, a method for generating a property spectrum for a speaker may include playing an audio stream with the speaker under test, measuring current and voltage associated with the speaker (e.g., via use of a series resistor, etc.), generating one or more spectra from the measured signals (e.g., generation of a bass band spectrum, a mid-band spectrum, etc.), analyzing one or more of the spectra to determine frequency bands of interest therein (e.g., frequency bands including a significant signal level in relation to a threshold value/function), and calculating property spectral bands in the frequency bands of interest. The method may include combining the property spectral bands with previously measured bands, updating a model with one or more of the property spectral bands, updating an adaptive model for a property spectrum using one or more of the property spectral bands, etc.

In aspects, the measured signals may include current through and voltage across a speaker input (e.g., voice coil, electrodes, etc.). The property may include impedance of the associated speaker, etc. The generation of the spectra may be completed using an FFT, a multi-band filter and one or more averaging filters, etc.

Figure 11:
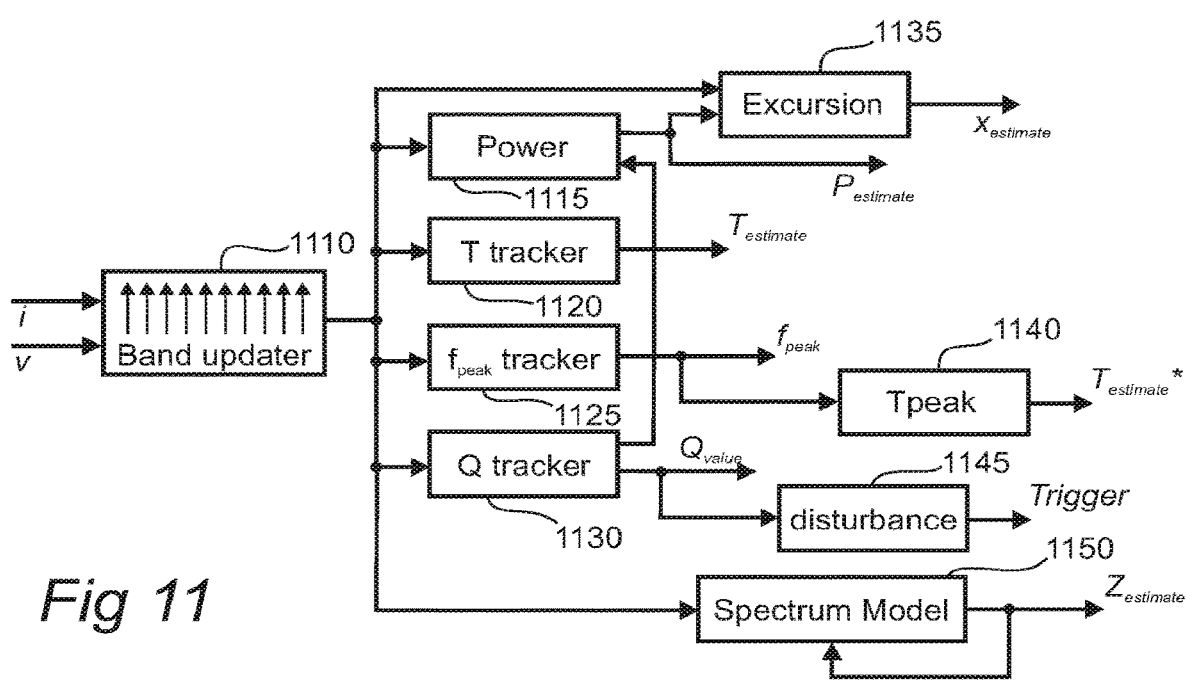
FIG. 11 shows aspects of a system for generating variables from signals measured from a speaker in accordance with the present disclosure.

FIG. 11 shows aspects of a system for generating variables from signals measured from a speaker in an environment in accordance with the present disclosure. In aspects, the speaker may be substantially coupled with the ear of a subject during use, the feedback pertaining to a combination of the speaker parameters, and the acoustic coupling between the speaker, the ear, and the surrounding environment. The system may be configured to accept one or more feedback signals (e.g., current, voltage, an excursion value, etc.), and to deliver one or more of the feedback signals to a band updater 1110. The band updater 1110 may be configured to generate one or more multi-band references relating to the feedback signals (e.g., a multi-band vector, a spectrum, etc.). One or more of the references may be made available to one or more aspects of a system in accordance with the present disclosure, as a feedback element to a nonlinear control system in accordance with the present disclosure, or the like. The system may include one or more property extraction blocks (e.g., functional blocks, a power tracking block 1115, a temperature tracking block 1120, a characteristic tracking block, a resonant frequency tracking block 1125, an acoustic quality tracking block 1130, etc.), configured to analyze the updated spectrum, and to generate one or more associated parameters therefrom. Some non-limiting examples of property extraction blocks include a power tracking block 1115, a temperature tracking block 1120, a resonant peak tracking block 1125, an acoustic quality tracking block 1130, combinations thereof, and the like.

In aspects, during operation, the update process may be configured at a rate suitable for operation within a service on an operating system (e.g., as a background service on a smartphone operating system), etc. Such an adaptive process may be advantageous for minimizing hardware requirements of the system, providing a flexible working environment, etc.

In aspects, a power tracking block 1115 may be configured to track a power metric, from one or more of the multi-band references (e.g., spectra), obtained from the band updater 1110 during use. The power tracker 1115 may also accept one or more parameters (e.g., resonant peak, an acoustic quality, a temperature, an excursion spectral model, an output from an associated block 1130, etc.) as part of the analysis process. In aspects, the power tracker 1115 may be configured to partially calculate an excursion value for an associated speaker in accordance with the present disclosure. In aspects, a representative power value may be calculated by integrating the combined spectrum of a current and voltage signal for an associated speaker over a spectral band of interest. The integration may include combination with an additional excursion model 1135, configured to relate the input power at one or more wavelengths to a corresponding excursion value.

In aspects, the power tracker 1115 may provide a prediction of near term upcoming power requirement for the speaker (e.g., $P_{estimate}$). Such information may be provided to a power management service elsewhere in the system in order to plan for resource management, soft transition speaker output, avoid brownout conditions, or the like.

In aspects, one or more parameter tracking block(s) and/or modeling block(s), may accept one or more of a temperature value, excursion, acoustic impedance to a nearby surface, proximity to a nearby surface, orientation to a nearby structure, a thermal value, etc. In aspects, an associated modeling block may include a temperature dependent model for calculating an excursion parameter during use. In aspects, the system may include a peak temperature tracker 1140 configured to estimate the near-term upcoming peak temperature on a speaker element given the input history of one or more inputs (e.g., as predicted by one or more feedback parameters in the system), which may be in combination with an ambient temperature reading, etc.

In aspects, one or more of the parameter tracking block(s) and/or modeling block(s) may accept one or more audio input values from a transducer on the device, on a separate device, in the vicinity of the subject (i.e. cross device acoustic coupling, etc.), or the like. In aspects, the audio feedback modeling block may be configured to calculate an environmental signature from the feedback, the signature at least in part pertaining to the proximity of the speaker to a nearby structure, such as the ear of the subject. In aspects, this modeling block may be configured to generate an ear gasket profile parameter, which may be fed into the system as an additional state, a disturbance prediction, or the like.

In aspects, the system may include a disturbance tracker 1145, configured so as to determine if a degree of damage and/or change has occurred with the system (e.g., such a change in acoustic quality Q, etc.) during use. Such information may be suitable for incorporation into a lifetime predicting algorithm, or the like.

The band updater may include an FFT, an adaptive model, or the like configured to generate the updated reference from one or more of the feedback signals.

The system may be configured to deliver one or more references, feedback signals, parameters, etc. to one or more aspects of a control system in accordance with the present disclosure.

In aspects, the system may include a spectrum model 1150 configured to extract updated band information from the band updater 1110 and to generate a continuous spectral model therefrom (e.g., such as a second order model, etc.). Such a model may be used by one or more system processes, controllers, or the like in order to improve speaker performance, and/or provide aspects of a speaker protection function.

Figure 12:
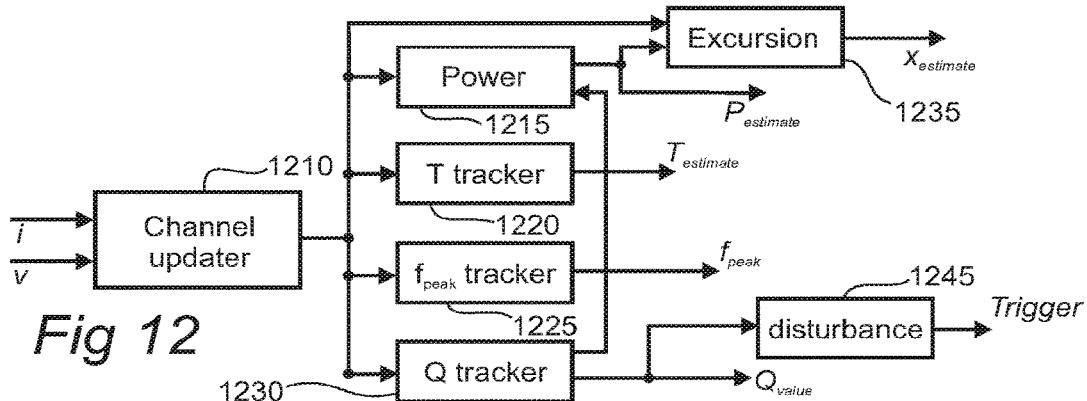
FIG. 12 shows aspects of an optionally multi-rate system for generating variables from signals measured from a speaker in accordance with the present disclosure.

FIG. 12 shows an optionally multi-rate system for generating variables from signals measured from a speaker in accordance with the present disclosure. The system may include a multi-rate subsystem for splitting one or more of the feedback signals into one or more frequency bands for analysis. In aspects, each band may be treated separately in order to extract suitable band information during use.

The channel updater 1210 may be configured to generate one or more multi-channel references relating to the feedback signals (e.g., a multi-band vector, a spectrum, etc.). One or more of the references may be made available to one or more aspects of a system in accordance with the present disclosure, as a feedback element to a nonlinear control system in accordance with the present disclosure, or the like. The system may include one or more property extraction blocks (e.g., functional blocks, a power tracking block 1215, a temperature tracking block 1220, a characteristic tracking block, a resonant frequency tracking block 1225, an acoustic quality tracking block 1230, an excursion tracking block 1235, a disturbance tracking block 1245, etc.), configured to analyze the updated spectrum, and to generate one or more associated parameters therefrom.

Figure 13:
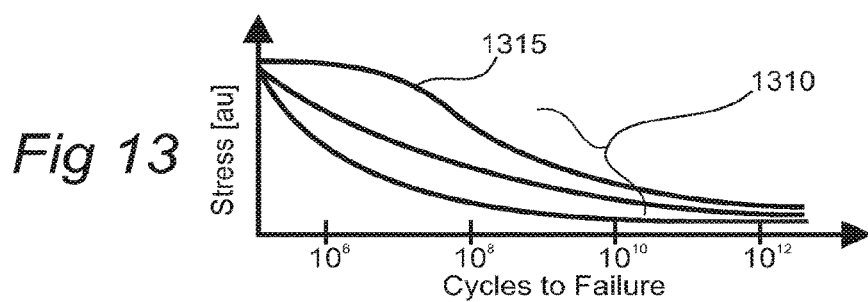
FIG. 13 shows a semi-logarithmic graph outlining some non-limiting examples of relationships between stress state and cycles to failure for a speaker in accordance with the present disclosure.

FIG. 13 shows a semi-logarithmic graph outlining some non-limiting examples of relationships between stress state and cycles to failure for a speaker in accordance with the present disclosure. The graph shows logarithmic cycles to failure against a magnitude of stress for a range of non-limiting example speakers 1310: a low cost speaker, mid-range speaker, and a high performance speaker 1315.

In aspects, a relationship between cycles to failure and stress may be incorporated into one or more aspects of a speaker protection system in accordance with the present disclosure. The remaining lifetime may be estimated using such information as part of a lifetime prognosticating subsystem as part of the speaker protection system. In aspects, a value relating to the combination of stress and application time may be generated during use of the speaker. The value may be configured in combination with such a stress-cycle relationship to generate an estimate of the remaining lifetime of the speaker in the field.

In aspects, a usage profile for a speaker in accordance with the present disclosure, may be generated by integrating a stress parameter (e.g., an excursion augmented power level, a thermal parameter, a combination thereof, etc.) with a duration (e.g., time under stress), so as to generate a metric which designates a quantifiable level to which the speaker has been operated under stress during usage thereof. Such a metric may then be used to predict remaining lifetime of the speaker. In aspects, the maximal stress levels that may be applied to the speaker in use may be augmented in real-time while in service based on the usage profile to date (e.g., the maximal allowed stress may be reduced based on the amount and severity of usage of the speaker to date).

In aspects, the usage profile for a speaker in accordance with the present disclosure, may contain a listing of preferred ear gasket functions, impedance spectra during ear gasket related usage, or the like for a user so as to form an ear gasket history. The ear gasket history may be applied to a model bank, etc. in order to optimize the models stored in the bank, provide an associated deep learning algorithm with suitable information for adapting the speaker performance to the preferred habits of the user, etc.

Figure 14A:
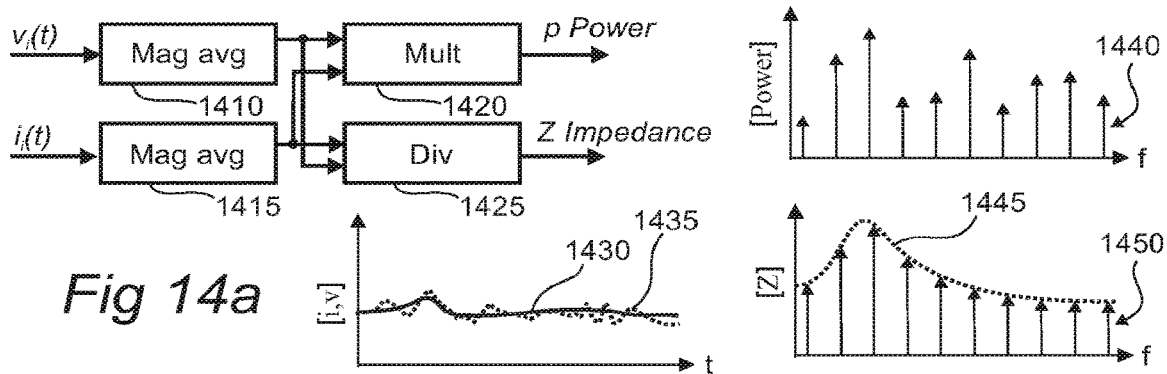
FIGS. 14a-c show aspects of systems for extracting parameters from one or more signals measured in a system in accordance with the present disclosure.
Figures 14B, 14C:
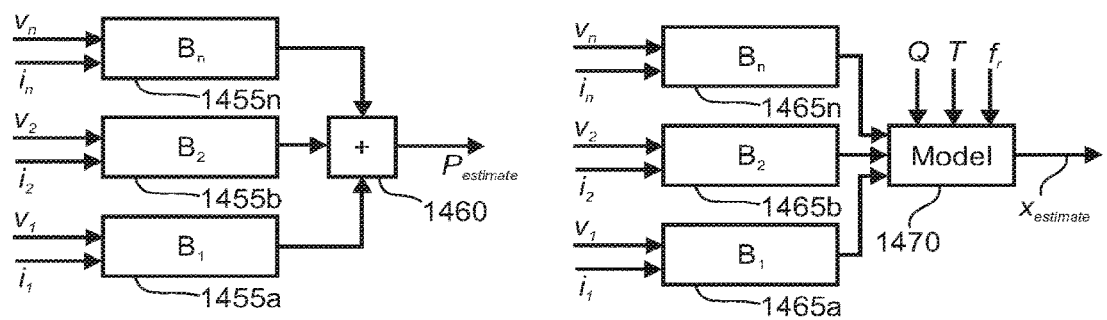

FIGS. 14*a-c* show aspects of systems for extracting parameters from one or more signals measured in a system in accordance with the present disclosure. FIG. 14*a* shows aspects of a system to extract one or more spectral aspects of a property (e.g., impedance, Q, $f_r$, etc.), and/or a state (e.g., excursion, velocity, acceleration, current, voltage, power, etc.) during operation thereof. The system may be configured to receive one or more signals (e.g., voltage, current, excursion, etc.) or signals generated therefrom (e.g., band limited portions thereof, etc.). The system may include band averaging blocks 1410, 1415, configured to generate an average magnitude within a frequency band of an associated input. The system may be configured to perform one or more operations 1420, 1425 (e.g., arithmetic operation, multiplication, division, conversion, filter, etc.) on the average magnitudes to generate one or more discrete frequency band estimates therefrom. The frequency band estimates may be a computationally simplified representation of a frequency spectrum for the parameter, for use by one or more aspects of an associated protection system, control system, model generation algorithm, etc.

Some aspects of temporal data 1430, 1435 along with associated band-limited spectra 1440, 1450, and a fitted impedance model 1445 (e.g., a linear model, a biquad filter based model, etc.), are shown to clarify the parameter extraction process.

FIG. 14*b* shows aspects of a system to extract and/or predict one or more spectral aspects of a property (e.g., impedance, Z), or a state (e.g., excursion x, power p, etc.) from one or more inputs during operation thereof. In aspects, the system may be configured to calculate a total power or energy estimate from one or more feedback signals (e.g., voltage, current, excursion, etc.) or signals generated therefrom (e.g., band limited portions thereof, etc.). The system may include band averaging blocks 1455*a-n*, configured to generate an average magnitude within a frequency band of an associated input. The system may be configured to perform one or more operations 1460 (e.g., arithmetic operation, conversion, filter, etc.) on the average magnitudes to generate the associated power and/or energy estimates. Such a configuration may be advantageous for calculating the desired properties in a computationally efficient method, amendable to implementation in a background service on an operating system.

FIG. 14*c* shows aspects of a system to extract one or more aspects of a property (e.g., impedance) or a state (e.g., excursion, power, etc.) during operation thereof. The system may include band averaging blocks 1465*a-n*, configured to generate an average magnitude within a frequency band of an associated input. The system may include one or more excursion models 1470 configured to calculate an excursion parameter $x_{estimate}$ from one or more feedback signals (e.g., voltage, current, excursion, etc.), one or more estimated parameters Q, T, $f_r$ (e.g., one or more model parameters, an acoustic quality, a coil temperature, a resonant frequency, an impedance model, an acoustic model, etc.) or signals generated therefrom (e.g., band limited portions thereof, etc.). In aspects, the excursion model 1470 may be generated from physical relationships between displacement and impedance (e.g., from a parametric model, from a physical model, etc.), from an adaptive model, as part of a test procedure, etc. In aspects, the system may include a plurality of excursion and/or impedance models 1470 or the like configured to operate simultaneously during operation, the output thereof compared against a measured signal or characteristic to determine and/or select the model 1470 that is most representative of the present state of the associated acoustic system.

In aspects, the system may be configured to compare an extracted state and/or estimated parameters against values recently collected in free space (such as when the device is not located near an obstruction, a user surface, an ear, etc.). The extracted state and/or estimated parameters may be compared against recently confirmed free state parameters, the free state difference being representative of the state of engagement of the speaker with a nearby surface (i.e. the degree of formation of a gasket effect with a nearby surface). The free state difference may then be used as a parametric input to the controller, to adjust the audio stream prior to rendering so as to improve the audio level, clarity, spectral distribution, etc. in the present environmental state. Some non-limiting examples include, a free state approximation (i.e. a state where the speaker is basically far from any nearby surfaces), a restricted state (i.e. a state where the speaker is near a surface but there is still substantial acoustic leakage there around), a fully sealed state (i.e. a state where the speaker is coupled with a surface so as to form a substantially complete gasket), or one or more states in between. In aspects, the free state difference may be a continuous parameter, used to modify in a discrete or pseudo continuous fashion, one or more controller parameters.

Figure 15A:
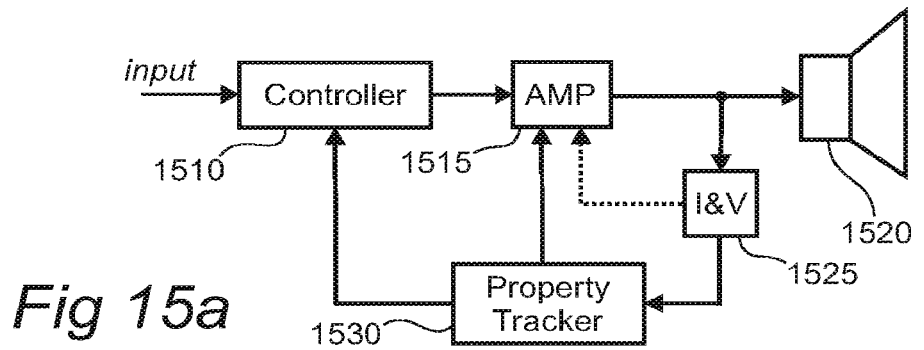
FIGS. 15a-c show aspects of a system for controlling a speaker in accordance with the present disclosure.
Figure 15B:
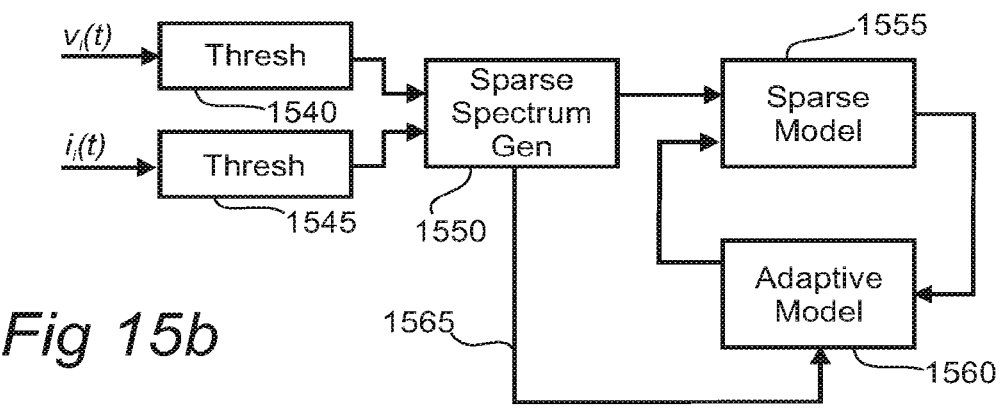
Figure 15C:
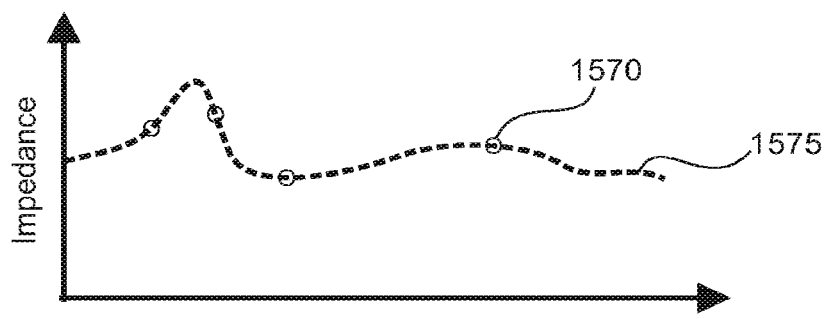

FIGS. 15*a-c* show aspects of a system for controlling a speaker 1520 in accordance with the present disclosure. FIG. 15*a* shows a system for controlling a speaker configured to accept an input audio signal (input), including a controller 1510 in accordance with the present disclosure. The controller 1510 may be configured to accept the input signal and/or one or more feedback signals or signals generated therefrom and to generate one or more control signals for use by one or more aspects of the system. The system may include an amplifier 1515 configured to accept the control signal and one or more feedback signals (e.g., current, voltage, excursion, etc.), or signals generated therefrom (near-term predictions of states, a property, an environmental condition, etc.), and to generate a drive signal to drive an associated speaker 1520. The system may include one or more sensory feedback blocks 1525, configured to measure and optionally convert one or more feedback signals from the speaker or audio system component. The sensory feedback block 1525 shown in FIG. 15*a* may be configured to monitor one or more aspects of the voltage, and/or current provided to the speaker 1520, and to optionally generate one or more feedback signals therefrom (e.g., filtered signals, band limited signals, raw signals, etc.). The system may include a property tracker 1530 in accordance with the present disclosure configured to accept one or more feedback signals or signals generated therefrom, and to calculate a property (e.g., impedance, resonant frequency, cutoff frequency, nonlinear acoustic parameter, etc.) for use by one or more aspects of the system in accordance with the present disclosure. One or more of the properties may be used as part of a control algorithm included in the controller, a protection algorithm included in the controller and/or the amplifier, etc. In aspects, the property tracker 1530 may forward one or more of the feedback signals onto the controller 1510, and/or amplifier 1515 during use.

FIG. 15*b* shows a subsystem in accordance with the present disclosure configured to generate one or more property spectra from one or more feedback signals (current, voltage, $v_i(t)$, $i_i(t)$, etc.), which may be measured during general use of an associated speaker (e.g., without preconceived test signals, etc.). The subsystem may include one or more threshold blocks 1540, 1545, configured to calculate when the feedback signals or a portion thereof have significant content for further analysis. The subsystem may include a sparse spectrum generator 1550 configured to accept the significant content and generate one or more sparse spectra therefrom (e.g., portions of a complete spectrum as available from the significant content of the feedback signals). The subsystem may include a sparse data model 1555 into which sparse spectra may be incorporated as available based on the particular usage case. The subsystem may include one or more models, adaptive models 1560, etc. to accept one or more aspects of the sparse spectra and/or an error signal from one or more of the sparse data models 1755 during use. The adaptive model 1560 may be configured to make a stabilized, full spectral model therefrom. The stabilized full spectral model may be made available to one or more aspects of the system (e.g., a control algorithm, a sound quality enhancement algorithm, an amplifier, etc.) for use in the control and/or protection of the speaker. In aspects, the full spectral model may be added to a model bank in accordance with the present disclosure, as feedback for aging studies, etc.

FIG. 15*c* shows an impedance frequency response at a present time period relating to significant content 1570 (measured over particular bands within the spectrum), and a visual example of a full spectral model 1575 fit thereto, obtained for the particular time period in question. The model 1575 may be updated as available from the significant content 1570 from the present time period as well as significant content obtained during previous time periods.

Figure 16:
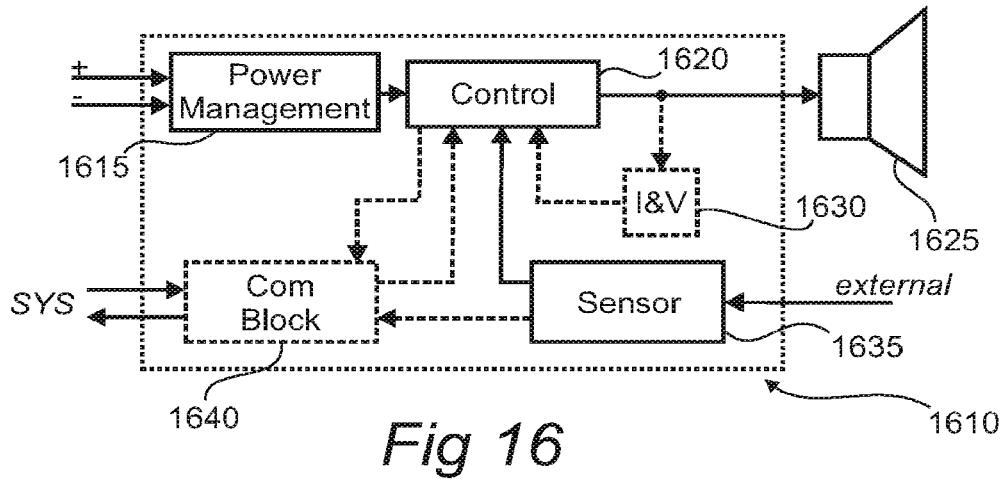
FIG. 16 shows aspects of a schematic of an active speaker control system in accordance with the present disclosure.

FIG. 16 shows aspects of a schematic of an active speaker control system 1610 in accordance with the present disclosure. In aspects, one or more components of the active speaker control system 1610 may be included into an integrated circuit in accordance with the present disclosure. FIG. 16 shows a control system 1610 for controlling a speaker 1625 configured to accept an input audio signal (e.g., communicated with an external processor, controller, etc., which may be part of a digital communication signal, via I2S [Integrated Interchip Sound], and the like), and a power signal (e.g., from a power source, a battery, etc.). The control system 1610 may include a communication block 1640 configured to communicate one or more signals (e.g., the audio signal, a configuration signal, a sensory signal, a status signal, a power requirement, a power prediction, a power constraint, etc.) to/from an outside source (e.g., a processor, a communication subsystem, etc.). The communication block 1640 may be configured to communicate one or more of the signals with one or more aspects of the control system 1610. The control system 1610 may include a controller 1620 in accordance with the present disclosure. The controller 1620 may be configured to accept the input signal and/or one or more feedback signals or signals generated therefrom and to generate one or more control signals for use by one or more aspects of the system 1610. The system 1610 may include an amplifier (in this case, integrated into the controller) configured to accept the control signal and one or more feedback signals or signals generated therefrom and to generate a drive signal to drive an associated speaker 1625. The system 1610 may include one or more sensory feedback blocks 1635, configured to measure and optionally convert one or more feedback signals from the speaker 1625, membrane actuator, an embedded sensor, and/or one or more system components. In aspects, a drive signal sensory feedback block 1630 shown in FIG. 16 may be configured to monitor one or more aspects of the voltage and/or current provided to the speaker 1625 and to generate one or more feedback signals therefrom (e.g., filtered signals, band limited signals, raw signals, etc.). The system may include a sensory feedback block 1635 in accordance with the present disclosure configured to interface with one or more sensors and to generate one or more feedback signals or signals generated therefrom for use by one or more aspects of the system 1610 (e.g., by the communication block 1640, the controller 1620, for communication to an external system, etc.). One or more of the properties may be used as part of a control algorithm included in the controller 1620, a protection algorithm included in the controller 1620, and/or the amplifier, etc.

Figures 17A, 17B:
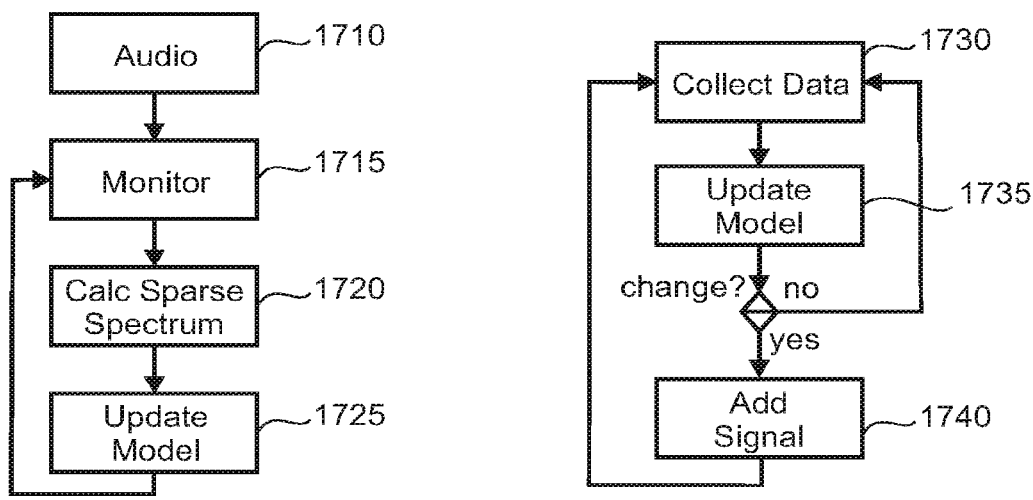
FIGS. 17a-b show aspects of methods for updating an adaptive model in accordance with the present disclosure.

FIGS. 17*a-b* show aspects of methods for updating an adaptive model in accordance with the present disclosure. FIG. 17*a* shows aspects of a method including playing an audio stream 1710 with the speaker under test, measuring one or more sensory signals associated with the speaker 1715 (e.g., via use of a series resistor, a coulomb counting sensor, a charge monitor, a voltage sensor, a sensor, etc.), or a nearby acoustic coupling (e.g. such as an acoustic load on the speaker, a leakage parameter between the speaker and a nearby surface, an acoustic coupling to a surface, a lack of coupling between the speaker and an externally placed microphone etc.), generating one or more spectra from the measured signals 1720 (e.g., generation of a bass band spectrum, a mid-band spectrum, etc.), analyzing one or more of the spectra to determine frequency bands of interest therein (e.g., frequency bands including a significant signal level in relation to a threshold value/function), and updating an adaptive model 1725 using one or more of the analyzed spectra.

In aspects, the measured signals may include current through, charge accumulation on, and/or voltage across a speaker. The property may include impedance of the associated speaker, etc. The generation of the spectra may be completed using an FFT, a multi-band filter and one or more averaging filters, etc.

FIG. 17*b* shows aspects of a decision making method to determine the immediate adaptation rates associated with the update process for an adaptive model in accordance with the present disclosure. The decision making method may include collecting data 1730, updating the model at a first rate 1735, assessing any changes in the model, and if a significant change is determined, perform an accelerated test 1740. Such a configuration may be advantageous for assessing dramatic changes in a speaker or an environment surrounding the speaker (e.g., placement of a finger over a speaker vent, etc.), so as to rapidly respond to those changes, so as to prevent short term damage to the speaker during use. In aspects, the accelerated test 1740 may include adding (e.g., superimposing) a test signal over top of the audio stream so as to guarantee that significant content will be generated in the spectral bands of interest as part of the assessment and adaptation process. In aspects, the accelerated test 1740 may include changing threshold levels, averaging times and the like in the sensor data processing algorithms in order to get less exact but quicker adaptive behavior.

Figure 18:
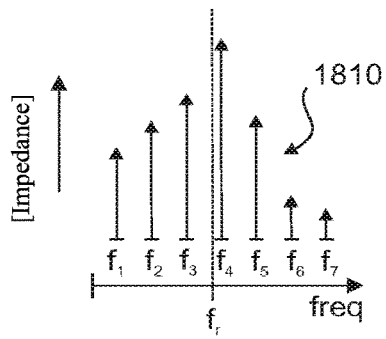
FIG. 18 shows aspects of a method for calculating one or more parameters from spectra in accordance with the present disclosure.

FIG. 18 shows aspects of a method for calculating one or more parameters from spectra in accordance with the present disclosure. The method includes calculating an approximate frequency $f_r$ associated with the peak of an impedance spectrum 1810, excursion spectrum, etc. FIG. 18 shows an associated frequency response as measured at bands ($f_1$-$f_7$) over the frequency spectrum of interest. The individual band measurements are used as a weighted sum to calculate the weighted average of the frequency response. The weighted average may be used to calculate a reference frequency associated with the distribution of the spectrum, which may change with temperature, environment, etc. Such a reference frequency may be advantageous for inferring a change in temperature and/or environment during use of the speaker in the field. In aspects, such a simplified method may be adapted to estimate the acoustic quality Q, and/or the bandwidth of a resonant peak of interest during use. In aspects, the acoustic quality may be estimated from the peak impedance at the resonant peak $f_r$ compared against the DC or near DC impedance in the spectrum (in practice that value may be obtained by measuring the impedance over the mid/high non-resonant frequency region of the spectrum, typically around 3000-5000 Hz for an electromagnetic microspeaker).

Figure 19A:
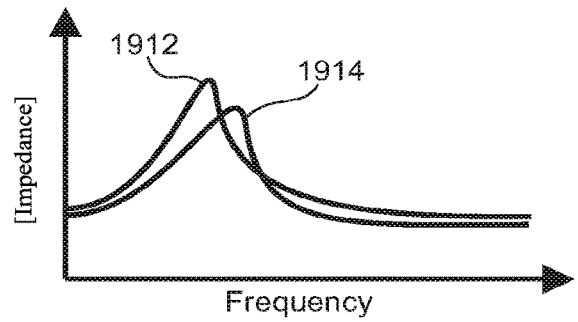
FIGS. 19a-g show aspects of techniques and relationships for deriving one or more speaker parameters and/or predicting the remaining lifetime of a speaker in accordance with the present disclosure.

FIGS. 19*a-g* show aspects of techniques and relationships for deriving one or more speaker parameters and/or predicting the remaining lifetime of a speaker in accordance with the present disclosure. FIG. 19*a* shows aspects of an impedance spectrum for a speaker as measured at low temperature 1914 and at high temperature 1912 during use. In aspects, an active speaker in accordance with the present disclosure may include a thermal sensor (e.g., a non-contact thermal sensor) to determine the temperature profile of a membrane actuator, voice coil, magnet, etc. during use. Such information may be combined with impedance readings to better select, enable use of, and/or adapt a model for use in one or more aspects of the system (e.g., a controller, a property tracker, etc.).

Figure 19B:
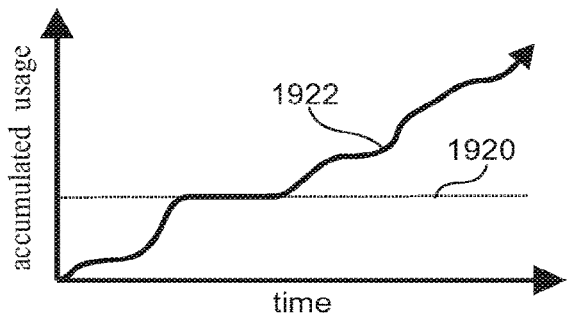

FIG. 19*b* shows aspects of an accumulated usage model, configured to estimate the weighted usage value 1922 to date, and/or remaining lifetime for a speaker unit during use. The model may include a "stress" variable combined with a temporal component (e.g., so as to derive a stress—time factor relating to usage of the speaker). The stress—time factor may then be integrated (e.g., leaky integrated) over time in order to form the accumulated weighted usage value 1922. In aspects, the resulting information may be used to determine periods of inactivity 1920 as well as periods of excessive use, or the like.

Figure 19C:
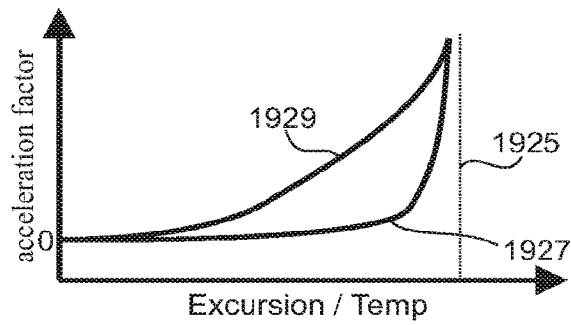

FIG. 19*c* shows aspects of a model for stress variables (e.g., age accelerating factors) for a speaker. The Figure shows a thermal acceleration factor 1927 and an excursion acceleration factor 1929, which both monotonically increase towards a critical level 1925 beyond which damage may be immanent. Such values may be advantageous for calculating a weighted average of usage for an associated speaker during use.

Figure 19D:
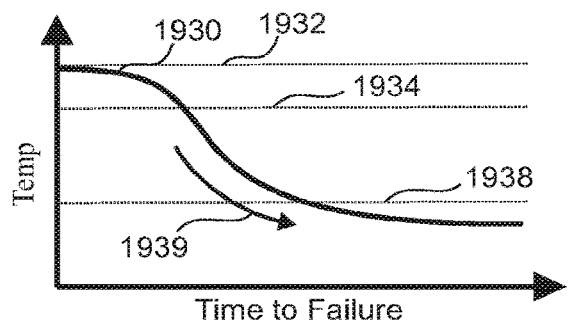

FIG. 19*d* shows aspects of an alternative thermal lifetime curve for a speaker, outlining the relationship between cycles to failure and the operating temperature during use. The curve 1930 may be a master curve generated for a population of speakers during a manufacturing process, field testing study, etc. In aspects, the curve may be compared against the running average temperature to date associated with the speaker to estimate the remaining lifetime thereof. Some aspects of the peak allowable operating temperature 1932, the maximum temperature during transient operation 1934, and the average running temperature 1938 are highlighted for reference.

Figure 19E:
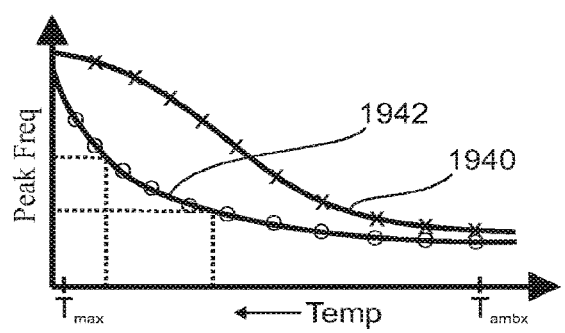

FIG. 19e shows aspects of a graphical relationship used to interrelate impedance 1940, 1942 measured at different excursion levels, related to temperature for a speaker in accordance with the present disclosure. From an estimate of either two of the values, such an LUT may be used to estimate the 3$^{rd}$ value of the triad.

Figure 19F:
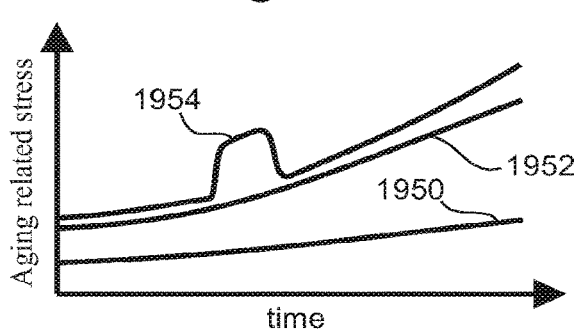

FIG. 19f shows aspects of age-related stress on a speaker. FIG. 19f demonstrates a range of stress/time trajectories for "normal" operation of a speaker in a family under a low temperature 1950 and a high temperature 1952 operating condition. FIG. 19f also illustrates a stress curve measured estimated for a particular sample device 1954 including an over stress event (e.g., a period of over excursion, physical impact, or increased temperature) that lead to a recoverable aging prediction for the system.

Figure 19G:
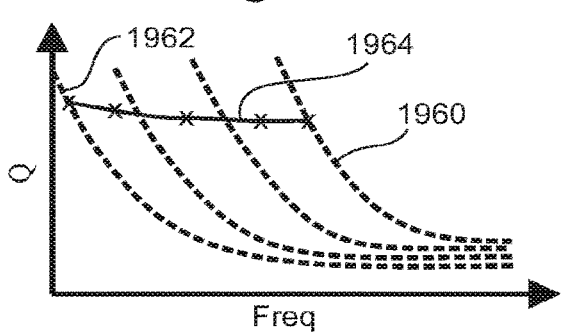

FIG. 19g shows aspects of an aging curve 1964 superimposed on a graphical representation of a frequency/acoustic quality model for a speaker obtained at different operating temperatures 1960, 1962. In aspects, the trajectory of the aging curve, as measured in the space associated with the speaker properties and environmental conditions, may be used to determine if a particular speaker may be aging in a predictable manner, or if an event has altered the aging trajectory for the particular speaker.

Figure 20:
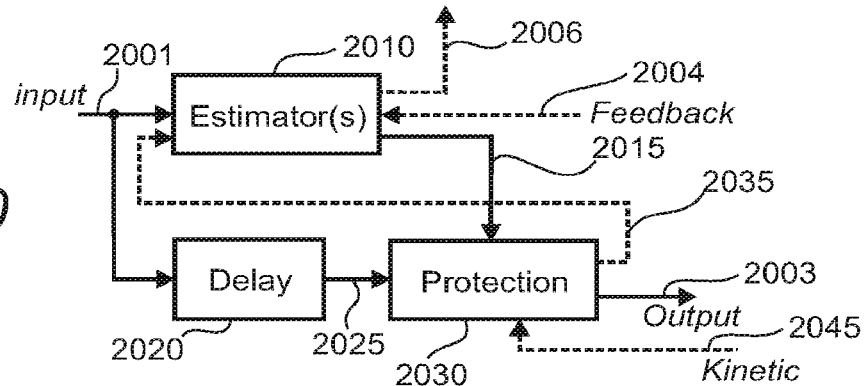
FIG. 20 shows a schematic of aspects of a speaker protection system in accordance with the present disclosure.

FIG. 20 shows a schematic of aspects of a speaker protection system in accordance with the present disclosure. In aspects, such a speaker protection system may be coupled with a control system for adjusting an audio stream. In aspects, the speaker protection system may be configured to generate one or more parameters (e.g. an excursion parameter, an impedance parameter, a proximity model, etc.) which may be used internally for speaker protection, but may also be provided to the control system for use in adjusting an audio stream to compensate for coupling with a nearby object. In one non-limiting example, an excursion state of the speaker may be used as input to a feedback algorithm for the control system. The excursion state and an acoustic output may be used to estimate an acoustic transfer function, an acoustic load on the speaker, etc. Such a transfer function, load, etc. may be related to a proximity state of interest between the speaker and a nearby object.

The speaker protection system shown includes an estimator 2010 in accordance with the present disclosure, configured to accept an input signal 2001 and optionally a feedback signal 2004 and/or a post compressed signal 2035 and to produce an estimation signal 2015. The estimation signal 2015 may be representative of a speaker parameter (e.g., voice coil excursion, a sound pressure level, a chamber pressure, etc.). In aspects, the estimator 2010 may be configured to produce the estimation signal 2015 without any form of feedback (e.g., without the optional feedback signal 2004 or the post compressed signal 2035). In aspects, the estimator (s) 2010 may be implemented in a purely feed forward configuration. Such an implementation may be advantageous for integration into a background service as provided to an operating system, etc.

In aspects, the speaker protection system may include a protection block 2030 configured to accept the input signal 2001 or a signal generated therefrom (e.g., such as a delayed input signal 2025), and the estimation signal 2015, and to produce an output signal 2003 for delivery to a speaker, a driver circuit, or the like. In aspects, the protection block 2030 may be configured to accept a kinetic and/or kinematic feedback signal 2045 (e.g., an accelerometer output, gyrometer output, acceleration based interrupt, etc.) for use in generating the output signal 2003. In aspects, the kinetic and/or kinematic feedback signal 2045 may be an event driven interrupt (e.g., a binary signal relating to an event such as free fall, an impact, a maximum rotation rate, a rapid change in ambient conditions, a rapid change in altitude, etc.). In aspects, the protection block 2030 may be configured to limit the delayed input signal 2025 based upon one or more of the estimation signal 2015, the kinetic and/or kinematic feedback signal 2045, or the like.

In aspects, the post compressed signal 2035 may be compared with the feedback signal 2004, the input signal 2001, the delayed input signal 2025, or the like in order to estimate a speaker parameter, adjust one or more estimation models, etc.

In aspects, the post compressed signal 2035 may be optionally used for feedback to an iterative prediction process. In aspects, such a signal may be connected to a matching compression block, ahead of the delay block 2020. Such a configuration may be advantageous for maintaining the feedback signal 2035 as part of a real-time prediction algorithm (e.g., using delays to keep blocks within the system working on the same time-stamped data).

In aspects, the estimator(s) 2010 may be configured to produce a power prediction 2006 in accordance with the present disclosure. The power prediction 2006 may be produced in parallel with the estimation signal 2015 (e.g., in parallel with an estimate for upcoming excursion, etc.). Such a power prediction 2006 may be advantageous for overcoming brownout concerns, compared with a power limit, etc. as part of a compression process, etc.

Figure 21A:
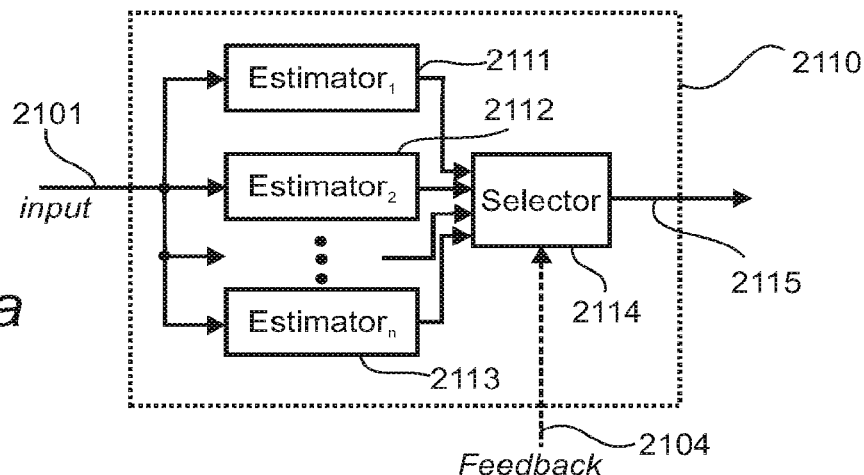
FIGS. 21a-e show aspects of excursion estimators each in accordance with the present disclosure.

FIGS. 21a-e show aspects of excursion estimators each in accordance with the present disclosure. FIG. 21a shows aspects of an estimator 2110 in accordance with the present disclosure, configured so as to accept an input signal 2101 and to generate an estimation signal 2115. The estimator 2110 includes one or more estimating models 2111, 2112, 2113, each configured to generate an estimate from the input signal 2101. In aspects, the estimating models 2111, 2112, 2113 may be linear small signal models configured to generate an estimate/prediction of a speaker state (e.g., such as excursion, acceleration, power consumption, etc.) without significant computational requirements. In aspects, one or more of the estimating models 2111, 2112, 2113 may be derived from a model class described herein. In aspects, one or more of the estimating models 2111, 2112, 2113 may be configured so as to estimate the speaker state as characterized during manufacturing testing of a family of devices (e.g., from sampled data taken from manufacturing lot data, from virtual test data, etc.). In aspects, one or more of the estimating models 2111, 2112, 2113 may be an adaptive model in accordance with the present disclosure.

In aspects, the estimator 2110 may include a selector 2114 configured to accept one or more outputs from the estimating models 2111, 2112, 2113 and to generate the estimation signal 2115 therefrom. In aspects, the selector 2114 may be configured to select the worst case output from the estimating models 2111, 2112, 2113 for use in the estimation signal 2115 (e.g., selecting output from one or more of the models to represent the estimation signal 2115). In aspects, the selector 2114 may be configured so as to output a function of the estimating model 2111, 2112, 2113 outputs (e.g., a linear combination, a weighted sum, a sum of absolute values thereof, etc.). In aspects, the selector 2114 may be configured to enable one or more models 2111, 2112, 2113 deemed to be most appropriate based upon a selection criteria (e.g., comparison to historical data, comparison with feedback or signals/characteristics obtained therefrom, comparison with device family histories, a higher order interpolation, etc.).

In aspects, the selector 2114 may be configured to accept a feedback signal 2104 (e.g., a measured current, impedance, voltage, excursion, etc.) to compare against one or more model outputs 2111, 2112, 2113 and/or co-processed characteristics (e.g., model processed current, impedance, voltage, excursion, power, etc. calculated in a model pair with each of the models 2111, 2112, 2113, etc.) so as to validate the selection process, to initiate a test, as feedback to a model adaptation process, or the like.

In aspects, the selector 2114 may be configured to enable or disable operation of one or more of the models 2111, 2112, 2113 (and optionally storing, for further testing, co-processed characteristics, such as, without limitation, model processed current) as part of the selection process. Such a configuration may be advantageous for reducing computational power while maintaining a high quality of protection for the associated speaker.

Figure 21B:
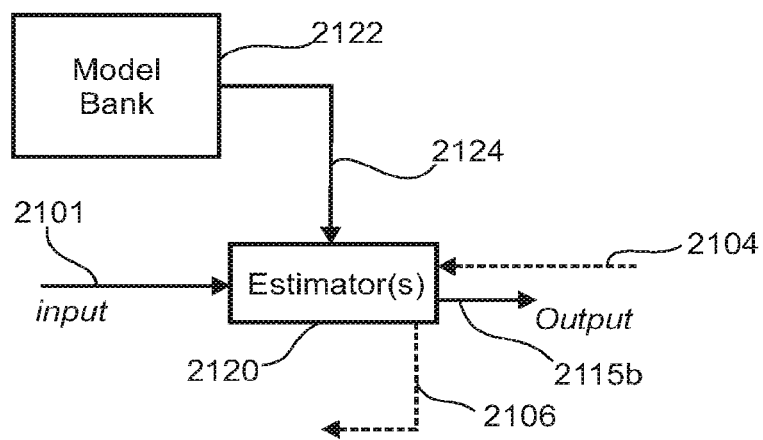

FIG. 21b shows aspects of an estimator 2120 in accordance with the present disclosure. The estimator 2120 is configured to accept an input signal 2101 or a signal generated therefrom and to produce an estimating signal 2115b. The estimator 2120 may be configured to accept one or more parameters 2124 (e.g., model parameters, filter coefficients, etc.), which may be loaded into the estimator from a model bank 2122. The model bank 2122 may include a plurality of models (e.g., parametric model parameters, filter coefficients, etc.) representative of the device in question. The loading process may be initiated by a test performed in accordance with the present disclosure. In aspects, such a test may be performed on the device (e.g., in combination with one or more forms of feedback). Alternatively, additionally, or in combination one or more aspects of the test may be performed remotely from the device (e.g., on a server, in a data center, in the cloud, at a test kiosk, etc.). In aspects, the model from the model bank may be selected via a feedback based comparison with one or more model characteristics and a characteristic of the device measured (e.g., derived from feedback) during operation in accordance with the present disclosure.

In aspects, the estimator 2120 may be configured to produce a power prediction 2106 in accordance with the present disclosure.

In aspects, the estimator 2120 may be configured to accept a feedback signal 2104 (e.g., a measured current, impedance, voltage, excursion, etc.) to compare against one or more estimated signals internal to the estimator 2120, and/or co-processed characteristics (e.g., model processed current, impedance, voltage, excursion, power, etc.) so as to validate the estimated output 2115b, to initiate a test, as feedback to a model adaptation process, or the like.

Figure 21C:
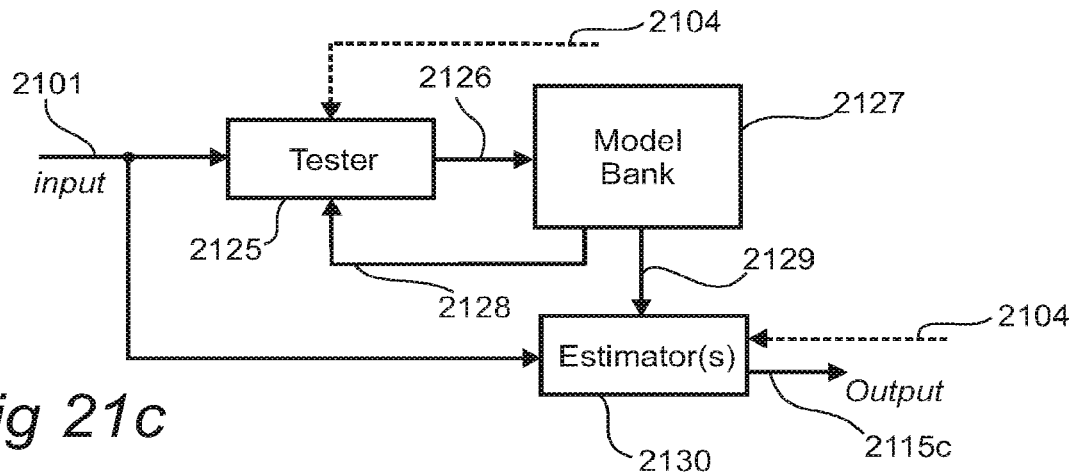

FIG. 21c shows aspects of an estimator 2130 in accordance with the present disclosure. The estimator 2130 may be configured to accept an input signal 2101 or a signal generated therefrom and to produce an estimating signal 2115c. The estimator 2130 may be configured to accept one or more parameters 2129 (e.g., model parameters, filter coefficients, etc.), which may be loaded into the estimator from a model bank 2127. The model bank 2127 may include a plurality of models (e.g., parametric model parameters, filter coefficients, etc.) representative of the device in question and optionally one or more model characteristics (e.g., impedance parameters, resonant frequency, acoustic quality, frequency response plots, etc.), which may be used to determine which model most closely fits a test measurement without requiring significant computational load.

The system may include a testing function 2125, configured to accept one or more feedback signals 2104, optionally in real-time, and/or optionally an input signal 2101 or a signal generated therefrom, in order to derive one or more measured characteristics, and compare them with one or more model characteristics 2128 to determine the nearest fitting model (or group of models). In aspects, the testing function 2125 may generate a selection signal 2126, an enable vector, a weighting function, etc. which may be used to select, enable, weight, update, and/or to generate a model from the model bank 2127 for loading into the estimator 2130, for enabling use thereof, or for use in conjunction with the estimator 2130. In aspects, the model characteristics may be compared to corresponding characteristics associated with the models included in the model bank 2127, so as to facilitate selection of the model(s) most closely representing the characteristic in question. Such model(s), model parameters, etc. may be loaded, activated, or the like in order to interact with the estimator 2130 processes.

In aspects, the estimator 2130 may run in parallel with any testing function 2125, etc. The loading/weighting process 2129 may be configured to include a transitional period whereby the updated model and/or weighting changes are slowly introduced so as to minimize the chance of audible transitions, over excursion events, etc. during the estimator update.

In aspects, the estimator 2130 may be configured as an observer in accordance with the present disclosure. In aspects, the observer may include an EKF, UKF configuration as described herein.

Figure 21D:
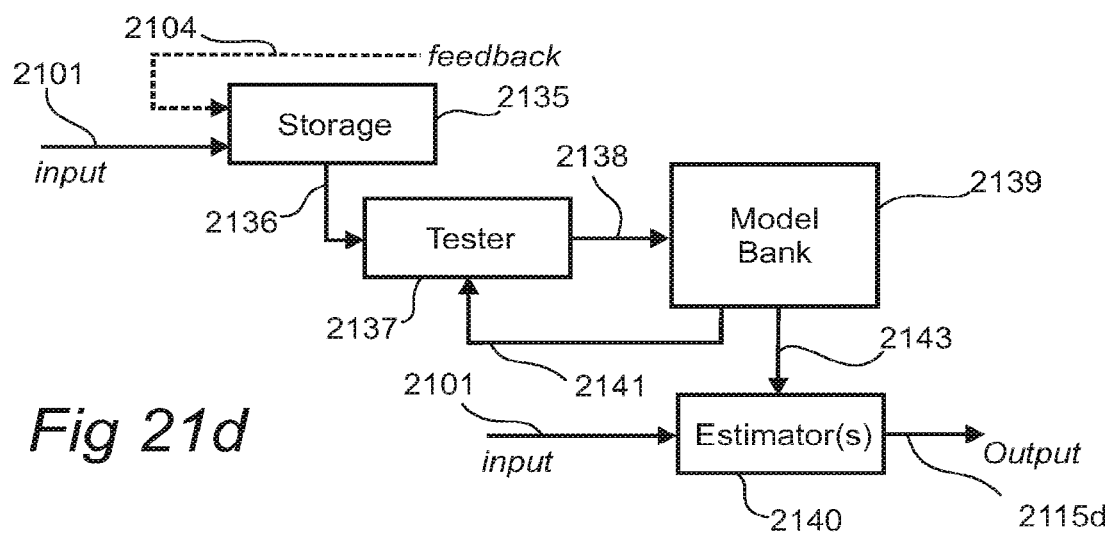

FIG. 21d shows aspects of an estimator 2140 in accordance with the present disclosure. The estimator 2140 may be configured to accept an input signal 2101 or a signal generated therefrom and to produce an estimating signal 2115d. The estimator 2140 may be configured to accept one or more parameters 2143 (e.g., model parameters, filter coefficients, weighting functions, etc.), which may be loaded into the estimator from a model bank 2139. The model bank 2139 may include a plurality of models (e.g., parametric model parameters, filter coefficients, etc.) representative of the device in question and optionally one or more model characteristics (e.g., impedance parameters, resonant frequency, acoustic quality, frequency response plots, etc.), which may be used to determine which model most closely fits a test measurement without requiring significant computational load.

In FIG. 21d, the input signal 2101 and/or feedback signals 2104 may be loaded into storage 2135, so as to form a signal history (e.g., a FIFO signal history, a retained test outcome, etc.). The signal history 2136 may be employed within a testing block 2137 so as to perform a test over a substantial dataset, average test results over a dataset, etc. In aspects, the testing block 2137 may be configured to accept or interact with one or more characteristics 2141 obtained and/or stored along with the models in the model bank 2139. In aspects, the signal history 2136 may be offloaded from a device (e.g., offloaded from a phone to a datacenter), where one or more tests may be performed and an updated model may be downloaded to the device (e.g., from a datacenter to a phone). Such an implementation may be advantageous for leveraging the computational resources of a datacenter, and/or signal histories and test results from a plurality of related devices (e.g., potentially from an entire device population), in assessing an estimator 2140 update, without relying heavily on device resources. In aspects, the testing block 2137 may be configured to calculate one or more parameters or characteristics 2138 (e.g., a measured characteristic) for comparison against one or more models in the model bank 2139. A resulting model, filter coefficients, weighting function, etc. may then be loaded into the estimator 2140, based upon this comparison as part of an updating or adaptation process thereupon.

Figure 21E:
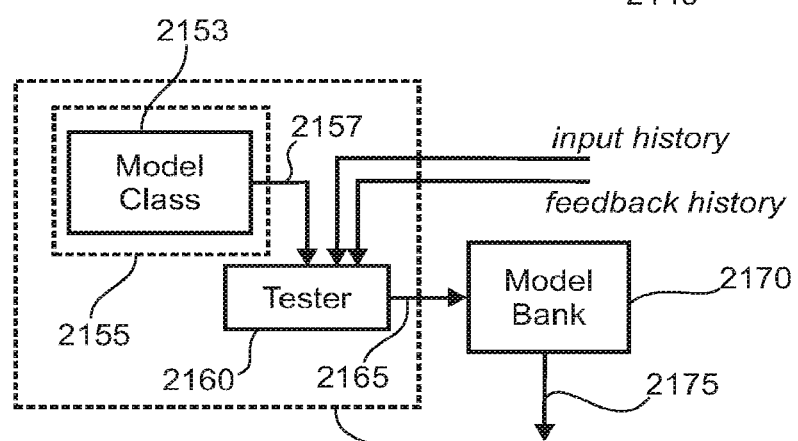

FIG. 21e shows aspects of a testing and loading a function, coefficients, weights, etc. into an estimator in accordance with the present disclosure. The testing function 2160 may be configured to accept an input history, a feedback signal history, etc., and one or more characteristics, coefficients, and/or features 2157 from one or more models in a model class 2153, and to calculate one or more characteristics for comparison against a class of models 2153. The testing function 2160 may determine a suitable model, weights, etc. for estimating one or more speaker states for an individual device, group of devices, etc. and may load a model, a sub-class of models, etc. onto the device, or group of devices, each including an estimator in accordance with the present disclosure. In aspects, such a testing function 2160 may output a group of models, features, characteristics, weighting functions, etc. for uploading 2165 into a model bank 2170 (e.g., located on a device, in a cloud, attached to a user profile, etc.). In aspects, the estimator may be configured to accept one or more parameters 2175 (e.g., model parameters, filter coefficients, etc.), which may be loaded into the estimator from the model bank 2170. The model bank 2170 may include a plurality of models (e.g., parametric model parameters, filter coefficients, etc.) representative of the device in question and optionally one or more model characteristics (e.g., impedance parameters, resonant frequency, acoustic quality, frequency response plots, biquad filter coefficients, weighting functions, etc.), which may be used to determine which model most closely fits a test measurement without requiring significant computational load.

In aspects, the estimator may run in parallel with any testing function 2160, etc. The loading process 2165 may be configured to include a transitional period whereby the updated model and/or weights are slowly introduced so as to minimize the chance of audible transitions, over excursion events, etc. during the estimator update.

In aspects, one or more components of the testing and/or updating procedure may be offloaded from the device 2150, 2155. In aspects, the testing and/or updating procedures may be performed in a data center, on a server, a cloud service, etc. In aspects, the testing procedure may be virtualized in accordance with the present disclosure (e.g., enhanced through additional statistical modeling, tolerance variation testing, cross population testing, testing within product manufacturing group IDs, etc.).

The loading process may be initiated by a test in accordance with the present disclosure. In aspects, such a test may be performed on the device (e.g., in combination with one or more forms of feedback).

In aspects, the testing procedure may be part of a quality control system in accordance with the present disclosure. The quality control system may be configured to periodically collect signal histories from devices in the field (e.g., post sales) and generate one or more characteristics therefrom. Some non-limiting examples of such characteristics include speaker impedance, acoustic quality, resonant frequencies, impedance on resonance, thermal-impedance relationships, compliance, property trends, usage history, event logs, environmental history, kinetic history (e.g., movement/impact history of the device), etc. Such information may be used to update lifetime models specific to a particular device (e.g., due to a combination of usage scenario, measured properties, environmental history, etc.).

In aspects, such models may be used to predict lifetime of a particular device. In particular, such models may be used to update the estimator and/or protection features of a particular device in order to extend the service lifetime thereof. Such changes may include increasing the clamping effects on a speaker associated with a particular device, so as to extend the lifetime thereof, uploading a compressor model thereto, altering an event functional characteristic, updating an estimator, etc.

In aspects, such a quality control system may be valuable in updating families of device, reducing returns, improving customer satisfaction, catching potential problems before they arise, debugging field related failures, assisting with next generation device design, etc.

Figure 22A:
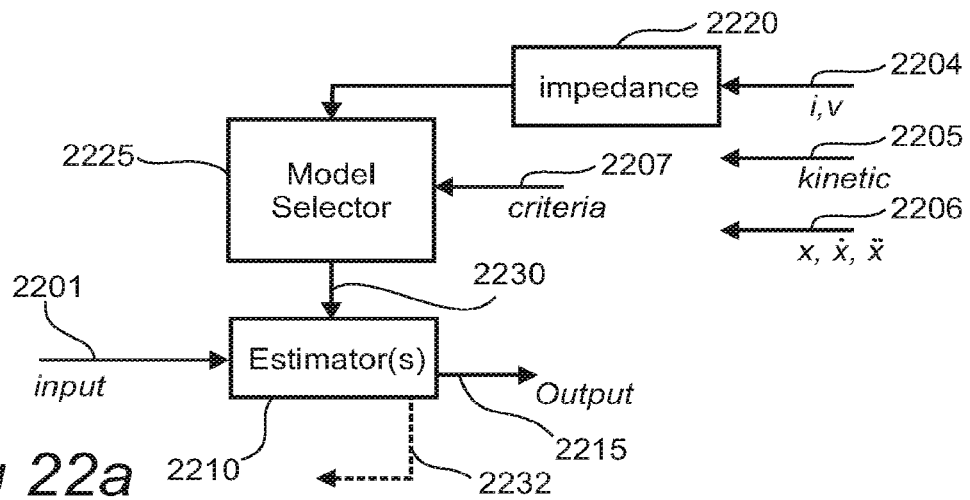
FIGS. 22a-c show aspects of a speaker protection system in accordance with the present disclosure.
Figure 22B:
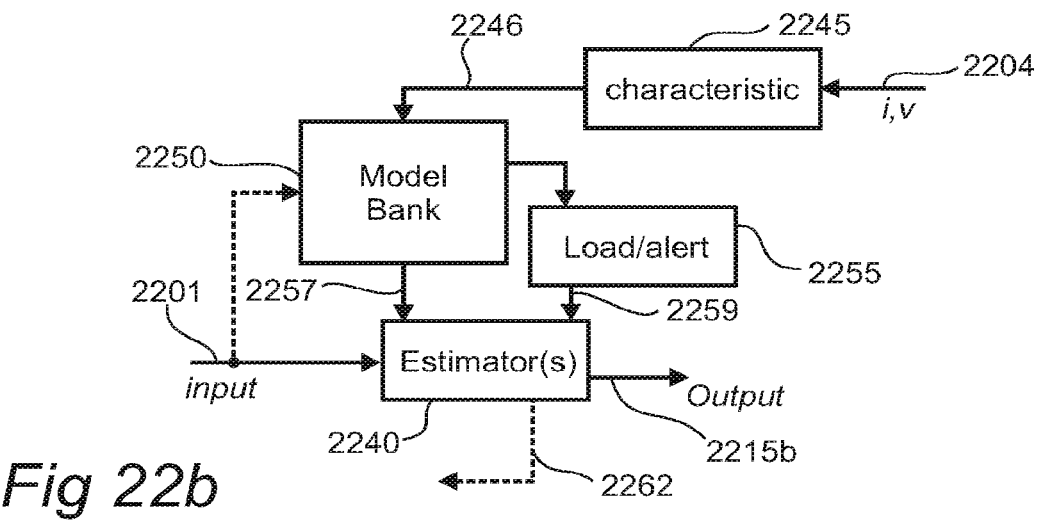
Figure 22C:
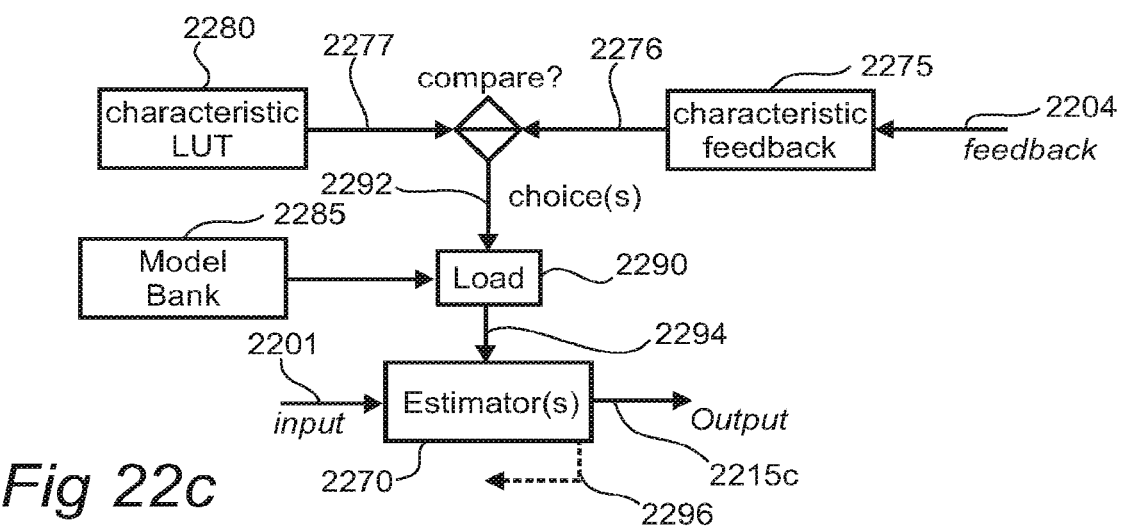

FIGS. 22a-c show aspects of a speaker protection system and/or a control system each in accordance with the present disclosure. FIG. 22a shows aspects of a feedback block 2220 (e.g., which may be included within a testing block in accordance with the present disclosure, etc.). The feedback block 2220 may be configured to accept one or more feedback parameters for use in an associated estimator 2210, protection block, testing function, a proximity state evaluator, a proximity model constructor, etc. Some non-limiting examples of feedback signals include current, speaker charge, voltage 2204, transducer movement 2206 (e.g., measured excursion, estimated from a light-based sensor, a capacitive sensor, velocity, acceleration thereof, etc.), a kinetic and/or kinematic feedback signal 2205 (e.g., an impact signal, one or more movement variables associated with the host CED, etc.), an image of a nearby object, an infrared feedback signal, feedback from a microphone in accordance with the present disclosure, an orientation signal, an altitude, an environmental signal, a humidity signal, etc. Such feedback may be used alone or in combination to generate a characteristic for comparing precision of fit for a group of models (e.g., an impedance measurement, a near DC resistance measurement, a temperature estimate, an impedance parameter, a resonant frequency, quality factor, bandwidth, a proximity model, a proximity parameter, a proximity state, etc.). Such characteristics may be used within a model selector 2225 to weight, load, and/or adapt 2230 one or more estimation models so as to best fit the present speaker configuration in question. An associated estimator 2210 in accordance with the present disclosure may run in parallel with the feedback and model selection process, configured to accept an input 2201 and produce an output 2215 associated with the present, future, or block of state values associated with the speaker in question. In aspects, the estimator 2210 may be configured to provide a power estimate/predictor 2232 in accordance with the present disclosure.

In aspects, the group of models may generate estimates of the feedback signals from the input signals 2201, and the model selector 2225 may compare the estimates against the feedback signals 2204 for purposes of selecting the associated model to run within the estimator 2210. In aspects, a current measurement may be used as the feedback signal 2204, the group of models may be a group of current-estimating models, each configured to generate a feed-forward estimate of speaker current within a characteristic frequency band from the input signal 2201. The estimated currents may be compared with the measured current to determine which model in the group is most accurate over any given time period. The model selector 2225 may select the excursion model associated with the most accurate current-estimating model for use in the estimator 2610 as part of the speaker protection system. In aspects, the model selector 2225 may be configured to generate a weighting function or interpolation function across multiple models, for use within the estimator 2210 (e.g., so as to best fit an excursion estimate from a plurality of parallel running excursion models).

In aspects, the estimator 2210 may include a plurality of feed forward models, each predicting an output signal 2215 associated with the input 2201. In aspects, the model selector may be configured to compare estimator 2210 values, compare feedback predictions 2220 against the feed forward models, etc. in order to weight, select, enable, and/or modify the models so as to provide a sufficiently representative output signal 2215 while preserving computational power, relaxing real-time feedback requirements, and minimizing hardware requirements for the system.

In aspects, the model selector 2225 may be configured to accept one or more performance limitation criteria (e.g., a thermal model, an acoustic coupling, an acoustic power level near the speaker, a relationship between background noise between a nearby sensor and a remote sensor, an excursion limitation, a power consumption limitation of the associated device [e.g., a configurable criteria], a power constraint delivered from a power manager, etc.) for use in the selection process, determining a model fit, etc.

FIG. 22*b* shows aspects of a speaker protection system and/or a control system in accordance with the present disclosure. The speaker protection system and/or control system includes a characteristic extraction block 2245, configured to derive one or more measured characteristics 2247 from one or more feedback signals 2204 each in accordance with the present disclosure. The extraction process may be periodic (e.g., updated every few seconds, minutes, days, etc.), or slowly varying function updated from a continuous stream of data. In aspects, the extraction process may be performed in an OS setting with unreliable latency (e.g., a non-RT OS setting).

In aspects, the characteristic extraction block 2245 may include a collection of bandpass or notch filters, each filter may be configured so as to assess a signal 2204 over a limited bandwidth. Output from the collection of filters may be representative of the frequency content of feedback signal, or of generated signals (e.g., an impedance signal). In aspects, the output from the collection of filters may be configured so as to determine a frequency associated with a resonant peak in the impedance spectrum of the impedance signal. Such a determination may be made by comparing the low pass filtered absolute values (or squares) of the outputs from the collection of filters. Such a configuration may be suitable for extracting a characteristic (e.g., a characteristic frequency of the impedance of the device), in pseudo real-time without significant computational resources.

In aspects, the characteristic may be used as part of a look up procedure, comparison, weighting algorithm, etc. in order to select, enable, update, and/or calculate model or filter coefficients, parameters, or the like to be loaded 2257, 2259 into an estimator 2240 in accordance with the present disclosure. An associated estimator 2240 in accordance with the present disclosure may run in parallel with the feedback and model selection process, configured to accept an input 2201 and produce an output 2215*b* associated with the present, future, or block of state values associated with the speaker in question. In aspects, the estimator 2240 may be configured to provide a power estimate/predictor 2262 in accordance with the present disclosure.

In aspects, the group of models included in the model bank 2250 may be configured to generate estimates of the feedback signals and/or characteristics from the input signals 2201, and a comparison between the estimates and the feedback be used to select which associated state estimating models may be loaded and/or configured to run within the estimator 2240.

In aspects, a current and voltage measurements may be used as the feedback signal 2204, the group of models may be a group of current-estimating models, each configured to generate a feed-forward estimate of speaker current within a characteristic frequency band from the input signal 2201 and each associated with an excursion model, which can be loaded and/or enabled to run within the estimator. The estimated currents may be compared with the measured current to determine which model in the group is most accurate over any given time period. The excursion model associated with the best fit current-model may be loaded 2257, 2259 into the estimator 2240 as part of the speaker protection system. A load/alert block 2255 may be configured to overview the transition process, weight the incoming and outgoing models in order to smooth the model transition, etc.

FIG. 22*c* shows aspects of a speaker protection system in accordance with the present disclosure. The speaker protection system includes a look up table based comparison between a measured characteristic 2276 and characteristics 2277 associated with a model bank 2285 in accordance with the present disclosure. In aspects, the characteristics 2277 may be stored in a characteristic LUT 2280 associated with the models in the model bank 2285. The LUT 2280 may be used to determine which model to load 2290 in to an associated estimator 2270 in accordance with the present disclosure. An associated estimator 2270 in accordance with the present disclosure may run in parallel with the feedback and model selection process, configured to accept an input 2201 and produce an output 2215*c* associated with the present, future, or block of state values associated with the speaker in question. In aspects, the estimator 2240 may be configured to provide a power estimate/predictor 2296 in accordance with the present disclosure. The measured characteristic(s) 2276 may be generated via a characteristic extraction block 2275, and one or more feedback signals 2204 each in accordance with the present disclosure.

In aspects, the system may include a multi-band compressor structure with slow release (so as to minimize the pumping effect on the sound). An excursion estimating function and/or limiter may be focused on an excursion prone band (e.g., up to 1 kHz, 2 kHz, 4 kHz, etc.). Such a configuration may be advantageous for allowing the multi-band structure to work more aggressively while the excursion limiter less so and with less aggressively changing the audio signature while providing acceptable safety limits and/or an acoustic coupling between the speaker and a nearby object.

In aspects, the excursion limiter in the protection block may be configured with a very short release-time (e.g., essentially a soft-clipping of the excursion peaks).

Figure 23A:
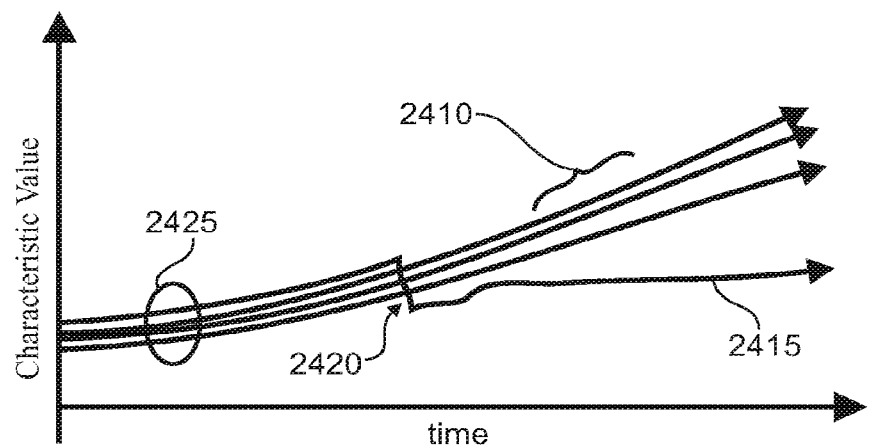
FIGS. 23a-b show aspects of a model selection process in accordance with the present disclosure.
Figure 23B:
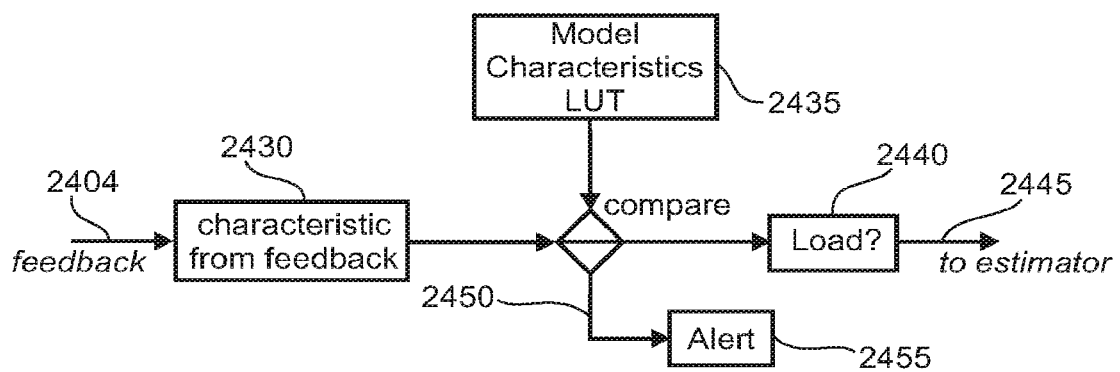

FIGS. 23*a-b* show aspects of a model selection process in accordance with the present disclosure. FIG. 23*a* shows a time series of a measured characteristic 2410 (e.g., such as a characteristic frequency, a non-linearity, a distortion parameter, etc.) over a long period of time, for multiple devices. As can be seen in FIG. 23*a*, early in the life of the devices 2425, both characteristics follow similar aging trajectory. At some point in time in the field, one device 2415 experiences an event 2420 (e.g., a device failure event, an impact, etc.) and the characteristic trajectories diverge. One or more test procedures in accordance with the present disclosure may be configured to detect such an event 2420 and report the event to a quality service, issue a device specific update (e.g., reduce speaker output so as to prevent further damage), initiate a repair request, alter an associated speaker protection algorithm, clamp audio output to the speaker to preserve remaining service life, etc.

FIG. 23b shows aspects of a model selection process in accordance with the present disclosure. A model bank 2435 including models associated with normal operation, with operation that is known to lead to eventual failure, and/or with models associated with known failure modes are made available for reference to measured characteristics obtained from measured feedback signal(s) 2404. The measured characteristics 2430 may be compared against aspects of the model bank 2435 to determine a suitable model to load 2440 into an estimator in accordance with the present disclosure. The comparison may further be used to determine one or more states of the device (e.g., normal operation, progressing towards failure, failed, proximity to a nearby object, acoustic coupling to an ear), etc. Such comparison may be used to signal 2450 an associated alert system 2455 in order to issue a repair statement, identify a recall candidate, indicate a stress event has occurred, initiate changes to a lifetime estimation algorithm, send a message to a user, etc.

In aspects, an estimator, a compressor, or an adaptive control system in accordance with the present disclosure interacting therewith may include a control strategy based upon one or more of adaptive control, hierarchical control, neural networks, Bayesian probability, backstepping, Lyapunov redesign, H-infinity, deadbeat control, fractional-order control, model predictive control, nonlinear damping, state space control, fuzzy logic, machine learning, evolutionary computation, genetic algorithms, optimal control, model predictive control, linear quadratic control, robust control processes, stochastic control, combinations thereof, and the like. In aspects, the estimator, compressor, or adaptive controller may include a full non-linear control strategy (e.g., a sliding mode, bang-bang, BIBO strategy, etc.), as a linear control strategy, or a combination thereof.

In aspects, the estimation and/or compression process may be configured in a fully feed-forward approach (e.g., as an exact input-output linearization controller, a linear filter, a linear phase filter, a minimum-phase filter, a set of bi-quad filters, etc.). Alternatively, additionally or in combination, one or more aspects of the estimator and/or compressor may include a feedback controller (e.g., a nonlinear feedback controller, a linear feedback controller, a PID controller, etc.), a feed-forward controller, combinations thereof, or the like.

In aspects, one or more of the feedback signals may be obtained from one or more aspects of an associated audio system. Some non-limiting examples of feedback signals include one or more temperature measurements, impedance, charge, coulomb counting, drive current, drive voltage, drive power, one or more speaker-related kinematic measurements (e.g., membrane or coil displacement, velocity, acceleration, air flow, etc.), sound pressure level measurement, local microphone feedback, ambient condition feedback (e.g., temperature, pressure, humidity, etc.), kinetic measurements (e.g., force at a mount, impact measurement, etc.), B-field measurement, local acoustic impedance, acoustic load on the speaker, combinations thereof, and the like.

The states may be generally determined as input to the protection block or a control block. In aspects, one or more states may be transformed so as to reduce computational requirements and/or simplify calculation of one or more aspects of the system.

In general, the fundamental mode of the speaker cone (e.g., the fundamental resonant frequency), may be determined by using a chirp signal that starts as a low frequency sine wave and increases the frequency with time until it reaches a desired end frequency. The impedance may be calculated by capturing the driver output current and (optionally) voltage during such testing. An approximate function of the speaker coil impedance may be acquired by linearization around the equilibrium point. The approximation may be valid for small signals relating to small cone excursions. By using that, it may be possible to match a measured impedance curve to it to calculate adequate starting speaker parameters.

In aspects, a control system or speaker protection system in accordance with the present disclosure may be configured to calculate a power delivery value during use thereof. The power delivery value may be an early indicator of an impending thermal spike and/or excursion. In aspects, a control system in accordance with the present disclosure may be configured to accept the power delivery value and to utilize the power delivery value in one or more control algorithms (e.g., as part of a compressor, as part of a distortion correction algorithm etc.), one or more models (e.g., an observer, an excursion prediction algorithm, etc.), and/or one or more speaker protection algorithms (e.g., as a transient load predictor, in combination with one or more temperature measurements, etc.). In aspects, the power delivery value may be used in combination with one or more temperature and/or impedance readings in order to provide an early alert algorithm to avoid damage (thermal, mechanical, etc.) of the speaker during use. In one non-limiting example, a control system in accordance with the present disclosure may be configured to limit the output signal to an associated speaker in accordance to the power delivery value (e.g., the overall power consumption of the speaker, the time averaged power consumption of the speaker, the spectrally modified power consumption of the speaker, etc.).

In aspects, a control system and/or speaker protection system in accordance with the present disclosure, may be configured to forecast a lifetime (e.g., an overall expected lifetime, a remaining lifetime, or the like) for a speaker during use. The lifetime forecast may be configured to accept one or more stress indicators (e.g., temperature, excursion, power consumption, environmental stresses [e.g., ambient temperature, humidity, etc.], accelerations [e.g., drop stresses, etc.], combinations thereof, and the like) during use. In aspects, a forecast may be formed in part by creating and/or accepting one or more timestamps (e.g., an initial startup date, a warranty date, the present date, total on-time to date, the minimum allowable run time of the speaker until expiration of a warranty, etc.) associated with the use of the speaker.

In aspects the forecast may be configured to calculate a stress-time accumulator associated with the history of the usage of the speaker to a present point in time. In one non-limiting example, a stress-time accumulator may be calculated by integrating (e.g., leaky integrating, accumulating, etc.) a stress function over time so as to generate an increasing numerical value. In aspects, the stress function may be dependent on the associated speaker family, and/or may be generated from one or more lifetime tests performed on a given family of speakers (e.g., a function created during one or more lifetime tests thereof, a function created from one or more accelerated lifetime tests during product development/manufacturing/field testing, or the like, one or more field recall assessments [e.g., field based reports on stress-time accumulation to failure from a related product population, etc.]). In aspects, the present stress-time accumulator may be assessed at any time during the usage of the device for use in the lifetime prediction (e.g., as part of a method and/or system to determine the remaining life thereof).

In aspects, the stress-time accumulator may be a measure of the usage severity of the associated speaker over the lifetime thereof. In making a prediction of the remaining lifetime, one or more aspects of the system may compare one or more time stamps with the stress-time accumulator, one or more stress functions, and/or one or more lifetime tests to generate a lifetime ratio of the usage to date versus a maximal usage to failure.

In aspects, the maximal usage to failure may be determined based on one or more speaker family accelerated lifetime tests, field recall data, etc. The maximal usage to failure may include one or more safety factors to ensure that an acceptable percentage of the speaker family would survive until such a level during use (e.g., 96% of all speakers in the family, 99% of the speakers, etc.).

Thus, the ratio may be used to predict remaining lifetime of the speaker, based upon the stress-time accumulator at a present moment in time.

In aspects, the lifetime ratio may be compared with one or more timestamps in order to predict how much time may be left to failure of the associated speaker. In aspects, the ratio may be used as a control and/or protection parameter to limit the maximal stress that a speaker may be put under during future usage, in order to extend the minimal expected lifetime thereof beyond a predetermined point in the future (e.g., until after a warranty expiration, until a predetermined time from purchase, until a predetermined maximal usage, etc.).

By way of non-limiting example, a first customer may heavily use a speaker in accordance with the present disclosure when the speaker is first put into service. Based upon the stress-time accumulator, a speaker protection algorithm in accordance with the present disclosure may limit the maximal stress levels that the first customer can continue to place the speaker under going forward, so as to extend the lifetime thereof to beyond a timestamp in the future. By way of non-limiting example, a second user may intermittently use a speaker in accordance with the present disclosure at high stress levels but only over short periods at a time up until a present time period. Based upon the stress-time accumulator after a given period of time, a forecast may be made to determine that the usage profile for the second customer may result in an adequately long lifetime for the associated speaker, thus a speaker protection algorithm in accordance with the present disclosure, may leave the maximal stress levels at the factory settings.

A forecast in accordance with the present disclosure, may be used in combination with one or more long term lifetime planning algorithms (e.g., so as to manage the lifetime of a component, a speaker, etc.), as part of a service contract dispute (e.g., so as to determine if the usage profile of a customer was within a contractual limit), as part of a diagnostic and/or forensic test (e.g., to determine when/why a speaker failed in service), combinations thereof, and the like.

In aspects, the forecast may be used as part of a usage profile calculation (e.g., so as to characterize the usage profile of a customer). The usage profile may be used to calculate one or more fatigue related damage accumulation, fatigue life calculations, temperature and excursion limits, combinations thereof, and the like. The usage profiles may then be used to limit speaker response, only if the over-use thereof is expected to lead to a diminution of the lifetime thereof within a warranty period, etc.

In aspects, the absolute maximums in addition to the dynamic aspects that look at a ratio of dwell time and power/temperature levels to ensure speaker safety.

In aspects, an additional observer may be configured to predict the excursion of the speaker from a combination of the input signals and feedback signals derived from the speaker and/or sensory feedback blocks in accordance with the present disclosure. Such a configuration may be advantageous for predicting excursion issues before they arise in practice, so as to clamp down on the drive signals before an excursion limit is hit (thereby avoiding damage to the associated speaker).

In aspects, the resonant frequency of a speaker may be mapped to the spectral impedance curve of an associated speaker in accordance with the present disclosure. By designing an adaptive filter following the resonant peak based on the impedance curve, the resonant peak of the speaker can be suppressed. The resulting system may be advantageous for protecting a speaker with a behavioral model that is consistent for one or more aspects of frequencies, over changing temperature, aging fatigue etc.

In aspects, methods for recalculating these curves (and the temperature/amplitude dependence thereof in the field) may be advantageous to cover changes to models caused by damage to an associated speaker in the field, changes in climate (e.g., dander buildup on the speakers themselves, changes in local humidity, etc.).

Methods for simultaneous prediction of temperature and excursion during use of a speaker element may be envisaged as depicted throughout the present disclosure. Methods may be envisaged to calculate the changing impedance curve with natural music, other approaches, etc.

In aspects, the system may include an observer configured to combine resistance/impedance measurements with some predictive algorithms based on temperature behavior models so as to look at an input signal in advance (e.g., a delayed version may be sent through to the speaker and an immediate version through the observer), and "see" that it will lead to rapid heating, and/or excursion. Such a configuration may be advantageous for predicting when a thermal and/or excursion stress on the speaker may be sufficiently dangerous, so as to avoid damage to the speaker during use.

In aspects, one or more methods for obtaining excursion from impedance spectra may be coupled with temperature readings as the curves may change with excursion (due to nonlinearities) and temperature (due to temperature related property changes of speaker components).

In aspects, the method may include watching the excursion of the speaker so as to predict imminent failure thereof and rapidly clamping down on the input to the speaker in order to prevent such failure.

In aspects, an algorithm may be provided for predicting temperature and excursion in real-time to protect against immediate failure and to protect against longer term failure due to excessive use of the speaker at significant stresses that are below the immediate failure concerns (yet equally dangerous over the long term).

Thermal aspects may be regulated based on actual temperature limits of the elements involved while excursions may be limited based on a current reading (e.g., an observer is run in parallel with the actual path). In this sense, the actual path may be slightly delayed with respect to the observer. In aspects, if a dangerous excursion is predicted by the observer, the actual path becomes clamped so as to prevent damage to the speaker.

In aspects, an active speaker in accordance with the present disclosure may include one or more onboard sensors for temperature, humidity, and/or excursion, combinations thereof, or the like. In aspects, excursion may be measured based on magnetic field measurement immediately beside the speaker coil. In aspects, excursion may be measured based on optical sensor placed into a SiP integrated speaker driver. In aspects, the sensory feedback may be made available to one or more aspects of the system (e.g., a nonlinear controller, a controller, a protection circuit, etc.). In aspects, excursion may be estimated based on back cavity pressure measurement (e.g., MEMS pressure sensor integrated into the SiP). In aspects, such sensors may dual as altimeters/barometers for other functions of the phone, which could result in cost savings by coupling with the speaker package instead of as a stand-alone chipset.

In aspects, the integrated circuit may be embedded into the speaker itself, and the integrated circuit may be configured so as to measure one or more impedance values during use. Such a configuration may be advantageous for measuring values without having to pass through a connector (as would be required with an off-speaker chipset).

In aspects, an active speaker may allow for a reduction in contact resistance fluctuations seen in connector impedance during use, under lifetime considerations, etc. In aspects, the active speaker may include a power control system in order to adapt the power rails if necessary during operation (e.g., so as to increase the overall power that may be provided to the speaker during use, so as to compensate for impedance of a connector between the power supply and the active speaker, etc.).

In aspects, the active speaker may be coupled into a PCB via a snap-in connector. Such a configuration may be advantageous to provide a combination of easy assembly with improved performance (e.g., to overcome contact impedance variation of such connectors amongst a product population). Such a configuration may be advantageous for providing a high performance speaker with a simple non-soldered connectors used for micro-speakers in mobile applications.

An active speaker in accordance with the present disclosure may be configured to communicate with one or more aspects of an associated system through means of a communication bus. Such a configuration may allow for simplified operation (e.g., power plus a digital signal may be provided by a processor), also digital communication may allow for higher levels of system awareness and diagnostics (e.g., by providing two-way communication between speaker and source). Such a configuration may allow for programming of speaker parameters, communication of speaker parameters (either factory programmed, or obtained from internal assessments, etc.), feedback of sensor readings to the host etc.

In aspects, a system in accordance with the present disclosure may include an audio impending power requirements prediction in accordance with the present disclosure. Such a power prediction may be performed in a similar manner to the excursion prediction (e.g., in parallel with it, on a block by block basis, etc.), the results of which could be made available to a system power manager, compared against a power constraint, or the like. Such a configuration may be advantageous for feeding a power management system with upcoming resource requirements for the speaker.

In aspects, the audio control system may be configured to accept a power constraint from an external power manager (e.g., from somewhere else in the system). The corresponding protection block/compressor, etc. may be railed or limited so as to further constrain operation based upon the power constraint (e.g., to work within the confines of what the system announces that it can provide to the audio system).

In aspects, the power constraint may be coupled with an implied media network application, to automatically throttle audio output when devices enter into "quiet zones" such as theaters, hospitals, or the like. In such applications, the power constraint may be set when a device registers with a local wireless network, joins a network group, obtains a network ID, or the like.

Thus the passage of power predictions and/or power constraints may be used by a system to manage "soft" power transitions, due to events, thus forming a "responsible" audio system that can manage operation under constrained power as well as report back near future power requirements to a system controller.

In aspects of the present disclosure, the term block computation is meant to include, without limitation, simultaneous computation of a temporal block of samples computed in a manner suitable, for purposes of integrating with a software host, for use within an operating system callback structure, to alleviate the time-sensitive nature of calculations, and/or to relieve the "always on" aspects of a sample-to-sample feedback controlled system. Such a configuration may be amendable to operation in a non-real-time operating system, such as a mobile operating system (e.g., iOS, Android, Windows 8, or the like).

It will be appreciated that additional advantages and modifications will readily occur to those skilled in the art. Therefore, the disclosures presented herein and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for determining a proximity state relating to a proximity of a speaker from an ear of a user, the system comprising:
    an audio path configured to deliver an audio signal comprising a diagnostic signal to the speaker; and
    proximity estimator circuitry configured to:
        receive a feedback signal from a feedback microphone configured to monitor the output of the speaker in the vicinity of the speaker, wherein the feedback signal is based on the diagnostic signal; and
        analyze the diagnostic signal and the feedback signal to calculate the proximity state using changes in background noise level;
        estimate one or more characteristics of the background noise level, wherein the one or more characteristics comprise an amplitude;
        set a control parameter relating to one or more characteristics; and
        calculate the proximity state based on the control parameter.

2. The system of claim 1 wherein the proximity estimator circuitry is configured to:
    generate an estimate of the feedback signal from the audio signal; and
    compare the estimate of the feedback signal against the feedback signal to calculate the proximity state.

3. The system of claim 1 wherein the proximity estimator circuitry is configured to:
    derive a measured characteristic from the feedback signal; and
    compare the measured characteristic with one or more model characteristics to calculate the proximity state.

4. The system of claim 1 wherein the diagnostic signal comprises an acoustic watermark.

5. The system of claim 1 further comprising the feedback microphone, wherein the feedback microphone is located substantially between the speaker and an object.

6. The system of claim 5 wherein the feedback microphone comprises a wireless microphone.

7. The system of claim 1 wherein the proximity state is reflective of one or more of: an acoustic coupling, acoustic leakage, acoustic volume, and tightness of fit between the speaker and the ear of the user.

8. The system of claim 1 wherein the proximity estimator circuitry is configured to calculate the proximity state by comparing the background noise level in two locations.

9. The system of claim 1 wherein the system is configured to alter the audio signal based on the proximity state.

10. The system of claim 1 wherein the proximity state is calculated in real time or pseudo real time.

11. The system of claim 1 wherein the proximity estimator circuitry is configured to use multiple frequency bands to calculate the proximity state.

12. The system of claim 1 wherein proximity estimator circuitry is configured to use power or energy calculations on the feedback signal, limited by frequency band, to calculate the proximity state.

13. A consumer electronic device comprising a system as claimed in claim 1.

14. The consumer electronic device of claim 13 comprising a media accessory.

15. The consumer electronic device of claim 13 comprising a phone or tablet audio and/or video accessory.

16. The system of claim 1 wherein the system is configured to limit the audio signal based on the proximity state.

17. The system of claim 1 wherein the system is further configured to predict an acoustic transfer function between the speaker and the feedback microphone.

18. The system of claim 1 wherein the system is further configured to adjust the audio signal based on the proximity state.

19. The system of claim 18 wherein the system is configured to adjust the audio signal by clamping the audio signal.

20. The system of claim 1 wherein the system is further configured to calculate an environmental signature based on the feedback signal, wherein the environmental signature at least in part pertains to the proximity state.

21. The system of claim 1 wherein the proximity state comprises one of: a free state, wherein the speaker is far from the ear of the user; and a restricted state, wherein the speaker is coupled with the ear of the user so as to form a substantially complete gasket.

22. A system for determining a proximity state relating to a proximity of a speaker from an ear of a user, the system comprising:
    an audio path configured to deliver an audio signal comprising a diagnostic signal to the speaker; and
    proximity estimator circuitry configured to:
        receive a feedback signal from a feedback microphone configured to monitor the output of the speaker in the vicinity of the speaker, wherein the feedback signal is based on the diagnostic signal; and
analyze the diagnostic signal and the feedback signal to calculate the proximity state using changes in background noise level;
estimate one or more characteristics of the background noise level, wherein the one or more characteristics comprise a power level;
set a control parameter relating to one or more characteristics; and
calculate the proximity state based on the control parameter.

23. A system for determining a proximity state relating to a proximity of a speaker from an ear of a user, the system comprising:
an audio path configured to deliver an audio signal comprising a diagnostic signal to the speaker; and
proximity estimator circuitry configured to:
receive a feedback signal from a feedback microphone configured to monitor the output of the speaker in the vicinity of the speaker, wherein the feedback signal is based on the diagnostic signal; and
analyze the diagnostic signal and the feedback signal to calculate the proximity state using changes in background noise level;
estimate one or more characteristics of the background noise level, wherein the one or more characteristics comprise a spectrum low frequency component;
set a control parameter relating to one or more characteristics; and
calculate the proximity state based on the control parameter.

24. A system for determining a proximity state relating to a proximity of a speaker from an ear of a user, the system comprising:
an audio path configured to deliver an audio signal comprising a diagnostic signal to the speaker; and
proximity estimator circuitry configured to:
receive a feedback signal from a feedback microphone configured to monitor the output of the speaker in the vicinity of the speaker, wherein the feedback signal is based on the diagnostic signal; and
analyze the diagnostic signal and the feedback signal to calculate the proximity state using changes in background noise level;
estimate one or more characteristics of the background noise level, wherein the one or more characteristics comprise a spectrum high frequency component;
set a control parameter relating to one or more characteristics; and
calculate the proximity state based on the control parameter.

25. A system for determining a proximity state relating to a proximity of a speaker from an ear of a user, the system comprising:
an audio path configured to deliver an audio signal comprising a diagnostic signal to the speaker; and
proximity estimator circuitry configured to:
receive a feedback signal from a feedback microphone configured to monitor the output of the speaker in the vicinity of the speaker, wherein the feedback signal is based on the diagnostic signal; and
analyze the diagnostic signal and the feedback signal to calculate the proximity state using changes in background noise level;
estimate one or more characteristics of the background noise level, wherein the one or more characteristics comprise noise in an audio band;
set a control parameter relating to one or more characteristics; and
calculate the proximity state based on the control parameter.

26. A system for determining a proximity state relating to a proximity of a speaker from an ear of a user, the system comprising:
an audio path configured to deliver an audio signal comprising a diagnostic signal to the speaker; and
proximity estimator circuitry configured to:
receive a feedback signal from a feedback microphone configured to monitor the output of the speaker in the vicinity of the speaker, wherein the feedback signal is based on the diagnostic signal; and
analyze the diagnostic signal and the feedback signal to calculate the proximity state using changes in background noise level;
estimate one or more characteristics of the background noise level, wherein the one or more characteristics comprise noise in a voice band of the background noise level;
set a control parameter relating to one or more characteristics; and
calculate the proximity state based on the control parameter.

27. The system of claim 22 wherein the proximity state comprises one of: a free state, wherein the speaker is far from the ear of the user; and a restricted state, wherein the speaker is coupled with the ear of the user so as to form a substantially complete gasket.

28. The system of claim 22 wherein the proximity estimator circuitry is configured to:
generate an estimate of the feedback signal from the audio signal; and
compare the estimate of the feedback signal against the feedback signal to calculate the proximity state.

29. The system of claim 22 wherein the proximity estimator circuitry is configured to:
derive a measured characteristic from the feedback signal; and
compare the measured characteristic with one or more model characteristics to calculate the proximity state.

30. The system of claim 22 wherein the diagnostic signal comprises an acoustic watermark.

31. The system of claim 22 wherein the proximity estimator circuitry is configured to calculate the proximity state by comparing the background noise level in two locations.

32. The system of claim 22 wherein proximity estimator circuitry is configured to use power or energy calculations on the feedback signal, limited by frequency band, to calculate the proximity state.

33. The system of claim 22 wherein the system is further configured to adjust the audio signal based on the proximity state.

34. The system of claim 33 wherein the system is configured to adjust the audio signal by clamping the audio signal.

35. The system of claim 23 wherein the proximity state comprises one of: a free state, wherein the speaker is far from the ear of the user; and a restricted state, wherein the speaker is coupled with the ear of the user so as to form a substantially complete gasket.

36. The system of claim 23 wherein the proximity estimator circuitry is configured to:

generate an estimate of the feedback signal from the audio signal; and compare the estimate of the feedback signal against the feedback signal to calculate the proximity state.

37. The system of claim 23 wherein the proximity estimator circuitry is configured to:

derive a measured characteristic from the feedback signal; and compare the measured characteristic with one or more model characteristics to calculate the proximity state.

38. The system of claim 23 wherein the diagnostic signal comprises an acoustic watermark.

39. The system of claim 23 wherein the proximity estimator circuitry is configured to calculate the proximity state by comparing the background noise level in two locations.

40. The system of claim 23 wherein proximity estimator circuitry is configured to use power or energy calculations on the feedback signal, limited by frequency band, to calculate the proximity state.

41. The system of claim 23 wherein the system is further configured to adjust the audio signal based on the proximity state.

42. The system of claim 41 wherein the system is configured to adjust the audio signal by clamping the audio signal.

43. The system of claim 24 wherein the proximity state comprises one of: a free state, wherein the speaker is far from the ear of the user; and a restricted state, wherein the speaker is coupled with the ear of the user so as to form a substantially complete gasket.

44. The system of claim 24 wherein the proximity estimator circuitry is configured to:

generate an estimate of the feedback signal from the audio signal; and compare the estimate of the feedback signal against the feedback signal to calculate the proximity state.

45. The system of claim 24 wherein the proximity estimator circuitry is configured to:

derive a measured characteristic from the feedback signal; and compare the measured characteristic with one or more model characteristics to calculate the proximity state.

46. The system of claim 24 wherein the diagnostic signal comprises an acoustic watermark.

47. The system of claim 24 wherein the proximity estimator circuitry is configured to calculate the proximity state by comparing the background noise level in two locations.

48. The system of claim 24 wherein proximity estimator circuitry is configured to use power or energy calculations on the feedback signal, limited by frequency band, to calculate the proximity state.

49. The system of claim 24 wherein the system is further configured to adjust the audio signal based on the proximity state.

50. The system of claim 25 wherein the proximity state comprises one of: a free state, wherein the speaker is far from the ear of the user; and a restricted state, wherein the speaker is coupled with the ear of the user so as to form a substantially complete gasket.

51. The system of claim 25 wherein the proximity estimator circuitry is configured to:

generate an estimate of the feedback signal from the audio signal; and compare the estimate of the feedback signal against the feedback signal to calculate the proximity state.

52. The system of claim 25 wherein the proximity estimator circuitry is configured to:

derive a measured characteristic from the feedback signal; and compare the measured characteristic with one or more model characteristics to calculate the proximity state.

53. The system of claim 25 wherein the diagnostic signal comprises an acoustic watermark.

54. The system of claim 25 wherein the proximity estimator circuitry is configured to calculate the proximity state by comparing the background noise level in two locations.

55. The system of claim 25 wherein proximity estimator circuitry is configured to use power or energy calculations on the feedback signal, limited by frequency band, to calculate the proximity state.

56. The system of claim 25 wherein the system is further configured to adjust the audio signal based on the proximity state.

57. The system of claim 56 wherein the system is configured to adjust the audio signal by clamping the audio signal.

58. The system of claim 26 wherein the proximity state comprises one of: a free state, wherein the speaker is far from the ear of the user; and a restricted state, wherein the speaker is coupled with the ear of the user so as to form a substantially complete gasket.

59. The system of claim 26 wherein the proximity estimator circuitry is configured to:

generate an estimate of the feedback signal from the audio signal; and compare the estimate of the feedback signal against the feedback signal to calculate the proximity state.

60. The system of claim 26 wherein the proximity estimator circuitry is configured to:

derive a measured characteristic from the feedback signal; and compare the measured characteristic with one or more model characteristics to calculate the proximity state.

61. The system of claim 26 wherein the diagnostic signal comprises an acoustic watermark.

62. The system of claim 26 wherein the proximity estimator circuitry is configured to calculate the proximity state by comparing the background noise level in two locations.

63. The system of claim 26 wherein proximity estimator circuitry is configured to use power or energy calculations on the feedback signal, limited by frequency band, to calculate the proximity state.

64. The system of claim 26 wherein the system is further configured to adjust the audio signal based on the proximity state.

* * * * *